(12) United States Patent
Abramson et al.

(10) Patent No.: US 10,383,492 B2
(45) Date of Patent: Aug. 20, 2019

(54) WINDOW CLEANING ROBOT

(71) Applicant: Alfred Kärcher GmbH & Co. KG, Winnenden (DE)

(72) Inventors: Shai Abramson, Halutz (IL); Asaf Levin, Kiriat-Bialik (IL); Shalom Levin, Atilit (IL); Dedy Gur, Hod Hasharon (IL)

(73) Assignee: Alfred Kärcher SE & Co. KG, Winnenden (DE)

( * ) Notice: Subject to any disclaimer, the term of this patent is extended or adjusted under 35 U.S.C. 154(b) by 281 days.

(21) Appl. No.: 15/370,209

(22) Filed: Dec. 6, 2016

(65) Prior Publication Data

US 2017/0164797 A1 Jun. 15, 2017

(30) Foreign Application Priority Data

Dec. 9, 2015 (GB) .................................. 1521712.8

(51) Int. Cl.
*A47L 1/02* (2006.01)
*B08B 1/04* (2006.01)
*B08B 3/04* (2006.01)
*B08B 1/00* (2006.01)

(52) U.S. Cl.
CPC ................ *A47L 1/02* (2013.01); *B08B 1/002* (2013.01); *B08B 1/006* (2013.01); *B08B 1/04* (2013.01); *B08B 3/04* (2013.01); *A47L 2201/00* (2013.01)

(58) Field of Classification Search
CPC ...... A47L 1/02; A47L 11/408; A47L 11/4083; B08B 1/006; B08B 1/04; B08B 3/04; B08B 1/002

USPC ...................................................... 15/52, 103
See application file for complete search history.

(56) References Cited

U.S. PATENT DOCUMENTS

| 3,604,049 | A |   | 9/1971 | Hetman |   |
|---|---|---|---|---|---|
| 3,942,213 | A | * | 3/1976 | Hoener, Jr. | ............... A47L 1/02 15/302 |
| 5,890,250 | A | * | 4/1999 | Lange | ...................... A47L 1/02 15/103 |
| 6,170,109 | B1 |   | 1/2001 | Jesadanont et al. |   |

(Continued)

FOREIGN PATENT DOCUMENTS

| CN | 102133067 | 7/2011 |
| CN | 202141947 | 2/2012 |

(Continued)

*Primary Examiner* — Laura C Guidotti
(74) *Attorney, Agent, or Firm* — Womble Bond Dickinson (US) LLP

(57) ABSTRACT

A window-cleaning robot that includes: a powered agitator that, when active, mechanically removes debris from a window surface; a cleaning pad, which is wetted with a cleaning fluid and contacts the window surface so as to remove debris therefrom with the aid of the cleaning fluid; and a movement system, for example including a number of wheels, which moves the robot over the window surface and has a defined forwards direction; the agitator is located forwards of the cleaning pad and the agitator and the cleaning pad are arranged such that, as the robot moves over the window surface in the forwards direction, the agitator addresses a width in a width direction, which is perpendicular to the forwards direction and parallel to the window surface, that is greater than the width addressed by the cleaning pad.

22 Claims, 20 Drawing Sheets

(56) References Cited

U.S. PATENT DOCUMENTS

| | | | |
|---|---|---|---|
| 7,320,149 B1 * | 1/2008 | Huffman | A47L 11/24 15/319 |
| 8,127,390 B2 * | 3/2012 | Kim | A47L 1/02 15/103 |
| 2003/0074752 A1 | 4/2003 | Konrad | |
| 2012/0151706 A1 | 6/2012 | Seo | |
| 2013/0037050 A1 | 2/2013 | Chao | |
| 2014/0034084 A1 | 2/2014 | Ryu et al. | |
| 2015/0297052 A1 * | 10/2015 | Eidmohammadi | G05D 1/0225 134/18 |
| 2015/0305581 A1 | 10/2015 | Lv | |

FOREIGN PATENT DOCUMENTS

| | | |
|---|---|---|
| CN | 102475519 | 5/2012 |
| CN | 102961080 A | 3/2013 |
| CN | 103505143 A | 1/2014 |
| CN | 203676982 | 7/2014 |
| CN | 204688252 | 10/2015 |
| CN | 105054860 | 11/2015 |
| CN | 105054861 A | 11/2015 |
| EP | 0 401 120 | 12/1990 |
| EP | 2 433 542 | 3/2012 |
| KR | 10-1314626 | 10/2013 |

\* cited by examiner

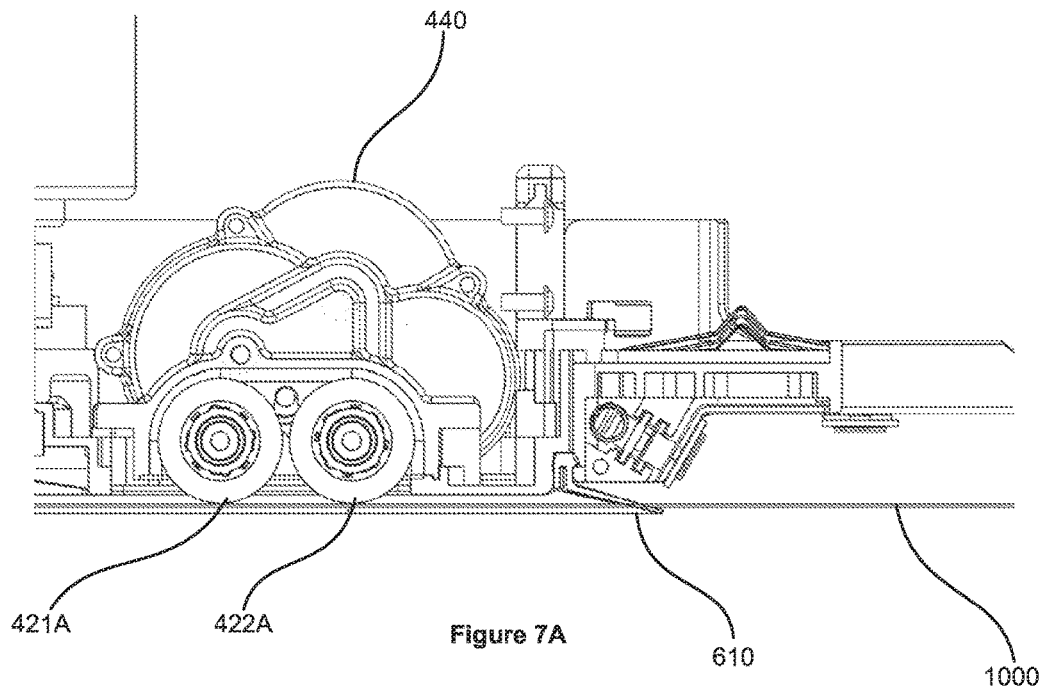
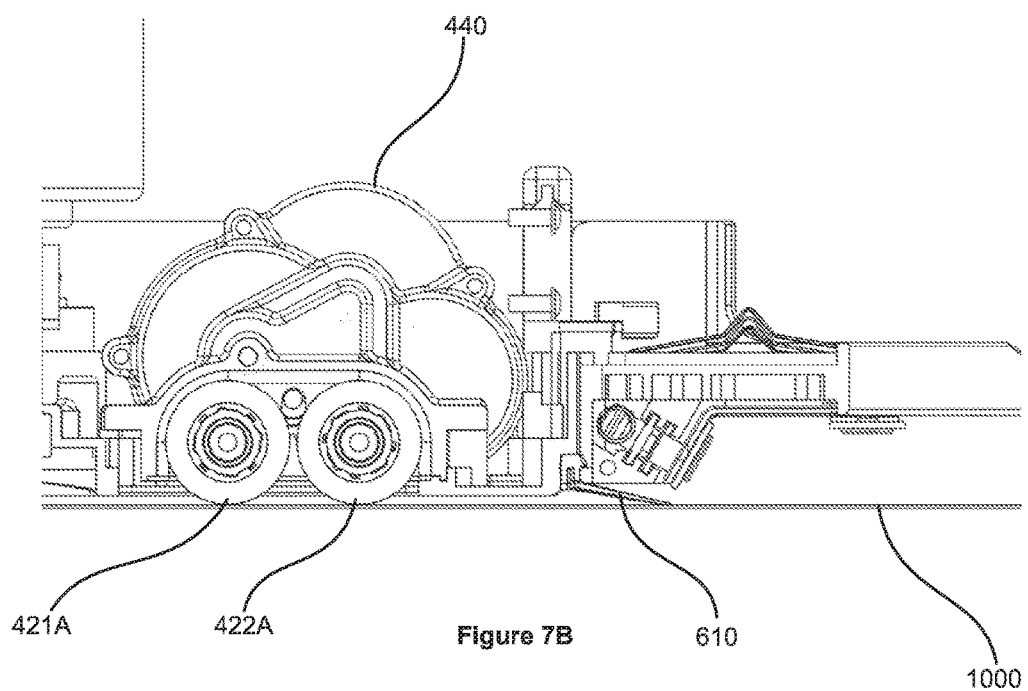

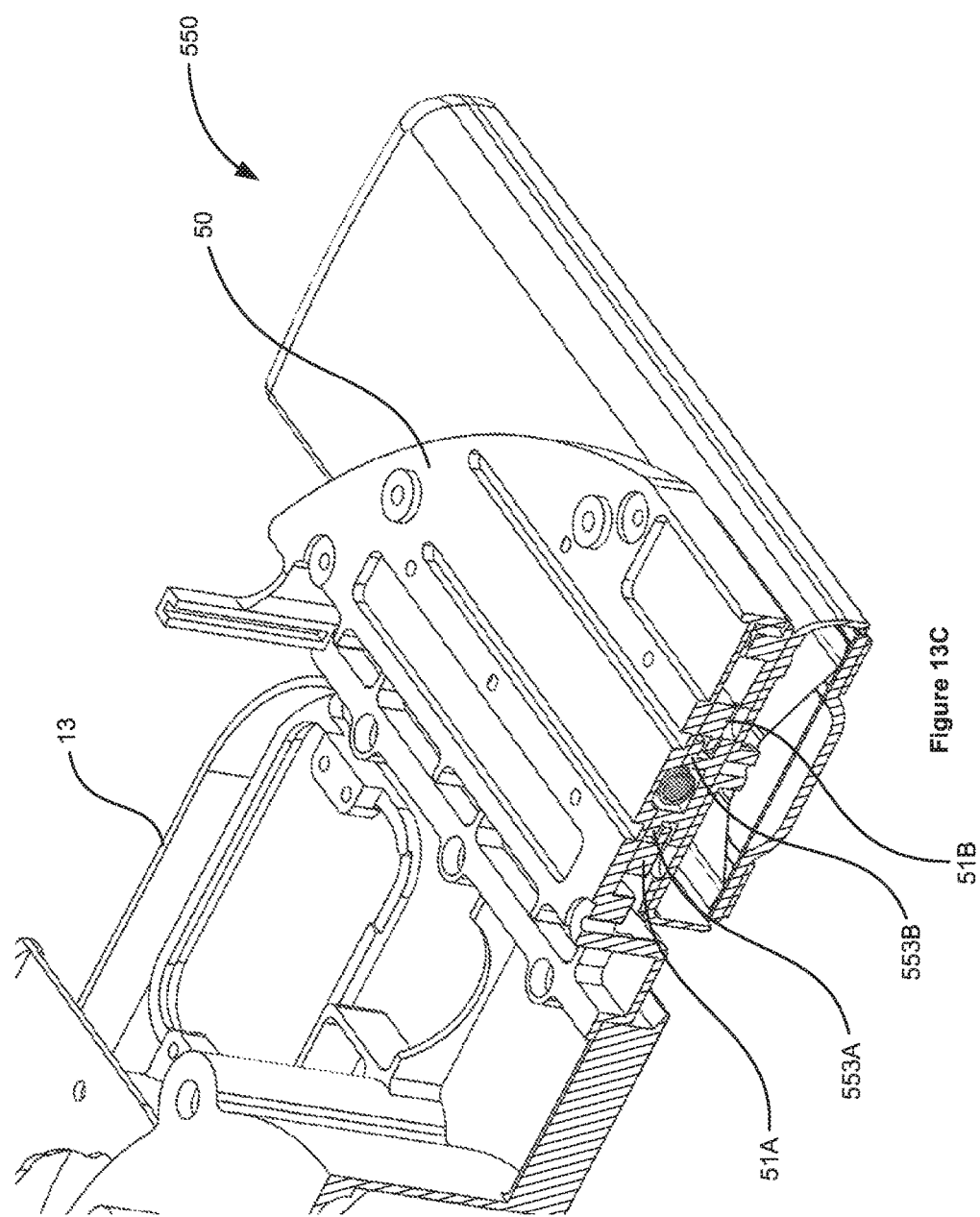

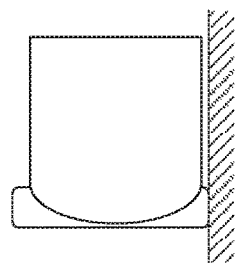
Figure 14B(i)
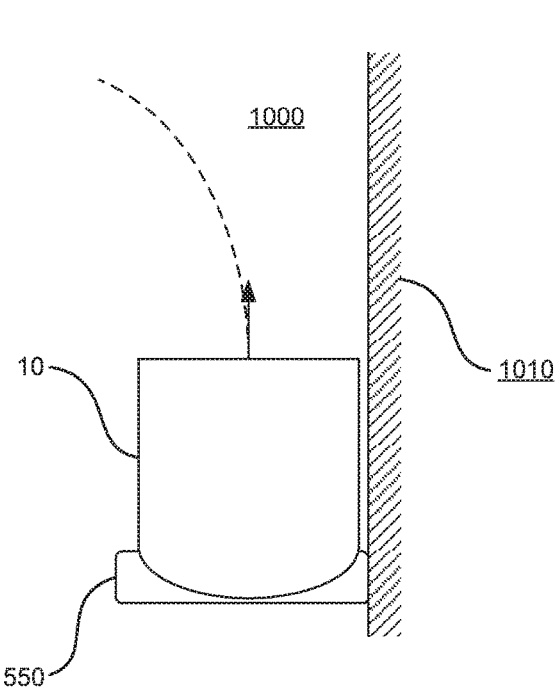
Figure 14A
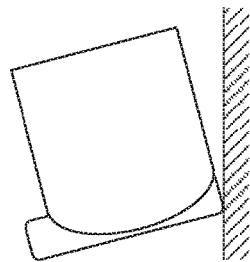
Figure 14B(ii)
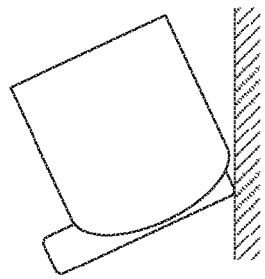
Figure 14B(iii)
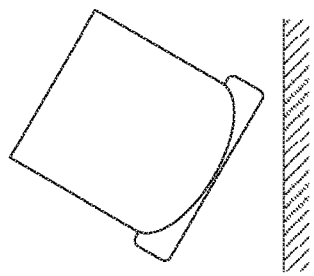
Figure 14B(iv)

WINDOW CLEANING ROBOT

TECHNICAL FIELD

The present invention relates to robotics and, in particular, to robotic window cleaners.

BACKGROUND

The use of automated devices is widespread nowadays, and finds countless applications. For instance, robots perform very precise and delicate tasks in the construction of electronic devices, or in medicine and aviation. Robots are also used in applications which require motion, notably, for automatic warehouses, where goods are retrieved and stored by means of computer-actuated robots. Other applications include, e.g., fetching raw materials in the course of industrial manufacturing, and removing and packaging finished pieces.

Attempts have also been made to exploit robots for tasks around the home or garden, such as lawn mowing, snow-blowing, leaf-clearing, floor cleaning, pool cleaning and vacuum cleaning.

By their very nature, autonomous machines such as robots represent a significant labour-saving for consumers. Repetitive and time-consuming tasks may now be carried out without significant supervision or instruction by the user of such autonomous machines.

Window cleaning is an example of such a repetitive and time-consuming task. A robotic window cleaner may be valuable not only in reducing manual labour, but also in allowing the cleaning of window surfaces that are usually hard to access, such as the external surfaces of windows and/or windows that are high above the ground.

A few window cleaning robots are currently available to the consumer, such as the WinBot and Hobot. However, in many respects, robotic window cleaners have not yet been perfected.

SUMMARY

In a first aspect, the following disclosure describes a window-cleaning robot comprising: a movement system configured for moving the robot over a window surface and operable with a predefined forwards direction of movement; at least one agitator configured for removing debris from a window surface; at least one cleaning pad for removing debris from the window surface, the at least one cleaning pad arranged on the robot to follow the at least one agitator when the movement system moves the robot in the predefined forwards direction of movement; and wherein said at least one agitator and said at least one cleaning pad are arranged such that, as said movement system moves the robot over the window surface in said forwards direction, the at least one agitator addresses a first width in a width direction, which is perpendicular to said forwards direction and parallel to the window surface, and at least one cleaning pad addresses a second width in said width direction, said first width being substantially equal to or greater than said second width.

In some examples, each of said at least one agitator is elongate in said width direction. Optionally, each of the at least one cleaning pad is elongate in said width direction.

The robot may further comprise one or more reservoirs fillable with cleaning fluid, the one or more reservoirs being fluidically connected so as to supply said cleaning fluid to said at least one cleaning pad.

Optionally, each of said at least one cleaning pad comprises a cloth that is wettable by said cleaning fluid, preferably wherein said cloth is a microfiber cloth.

In some examples, the robot may further comprise one or more polishing pads configured to contact the window surface and, thereby, to polish it when the robot is moved over the window surface using said movement system. Optionally, each polishing pad polishes the window surface such that any layer of cleaning fluid present on the window surface is left as a thinner layer and/or is dispersed over a greater area after the polishing pad passes over it. Optionally, each polishing pad polishes the window surface such that variation in the depth of any layer of cleaning fluid present on the window surface is reduced after the polishing pad passes over it. Optionally, said at least one polishing pad is arranged such that, as the robot moves over the window surface in said forwards direction, the at least one polishing pad addresses a third width in said width direction, said third width being substantially equal to said second width. Optionally, each polishing pad is elongate in said width direction. Optionally, said at least one polishing pad comprises a rearwards one or more polishing pads, said the at least one cleaning pad being located beyond said rearwards one or more polishing pads in said forwards direction. Optionally, said one or more polishing pads additionally comprise a forwards one or more polishing pads, which are located beyond said cleaning pads in said forwards direction. Optionally, said forwards one or more polishing pads are substantially the same as said rearwards one or more polishing pads. Optionally, each polishing pad comprises a cloth that is wettable by said cleaning fluid. Optionally, each cleaning pad cloth and each polishing pad cloth is formed of fibres, the fibres of said cleaning pad cloths being substantially finer than those of the polishing pad cloths.

In some examples, the robot may further comprise an attachment system, for attaching the robot to the surface of a window, the attachment system comprising: at least one first sealing member, each of which is attached to the robot and configured to contact the surface of a window so as to seal a respective space between the robot and the window surface; one or more vacuum pumps, operable to reduce the air pressure within the spaces sealed by said one or more first sealing members; wherein, with respect to said width direction said at least one first sealing member lies substantially wholly within said first width.

In some examples, said at least one agitator is located beyond said one or more first sealing members in said forwards direction.

In some examples, said at least one first sealing members is located beyond said at least one cleaning pad in said forwards direction.

The robot may comprise one or more processors. Optionally, each first sealing member is an active-mode sealing member, the one or more processors being programmed to operate in one or more active modes, where the robot moves over the surface of window, using said movement system, and the vacuum pump(s) are caused to reduce the air pressure within the spaces sealed by the active-mode sealing members to a sufficient extent to attach the robot to the window surface, while permitting movement of the robot over the window surface.

In some examples, said agitator may comprise a brush. In addition, or instead, said at least one agitator is configured such that debris is substantially swept clear of said at least one cleaning pad. Optionally, each of the at least one agitator is rotatable. Optionally, the axis of rotation of each of the at least one agitator is parallel to the window surface. Optionally, the axis of rotation of each of the at least one agitator is parallel to the width direction. Optionally, the direction of rotation is such that the portions of each agitator contacting the window surface are moving generally in said forwards direction. Optionally, the agitator is substantially less wettable by said cleaning fluid than said cleaning pad.

In a further aspect, the following disclosure describes a window-cleaning robot comprising: one or more processors; an attachment system, for attaching the robot to the surface of a window, the attachment system comprising: an active-mode sealing member, attached to the robot and configured to contact the surface of a window so as to seal a respective space between the robot and the window surface; one or more paused-mode sealing members, each of which is attached to the robot and configured to contact the window surface so as to seal a respective space between the robot and the window surface; and one or more vacuum pumps, which are operable to reduce the air pressure within the spaces sealed by the active-mode sealing member and the one or more paused-mode sealing members; and a movement system, configured to move the robot over the window surface; the one or more processors being programmed to operate in a paused mode, where the one or more processors cause the robot to remain stationary on the surface of the window, and one or more active modes, where one or more processors cause the robot to move over the surface of window, using said movement system; the one or more processors being additionally programmed such that, in each of said one or more active modes, the vacuum pump(s) are caused to reduce the air pressure within the space sealed by the active-mode sealing member to a sufficient extent to attach the robot to the window surface, while permitting movement of the robot over the window surface; the robot being additionally programmed such that, in said paused mode, they cause the one or more vacuum pumps to reduce the air pressure within the spaces sealed by the paused-mode sealing member(s) to a sufficient extent to attach the robot to the window surface.

In some examples, said one or more vacuum pumps consume significantly less power in said paused mode than in said active modes.

In some examples, the robot may further comprise one or more air pressure sensors, each air pressure sensor being arranged to sense the air pressure within the space between a corresponding one of the one or more paused-mode sealing members and the window surface, wherein the one or more processors are programmed such that the one or more vacuum pumps are operated in dependence upon the air pressure within the respective spaces between the one or more paused-mode sealing members and the window surface, as measured by the one or more air pressure sensors. Optionally, the one or more processors are further programmed such that, during said paused mode, they cause the one or more vacuum pumps to reduce the air pressure within the respective spaces sealed between the paused-mode sealing member(s) and the window surface, as measured by the air pressure sensor(s), to below a first threshold value and, thereafter, it deactivates the one or more vacuum pumps until the air pressure within the space sealed by the one or more paused-mode sealing members, as measured by the one or more air pressure sensor, rises above a second threshold value.

In some examples, each of the one or more paused-mode sealing members is moveable between a first position, where it is spaced apart from the window surface, and a second position, where it contacts the window surface so as to seal said space between the robot and the window surface. Optionally, each of the one or more paused-mode sealing members are biased towards said first position. Optionally, movement between said first position and said position includes deformation of the one or more paused-mode sealing member; the first position may, for example, correspond to a substantially undeformed state of each paused-mode sealing member.

In some examples, the one or more processors may be further programmed such that, during said paused mode, they causes each of the one or more paused-mode sealing members to move to said second position and, during each of said active modes, it causes each of the one or more paused-mode sealing members to return to said first position.

In some examples, the active-mode sealing member and said one or more paused-mode sealing members are arranged such that said active-mode sealing member remains in contact with the window surface whether the robot is operating in said paused mode or in any of the active modes.

In some examples, the robot may further comprise a respective internal space for each of said one or more paused-mode sealing members, said one or more vacuum pumps being configured to reduce the air pressure within said internal spaces so as to move each of said one or more paused-mode sealing members to said second position. Optionally, the robot may further comprise, for each of said one or more paused-mode sealing members, a respective valve and a respective conduit, each conduit connecting the internal space for the corresponding one of the paused-mode sealing members with the space sealed by that paused-mode sealing member via the corresponding one of said valves; wherein each valve permits the passage of air through the corresponding one of the conduits when the pressure within the corresponding internal space is below a third threshold value and inhibits the passage of air through the corresponding one of the conduits when the pressure within the corresponding internal space is above said third threshold value.

In some examples, said at least one vacuum pump includes first and second sets of vacuum pumps, said first set being dedicated to said active-mode sealing member and said second set being dedicated to said one or more paused-mode sealing members. Optionally, each vacuum pump within said first set comprises one or more impellers. Optionally, each vacuum pump within said second set is a diaphragm vacuum pump. In some examples, the first set may consist of a single vacuum pump; in other examples, a dedicated vacuum pump is provided for each paused-mode sealing member. In some examples, the second set consists of a single vacuum pump.

In some examples, said one or more paused-mode sealing members are located within said active-mode sealing member.

In a still further aspect, the following disclosure describes a window-cleaning robot comprising: a main body; a movement system, mounted on said main body and configured to move the robot over the surface of a window; a cleaning pad member, which comprises one or more cleaning pads, each cleaning pad being configured to be wetted with a cleaning fluid and to contact the window surface so as to remove debris therefrom with the aid of the cleaning solution; wherein the cleaning pad member is moveably mounted on the main body such that when the cleaning pad member contacts a frame for the window, the frame pushes the cleaning pad member, causing the cleaning pad member to move with respect to the body thereby allowing at least a portion of the main body to approach closer to said window frame.

In some examples, the cleaning pad member is moveably mounted on the main body such that when the cleaning pad member contacts a frame for the window, the cleaning pad member moves with respect to the body thereby allowing at least a portion of the main body to approach closer to said window frame in at least one of the following situations: when turning on the spot adjacent to the window frame; when moving along a curved path that passes through a point adjacent the frame; and when moving along a path substantially parallel to the window frame.

Optionally, the cleaning pad member is moveably mounted at a location adjacent a first end of the main body. Optionally, the profile of the main body, when viewed from the side that contacts the window surface, is narrower at said first end. Optionally, the movement system has a forwards direction and an opposing rearwards direction, and wherein said first end is the rearwards end of the main body. Optionally, the portion of the main body on which the cleaning pad member is mounted, when viewed from the side that contacts the window surface, has a curved profile.

In some examples, the cleaning pad member is moveably mounted on the main body such that the cleaning pad member is mechanically biased towards a central position. Optionally, the movement system has a forwards direction, and wherein, in said central position, the cleaning pad member is aligned, along said forwards direction, with the main body.

In some examples, the cleaning pad member, and optionally the cleaning pad, is elongate in a first direction and is moveably mounted on the main body such that movement is restricted to said first direction. Optionally, the movement system has a forwards direction, which is perpendicular to said first direction.

In some examples, the movement system has a forwards direction and wherein the cleaning pad member defines the width of the robot in a width direction, which is perpendicular to the forwards direction and parallel to the plane of the window surface.

In some examples, the robot further comprises a mechanical arm, the cleaning pad member being moveably mounted on the main body using said arm, preferably wherein the mechanical arm pivots on the main body.

In yet a further aspect, the following disclosure describes a window cleaning robot comprising: one or more processors; at least one orientation sensor, one or more processors being programmed to determine a robot orientation using said at least one orientation sensor; wherein one or more processors are programmed to operate in a plurality of operation modes; and wherein the one or more processors are programmed so as to allow the user to select one of said operation modes, the user-selected operation mode being determined by the one or more processors based at least in part on the robot orientation.

The orientation sensor(s) may, for example, comprise a gyroscope and/or an accelerometer.

In some examples, the robot further comprises an operation mode control, actuation of which determines, in part, said user-selected operation mode. Optionally, said operation mode control has an unactuated and an actuated state and, for example, is biased towards the unactuated state.

In some examples, said plurality of operation modes comprises a paused mode, where the robot remains stationary on the surface of the window, and a plurality of active modes, where the robot moves over the surface of window; and In some examples, each actuation of said operation mode control switches the robot between said paused mode and a user-selected one of said active modes, the user-selected active mode being determined based on the robot direction. Optionally, said at least one active mode includes a spot cleaning mode where the robot window cleaner is configured to clean a predetermined area local to the robot, optionally wherein said spot cleaning mode is selected when the robot direction is generally horizontal. Optionally, said at least one active mode includes a "full cleaning" mode where the robot window cleaner is configured to clean substantially the entire surface of the window, optionally wherein said full cleaning mode is selected when the robot direction is generally vertical. Optionally, said at least one active mode includes one of: a "scan down" mode, where the robot is configured to clean the surface of the window below the robot's current height; and a "scan up" mode where the robot is configured to clean the surface of the window above the robot's current height; optionally wherein the respective one of said "scan down" and "scan up" modes is selected when the robot direction is generally horizontal. Optionally, said at least one active mode includes: a "scan down" mode, where the robot is configured to clean the surface of the window below the robot's current height; and a "scan up" mode where the robot is configured to clean the surface of the window above the robot's current height; optionally wherein said "scan down" mode is selected when the robot direction is generally horizontal and towards a predetermined one of the left-hand side and the right-hand side of the window and said "scan up" mode is selected when the robot direction is generally horizontal and towards the other of the left-hand side and the right-hand side of the window. Optionally, said at least one active mode includes a return to docking station mode where the robot window cleaner is configured to move to a docking station.

In some examples, said at least one active mode includes one or more "scanning" modes, wherein, in each "scanning" mode, the one or more processors are programmed to cause the robot to clean a central portion of the window surface, which is substantially the entire window surface, with the exception of a perimeter portion of the window surface adjacent the edge of the window. The perimeter portion of the window surface may, for example, extend a distance less than the width of the robot from the edge of the window.

Optionally, in each of said "scanning" modes, the robot is programmed to move along a path defined in the robot's programming such that it comprises a plurality of parallel first segments, each of which extends parallel to a scanning direction corresponding to that "scanning" mode, thereby cleaning said central portion of the window surface. The first segments may, for example, make up the majority of the length of the path. Each of said first segments may, for instance, extend from a position adjacent one edge of the window to a position adjacent the opposite edge of the window surface.

In some examples, the one or more processors are programmed to determine which of said scanning directions is closest to said robot direction and to select the "scanning" mode corresponding to that closest scanning direction. The "scanning" modes may, for example, include a "vertical scanning" mode, having a vertical scanning direction, and a "horizontal scanning" mode, having a horizontal scanning direction. In some cases, the "scanning" modes consist of said "vertical scanning" and "horizontal scanning" modes.

In some examples, in each of said "scanning" modes, the path is defined in the programming of the one or more processors such that the path further comprises a series of second segments, each of which links together two of said first segments. Optionally, in at least one of said "scanning" modes, the path is defined in the programming of the one or more processors such that said second segments are turning segments, where the robot carries out a generally smooth turn. As a further option, in at least one of said "scanning" modes, the path is defined in the programming of the one or more processors such that said second segments are perpendicular to said first segments.

In some examples, the robot may further comprise a movement system having a defined forwards direction, the robot direction being determined by the one or more processors in such a way that it is parallel to said forwards direction.

In a still further aspect, the following disclosure describes a window cleaning robot comprising: one or more processors; at least one orientation sensor, the robot being configured to determine its orientation using said orientation sensor(s); and/or at least one proximity sensor, the robot being configured to determine whether it is in close proximity to the surface of a window using said at least one proximity sensor; the robot additionally comprising an attachment system configured to provide an attachment force by which the robot is attached to the window surface; wherein the one or more processors are programmed so as to cause the attachment force to be varied based on the robot orientation, as determined using said orientation sensor(s) and/or the proximity of the robot to the surface of the window, as determined by said at least one proximity sensor.

The orientation sensor(s) may, for example, comprise a gyroscope and/or an accelerometer.

In examples where the robot comprises at least one proximity sensor, the one or more processors may be programmed to increase the attachment force to above a first threshold value when they determine that the robot is in close proximity to the surface of the window using the at least one proximity sensor.

In examples where the robot comprises at least one orientation sensor, the one or more processors may be programmed such that, when they determine that the robot is in close proximity to the surface of the window using the at least one proximity sensor, they cause the attachment force to be increased to a level that is greater than said first threshold value by an amount determined in accordance with the robot orientation with respect to the horizontal, as determined using said orientation sensor(s). Optionally, the amount determined in accordance with the robot direction is substantially equal to zero where the robot orientation is within a predetermined angular range of the horizontal.

Optionally, the one or more processors may be programmed such that, when they determines that the robot is not in close proximity to the surface of the window using the at least one proximity sensor, the attachment force is set to a level that is equal to or less than a second threshold value.

In some examples, the second threshold value may be substantially equal to zero. Optionally, the first threshold value is equal to said second threshold value. Optionally, the first threshold value is substantially equal to zero.

In some examples, the variable attachment force may be provided by suction. In such examples, the robot may further comprise an air pressure sensor configured to measure an air pressure in the attachment system. Further, the one or more processors may be programmed to vary the attachment force based on the air pressure measured by said air pressure sensor. In addition, or instead, the one or more processors may be programmed so as to increase the attachment force to above a threshold value when the air pressure measured by said air pressure sensor drops below a predetermined pressure. The predetermined pressure may, for example, be a predetermined amount below local atmospheric pressure. The one or more processors may optionally be programmed to determine local atmospheric pressure by use of said air pressure sensor when the robot is not attached to the window surface. The attachment system may optionally further comprise an impeller, wherein the attachment force is varied by varying the speed at which the impeller turns.

In some examples, the one or more processors may be programmed so as to vary said attachment force so as to keep the robot window cleaner attached to the window surface.

In some examples, the one or more processors may be programmed to cause the attachment system to increase the level of the variable attachment force when unwanted motion of the robot window cleaner is detected. The robot may suitably further comprise one or more navigation sensors, the one or more processors being programmed to determine the motion of the robot relative to the window using said one or more navigation sensors; wherein the robot is programmed to detect unwanted motion using said one or more navigation sensors. Optionally, the robot further comprises an undriven wheel arranged to roll over the window surface as the robot moves over the window surface; and wherein at least one of said one or more said navigation sensors is a sensor configured to detect the rotation of said undriven wheel. Suitably, at least one of the one or more navigation sensors is a sensor operable to sense the relative motion of the robot, for example: an odometer; an accelerometer; a gyroscope; and/or a magnetometer. Optionally, at least one of said one or more navigation sensors is a sensor configured to sense the distance to a frame of the window extending perpendicular to the surface of the window.

In still another aspect, the following disclosure describes a window cleaning robot comprising: one or more processors; a movement system, configured to move the robot over the surface of a window and, thereby, to enable the robot to clean the window surface; at least one orientation sensor, the one or more processors being programmed to determine the orientation of the robot using said at least one orientation sensor; at least one distance sensor configured to detect the distance between the robot and the frame of the window; wherein the one or more processors are programmed to cause the robot to move, using said movement system, over the window surface, navigating based on measurements provided by said orientation sensor(s) and said distance sensor(s).

In some examples, the one or more processors are further programmed to use said measurements provided by the orientation sensor(s) and the distance sensor(s) to move along a path over the window surface.

The orientation sensor(s) may, for example, comprise a gyroscope and/or an accelerometer.

Suitably, the path is such that the robot does not pass over the same portion of the window surface twice while moving along said path. In addition, or instead, the path may not cross itself.

In some examples, the movement system has a forwards direction. In such examples, the path is such that the robot cleans the window surface in a single continuous forwards movement. Optionally, the path starts adjacent the top of the window and finishes adjacent the bottom of the window. Suitably, the distance sensor(s) is directed generally in said forwards direction.

In some examples, the path is defined in the programming of the one or more processors such that the path comprises a plurality of parallel first segments, each of which preferably extends from a position adjacent one edge of the window to a position adjacent the opposite edge of the window surface and more preferably extends across substantially the whole of the window surface. In one example, the path is defined in the robot's programming such that said first segments are oriented vertically. In another example, the path is defined in the robot's programming such that said first segments are oriented horizontally.

Suitably, the path is defined in the programming of the one or more processors such that the path further comprises a series of second segments, each of which links together two of said first segments.

In one series of examples, the path is defined in the programming of the one or more processors such that said second segments are turning segments, where the robot carries out a generally smooth turn. The path may optionally be defined in the programming of the one or more processors such that the robot begins each of said turning segments when said distance sensor(s) indicates it is a predetermined distance, d, from the window frame. In addition or instead, the path may be defined in the programming of the one or more processors such that the robot ends each of said turning segments when said orientation sensor(s) indicates that the robot is parallel to the direction of said first segments.

In another series of examples, the path is defined in the programming of the one or more processors such that said second segments are perpendicular to said first segments. The path may optionally be defined in the programming of the one or more processors such that the robot begins each of said second segments when said distance sensor(s) indicates it is a predetermined distance, d, from the window frame.

In some examples, the robot further comprises at least one window presence sensor(s), which is configured to detect the presence of the window adjacent a portion of the robot. Suitably, the movement system has a forwards direction and said window presence sensor(s) is arranged such that it detects the presence of the window adjacent a portion towards the forward end of the robot. The one or more processors may optionally be programmed to navigate based on measurements provided by said orientation sensor(s), said distance sensor(s) and said window presence sensor.

In some examples, the one or more processors may be further programmed such that, in the case where the robot is moving and, because the frame does not extend around the whole of the window, the measurement from said distance sensor(s) is erroneous and, as a result, the robot continues to the edge of the window, the one or more processors respond to said window presence sensor(s) indicating that the window is not adjacent said portion of the robot by causing the robot to carry out a rearwards movement away from the window edge. The rearwards movement may, for example, be for a predetermined distance. The one or more processors may optionally be further programmed such that, once said rearwards movement is complete, they cause the robot to continue moving along said path. In addition, or instead, the one or more processors may be further programmed to measure a distance L corresponding to one or more of said first segments and to cause the robot to begin each of said second segments when it has traveled a distance I since the preceding second segment, where I is greater than or equal to L, preferably wherein I is greater than L by a predetermined amount. Hence or otherwise, the robot may further comprise at least one sensor operable to sense the relative motion of the robot (for example: an odometer; an accelerometer; and/or a gyroscope). The one or more processors may optionally be further programmed to measure the distance L corresponding to one or more of said first segments using said sensor(s) operable to sense the relative motion of the robot. The one or more processors may optionally be further programmed to measure the distance traveled during said rearwards movement.

In a still further aspect, the following disclosure describes a window-cleaning robot including a movement system, configured to move the robot over a window surface and, thereby, to enable the robot to clean the window surface, the movement system having a forwards direction and comprising: a first and a second set of wheels configured to contact the window surface, each of said wheels being rotatable about a corresponding axis, said axes being parallel to a width direction, which is perpendicular to said forwards direction, said first set of wheels being spaced apart from said second set of wheels in said width direction; and at least one motor for driving said wheels, said wheels thereby propelling the robot over the window surface; wherein the wheels within each of said first and said second sets are mechanically linked such that rotation of any one wheel within a set causes movement of the other wheels within that set.

The robot may optionally further comprise one or more support members configured to contact the window surface, said one or more support members being spaced apart from said first set of wheels and from said second set of wheels in said forwards direction. Optionally, the at least one support member comprises a rotatable member, for example an undriven wheel, said undriven wheel is, for instance, configured such that its axis of rotation pivots freely about an axis perpendicular to said width and said forwards directions.

In some examples, the wheels within each of said first and second sets are aligned in said forwards direction.

Optionally, the at least one motor includes a first motor for driving said first set of wheels and a second motor for driving said second set of wheels.

The robot may optionally further comprise one or more common gears for each of said first and said second sets of wheels, wherein the wheels within each of said first and said second sets of wheels are mechanically linked by the corresponding one or more common gears, which assist in transferring rotation from the respective one of said first and said second motors.

In some examples, the robot may further comprise an attachment system, which maintains the robot in contact with the window by producing an attachment force perpendicular to the window surface, preferably wherein said attachment force is provided by suction generated by the attachment system. Optionally, the attachment force causes each wheel to deform, thus increasing the contact area between the window surface and the wheel in question.

In a still further aspect, the following disclosure describes a window cleaning robot comprising: one or more processors; a movement system, configured to move the robot over the surface of a window and, thereby, to enable the robot to clean the window surface; wherein the one or more processors are programmed to operate in a "full cleaning" mode, where the robot is caused to separately carry out an interior movement pattern and a perimeter movement pattern, so as to clean substantially the entire surface of the window;

wherein, said perimeter movement pattern is defined in the programming of the one or more processors such that the robot carries out at least one circuit of the perimeter of the window surface, thus cleaning a strip of the window surface that extends around the perimeter of the window surface and is bounded by the edge of the window surface; and wherein said interior movement pattern is defined in the programming of the one or more processors such that the robot cleans the area located within said strip of the window surface.

In some examples, the interior movement pattern may be defined in the programming of the one or more processors such that the robot follows a scanning path. The scanning path may, for example, not cross itself.

Suitably, the movement system has a forwards direction. The scanning path may, for example, be such that the robot cleans the window surface in a single continuous forwards movement. In addition, or instead, the scanning path may start adjacent the top of the window and finish adjacent the bottom of the window.

In some examples, the interior movement pattern may be defined in the programming of the one or more processors such that the scanning path comprises a plurality of parallel first segments, each of which preferably extends from a position adjacent one edge of the window to a position adjacent the opposite edge of the window surface and more preferably extends across substantially the whole of the window surface. In one example, the path is defined in the programming of the one or more processors such that said first segments are oriented vertically. In another example, the path is defined in the programming of the one or more processors such that said first segments are oriented horizontally.

Suitably, the interior movement pattern is defined in the programming of the one or more processors such that the path further comprises a series of second segments, each of which links together two of said first segments. In one series of examples, the interior movement pattern is defined in the robot's programming such that said second segments are turning segments, where the robot carries out a generally smooth turn; the robot may, for example, begin each of said turning segments when the robot is a predetermined distance, d, from the window frame; the robot may, for instance, end each of said turning segments when said orientation sensor(s) indicates it is parallel to the direction of said first segments. In another series of examples, the interior movement pattern is defined in the robot's programming such that said second segments are perpendicular to said first segments; the robot may, for example, begins each of said second segments when the robot is a predetermined distance, d, from the window frame.

In still another aspect, the following disclosure describes a window-cleaning robot comprising: a movement system, configured to move the robot over a window surface; one or more cleaning pads, configured to be wetted with a cleaning fluid and to contact the window surface so as to remove debris therefrom with the aid of the cleaning solution; and one or more polishing pads configured to contact the window surface and, thereby, to polish it when the robot is moved over the window surface using said movement system, each polishing pad polishing the window surface such that any layer of cleaning fluid present on the window surface is left as a thinner layer and/or is dispersed over a greater area after the polishing pad passes over it.

In some examples, the movement system has a defined forwards direction and said one or more cleaning pads are arranged such that, as the robot moves over the window surface in said forwards direction, they together address a first width in a width direction, which is perpendicular to said forwards direction and parallel to the window surface. Each cleaning pad may, for example, be elongate in said width direction. Optionally, the one or more polishing pads are arranged such that, as the robot moves over the window surface in said forwards direction, they together address a second width in said width direction, said second width being substantially equal to said first width.

The one or more polishing pads may for example comprise a rearwards one or more polishing pads, said one or more cleaning pads being located beyond said first one or more polishing pads in said forwards direction. The one or more polishing pads may additionally comprise a forwards one or more polishing pads, which are located beyond said cleaning pads in said forwards direction. The forwards one or more polishing pads may be substantially the same as said rearwards one or more polishing pads.

In some examples, the robot may further comprise one or more reservoirs fillable with cleaning fluid, the one or more reservoirs being fluidically connected so as to supply said cleaning fluid to said one or more cleaning pads.

Optionally, each cleaning pad comprises a cloth that is wettable by said cleaning fluid, said cloth may for example be a microfiber cloth. Each polishing pad may optionally comprise a cloth that is wettable by said cleaning fluid. Each cleaning pad cloth and each polishing pad cloth may be formed of fibers, with the fibers of said cleaning pad cloths being substantially finer than those of the polishing pad cloths.

BRIEF DESCRIPTION OF THE DRAWINGS

The invention will now be described with reference to the drawings, in which:

FIG. 7A is a side view of a cross-section through the robot of FIGS. 2 to 4, illustrating the location of the sealing foil with respect to other components of the robot;

FIG. 7B is a detail view of FIG. 7A that illustrates the configuration of the sealing foil prior to engagement with the window surface;

FIG. 13C is a perspective view of a cross-section through the cleaning pad member and the mount therefor provided on the main body of the robot;

FIG. 14A is a plan view of the robot of FIGS. 2 to 4 carrying out a turn adjacent the frame of the window;

FIGS. 14B(i)-14B(iv) are plan views of the robot of FIGS. 2 to 4 at respective points in the turn illustrated in FIG. 14A;

DETAILED DESCRIPTION

Figure 1:
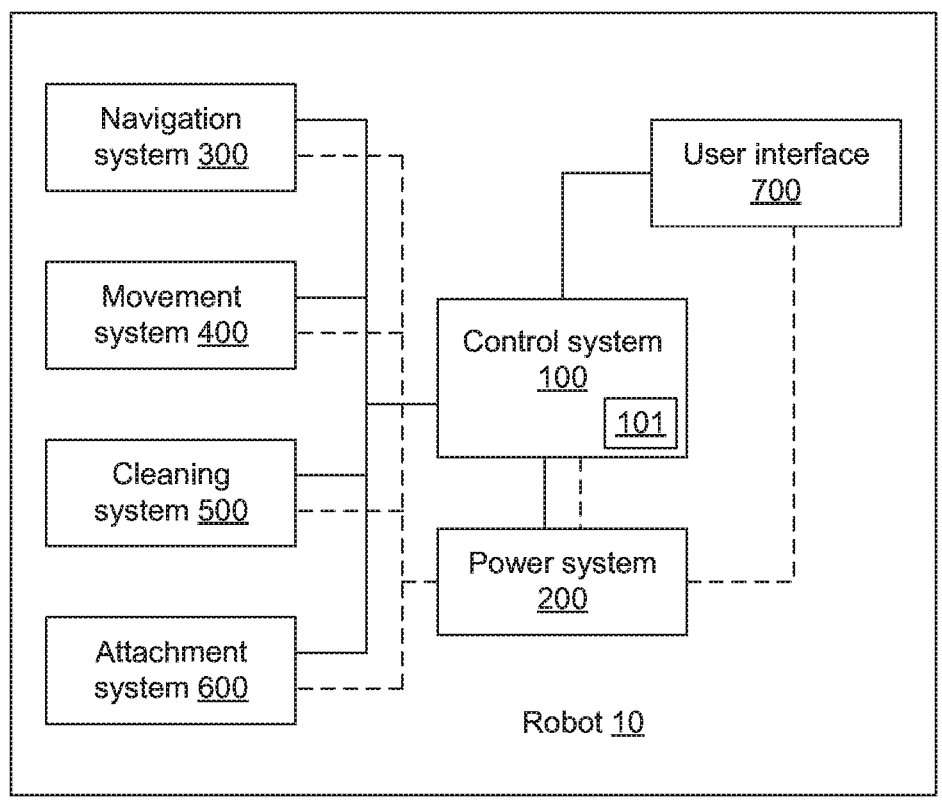
FIG. 1 illustrates schematically an example of a robotic window cleaner and the systems thereof.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method, with various computer components. The computer components may be in the form of hardware embodiment, software (including firmware, resident software, micro-code, etc.) or an embodiment combining software and hardware aspects that may all generally be referred to herein as a "circuit", "module" or "system.".

Turning now to FIG. 1, there is shown schematically an example of a window-cleaning robot 10, in which various aspects of the present invention may be embodied, and details the systems included therein. As is shown in the drawing, the robot 10 includes: a movement system 400, for moving the robot over the surface of the window; a navigation system 300, to enable to robot to navigate around the surface of the window; an attachment system 600, to enable the robot to attach itself to the window surface (and to keep it attached thereto); a cleaning system 500, for removing dirt, debris and the like from a portion of the window surface adjacent the robot, as the robot moves over the window surface; a power system 200, for powering the various systems, components etc. within the robot; a control system 110, for communicating with and controlling the systems of the robot; and a user interface 700, enabling the user to input commands, information and the like to control the robot's operation and providing an indication to the user of the robot's current state.

The control system 110 may, for example, include a main board, and all electronics, as hardware, software and combinations thereof and other components, necessary for the robot 10 to perform all of its operations and functions (known as the main board electronics). The main board includes one or more processors 101 as part of the main board electronics.

As indicated in the drawing with solid lines, the navigation, movement, attachment, cleaning, power and user interface systems are in data communication with the control system, so that the control system can receive data from and/or send instructions to these systems.

The power system 200 may, for example, include: an internal power supply, including one or more batteries (typically rechargeable); battery voltage sensors, typically for each battery, that enable the robot to determine when the power supply is running low; and charging contacts, that enable electrical connection to an external power source so as to allow the internal power supply to be charged. The charging contacts may be connectable to an electrical lead that is connectable, for instance with standard plug, to an external power supply, such as a mains power supply; the lead may include a transformer, where appropriate.

As discussed above, the power system 200 may have a data connection to the control system 110 so that the control system can receive data from the power system, for example relating to the current power level of the internal power supply (e.g. using battery voltage sensors).

The robot 10 may be designed such that it can be received by a docking station (not shown) which the robot 10 will return to once its task is complete (e.g. for orderly control and arrangement of the robot), and/or when its internal power supply is running low. While in this docking station, various functions can occur, such as battery recharging (e.g. by means of charging contacts) and the like.

The power system 200 may, instead of having an internal power supply (or in addition to having an internal power supply) rely on power from an external power supply, such as the mains power supply. Where the power system relies solely on power from an external power supply, charging contacts may not be included, but the power system 200 may nonetheless include an electrical lead connectable to an external power source; such an electrical lead may be built-in to the robot 10, so that it cannot be removed by the user and will not detach during normal operation.

As shown by dotted lines in FIG. 1, the power system is electrically connected to the control, navigation, movement, cleaning and attachment systems, and the user interface, so as to supply electrical power to these systems and their components.

The navigation system 300 may include a number of sensors that enable the robot to navigate around the surface of the window, when moving using the movement system 400. For instance, the navigation system 300 may include: sensors that enable the robot to determine its current distance from the window frame (which will typically extend perpendicular to the window surface); sensors that enable the robot to detect the presence of the window surface adjacent a portion of the robot; sensors that enable the robot to determine its current orientation (e.g. with respect to gravity or a predetermined orientation). As shown in FIG. 1, the navigation system 300 is in data communication with the control system 100. The control system 100 may therefore receive data from the navigation sensors and control the movement system 400 in dependence upon such data.

As noted above, the attachment system 600 enables the robot to attach itself to the window surface and keeps it attached thereto. The attachment system 600 may, for example, utilise suction forces to attach the robot to the window surface. Accordingly, it may, for instance, include one or more vacuum pumps to provide a suction force and one or more sealing members that contact the window surface so as to seal a space between the robot and the window surface, with the vacuum pump(s) being configured to reduce the air pressure in this space.

The attachment system 600 might instead (or in addition) utilise magnetic forces to attach the robot to the window surface. Accordingly, the user may be provided with a paired device that is placed on the opposite surface of the window to the side on which the robot operates, with the robot and the paired device being magnetically attracted to each other. Hence, the robot and/or the paired device may, for instance, include one or more magnetic members, such as electromagnets or permanent magnets.

As shown in FIG. 1, the attachment system 600 is in data communication with the control system 100 and may therefore receive commands from the control system 100 and send status information to the control system 100. For example, the control system 100 may command the attachment system 600 to increase the attachment force.

The movement system 400, as noted above, enables the robot to move over the surface of the window. Accordingly, it may, for instance, include wheels, tracks and the like that contact the window surface and apply a force thereto so as to drive the robot over the window surface. As shown in FIG. 1, the movement system 400 is in data communication with the control system 100 and may therefore receive commands from the control system 100. For example, the movement system 400 may be commanded by the control system to move the robot along a path calculated by the processor(s) 101 within the control system 100.

In some arrangements, the movement 400 and attachment 600 systems may be combined, such as where a number of elements each provide a separate attachment force and are moveable with respect to each other. One example of such a combined attachment and movement system is where two or more separate sealing elements are provided that are moveable with respect to each other; each of the sealing elements may be provided with a dedicated vacuum pump in such a situation.

The cleaning system 500, as noted above, removes dirt, debris and the like from a portion of the window surface adjacent the robot, as the robot moves over the window surface, using the movement system 400. The cleaning system may include, for example, a cleaning pad that is wetted with cleaning fluid, a reservoir for cleaning fluid, a water hose. Although in FIG. 1 the cleaning system 500 is shown as being in electrical communication with power system 120 and in data communication with control system 100, in some arrangements, the cleaning system might include no powered components, in which case, such connections to the power 200 and control 100 systems would be unnecessary. In some arrangements, the cleaning system 500 may be combined with the attachment system 600, for example, where a suction force is applied through a cleaning pad. In further arrangements, the cleaning 500, attachment 600 and movement 400 systems might all be combined, for example where a number of cleaning pads are provided that may move relative to one another, with a suction force being applied through each cleaning pad.

Turning now to the user interface 700, as noted above, this may enable the user to input commands, information and the like to control the robot's operation and may provide an indication to the user of the robot's current state. Accordingly, it may include a number of controls, such as buttons, dials and the like, and a number of indicators, such as a display screen, LEDs and the like, or a combination of both, such as a touchscreen. It may also include a wireless communication link, so as to connect with a user device, such as a smart-phone, tablet device, laptop, PC etc.

As shown in FIG. 1, the user interface 700 is in data communication with the control system 100. The user interface 700 may therefore receive status information from the control system 100 that it then displays or indicates to the user. Conversely, the control system 100 may receive user commands that are inputted using the user interface 700 and may, thereafter, send corresponding commands, for instance, to the movement 400, attachment 600 and cleaning 500 systems. For example, the user may use the user interface 700 to select one of a number of operation modes that the robot (specifically the processor(s) of the control system 100) has been programmed with and the control system 100 may thereafter command, for instance, the movement 400, attachment 600 and cleaning 500 systems in accordance with rules and procedures that are associated with the mode selected by the user.

Figure 2:
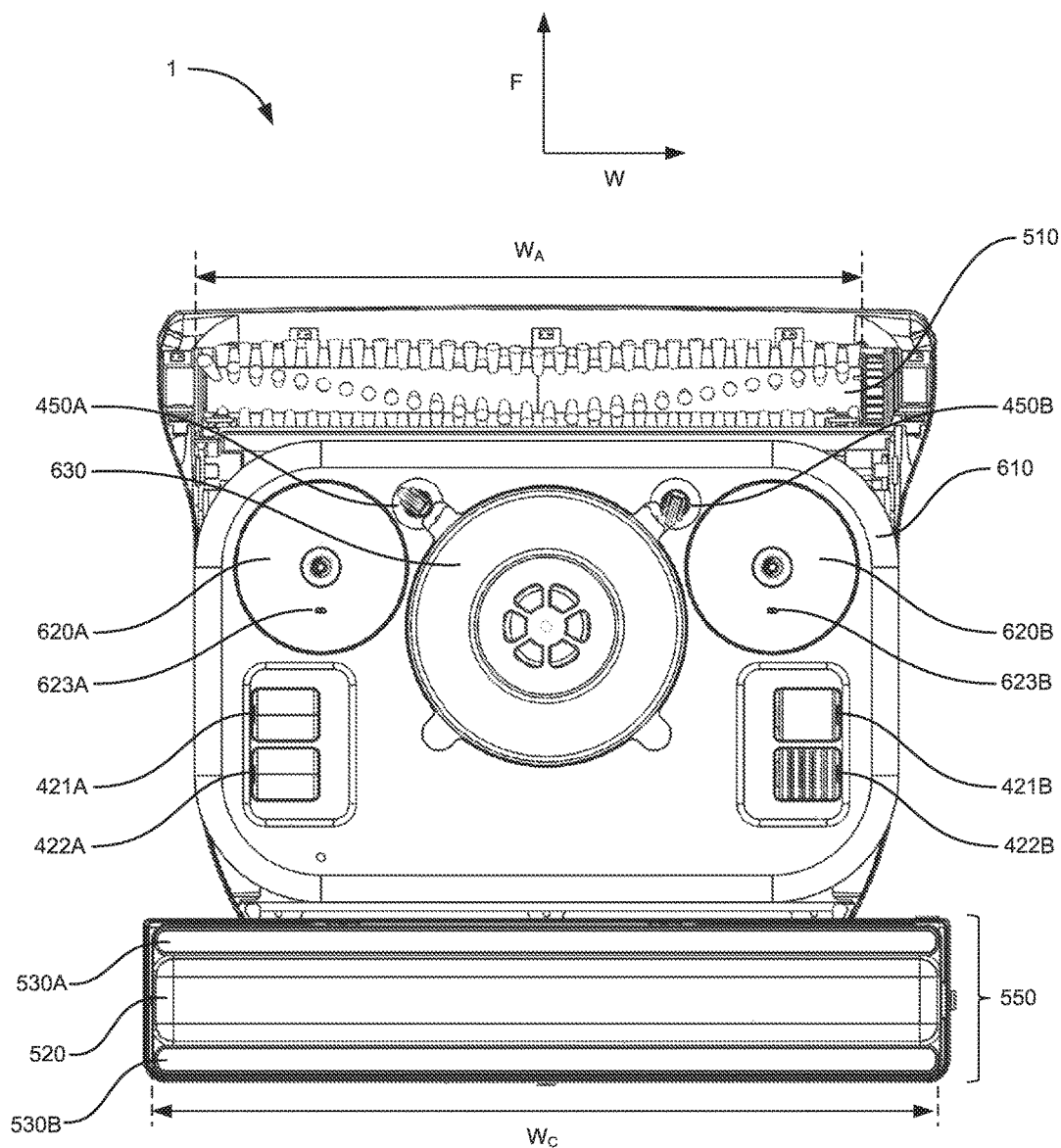
FIG. 2 is a plan view of the side of a window-cleaning robot that attaches to the surface of a window.
Figure 3:
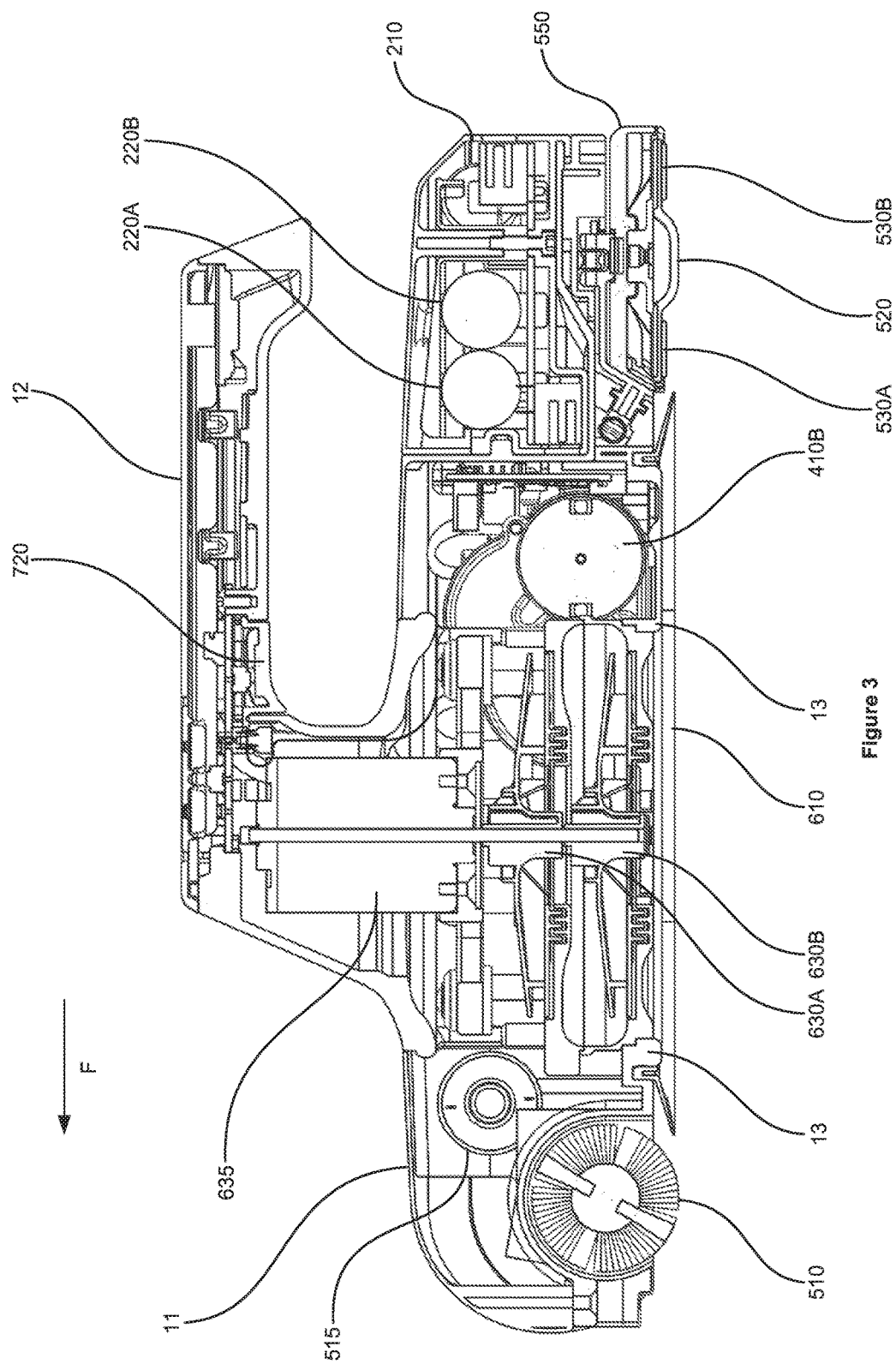
FIG. 3 is a cross-sectional side view of the robot of FIG. 2.

Attention is now directed to FIGS. 2 to 4, which illustrate a more specific example of a window-cleaning robot 1 that includes control 100, power 200, navigation 300, movement 400, cleaning 500 and attachment 600 systems and a user interface 700, which generally interact in the manner described above with reference to FIG. 1.

The robot 1 shown in FIGS. 2 to 4 is configured such that its movement system 400 has a defined forwards direction, which is indicated by arrow F in FIG. 2. In the specific example shown, the forwards direction is perpendicular to the axes of rotation of the wheels 421A-422A, 421B-422B, as well as being parallel to the window surface, though with other movement systems 400 the forwards direction may be defined in different ways (e.g. in a system that uses continuous tracks, it may be parallel to the length direction of each such track).

The forwards direction F defines a "forwards" end for the robot 1; this is the uppermost end in FIG. 2, which is a plan view of the side of a window-cleaning robot that attaches to the surface of a window. By contrast, the lowermost end in FIG. 2 is the "rearwards" end.

FIG. 2 also indicates, using arrow W, a width direction for the robot, which is perpendicular to the forwards direction F and which is parallel to the window surface when the robot is attached thereto.

The forwards direction F may, for example, be distinguished from the opposite, rearwards direction in terms of the rules and policies by which the control system 100 operates the movement system 400. For instance, such rules and policies may be such that the robot 1 will move in the forwards direction D (upwards in FIG. 2, though not necessarily upwards with respect to gravity) with significantly greater regularity than in the opposite, rearwards direction (downwards in FIG. 2, though, similarly, not necessarily downwards with respect to gravity).

As may also be seen from FIG. 2, in terms of its structure of the robot 1 has fairly distinct front, middle and rear sections.

In the specific example of a robot shown in FIG. 2, the middle section provides many of the components for the attachment system 600 and the movement system 400 of the robot 1.

Figure 5:
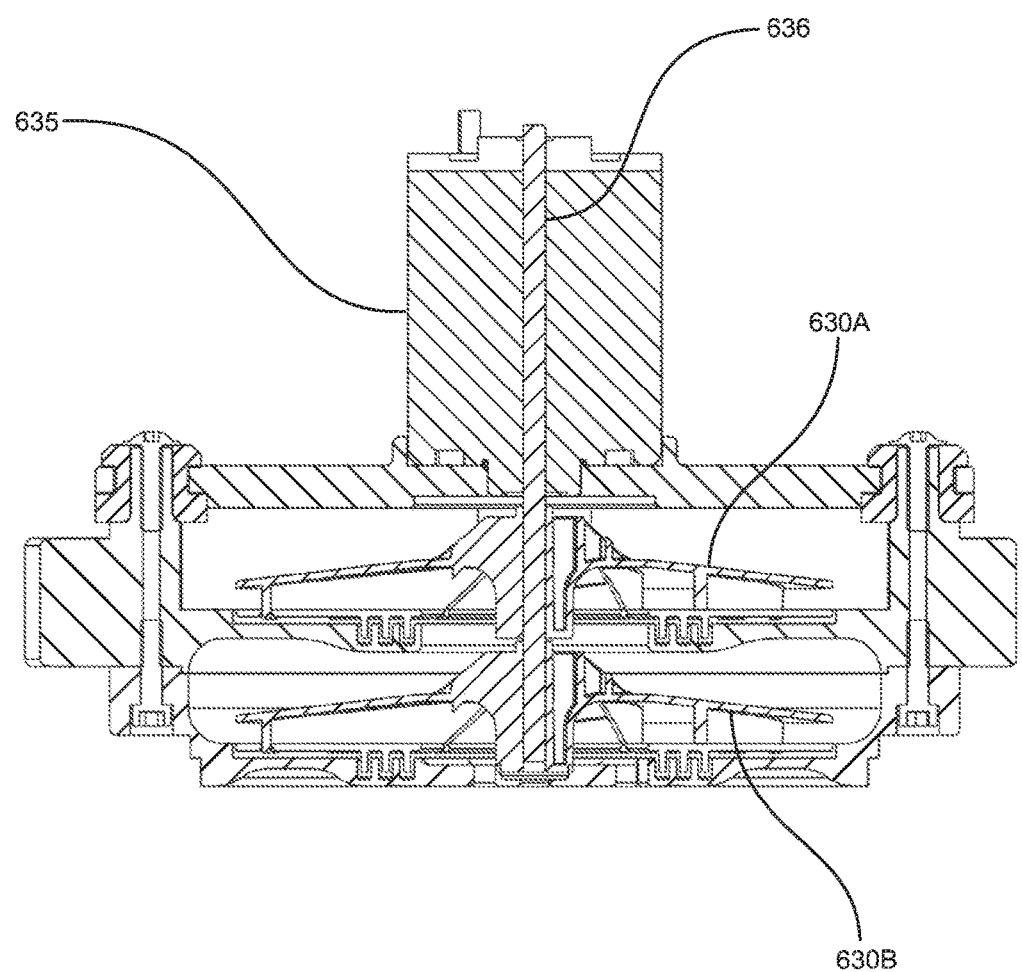
FIG. 5 is a view of a cross-section through the impeller-based vacuum pump of the robot of FIGS. 2 to 4.

In more detail, the middle section includes a sealing member 610, which comprises a thin foil surrounding seal, and a vacuum pump, which, in the example shown, is based on a double rotating impeller 630. The inlet for the impeller 630 near-most the window surface is clearly visible in FIG. 2. The double impeller 630 is shown in greater detail in FIG. 5, which is a view of a cross-section through the impeller-based vacuum pump. As may be seen in the drawing, the impellers 630A, 630B are arranged coaxially, with one impeller located directly over the other. The impeller-based vacuum pump further includes a motor 635, which drives the impellers 630A, 630B by means of shaft 636, causing them to rotate about an axis that is generally perpendicular to the window surface. Such a double-stage impeller may be efficient both in term of space and also power, thus reducing power consumption, as well as generating little noise. However, a single impeller or multiple impellers could be employed instead.

The sealing member 610 and the impeller-based vacuum pump both form part of a suction-based attachment system 600 for the robot.

The middle section further includes two sets of drive wheel pairs 421A-422A, 421B-422B, where the wheels of each pair are driven with the same transmission and thus move at the same velocity, as well as castor wheels or sliding points 450A, 450B. In the particular example of a robot shown, wheels 421A-422A, 421B-422B are covered by a soft tire (for example, formed of rubber or polyurethane) with a high friction coefficient in respect of glass. The drive wheel pairs 421A-422A, 421B-422B and castor wheels or sliding points 450A, 450B form part of a movement system 400 for the robot shown in FIG. 2.

As may be seen from FIG. 3, which is a cross-sectional side view of the robot 1 of FIG. 2, the robot includes a chassis 13, which supports and/or contains many of the components of the robot. As is also shown in FIG. 3, the drive wheels 421A-422A, 421B-422B and castor wheels or sliding points 450A, 450B form a plane which is about 1-2 mm from the surface of the chassis 13 that is near-most the window surface. The sealing foil 610 (which is shown in greater detail in FIGS. 6 and 7) is mounted on the chassis 13 in a manner that closes this gap and thus seals a space, or chamber, between the robot and the window surface. The impeller 630 may then remove air from this space, thus creating a vacuum which attaches the robot 1 to the window surface. The attachment force created by this vacuum squeezes the tires against the window surface, thus increasing the area over which the wheels 421A-422A, 421B-422B contact the window surface, accordingly providing the wheels with a good grip on the window surface.

More particularly, to assist the robot in travelling over the window, the attachment system 600, for example using the impeller-based vacuum pump 630, generates an attachment force that provides sufficient friction between the wheels 421A-422A, 421B-422B of the movement system 400 and the window surface for the robot 1 to be moved over the window surface without slipping. For example, where the robot is oriented vertically, the attachment system 600 may need to provide sufficient attachment force such that the wheels 421A-422A, 421B-422B have sufficient friction to exceed the gravitational force applied on the robot 1.

As the robot 1 moves over the window surface using the movement system 400, the sealing foil 610 slides on the window. The impeller-based vacuum pump 630 maintains a vacuum within the space sealed by the sealing foil 610; to do so, they may need to generate continuous flow of air, as some air will typically be lost as a result of the movement of the sealing foil 610 over the window surface. This may be particularly the case where the window is uneven or is especially dirty.

Figure 6A:
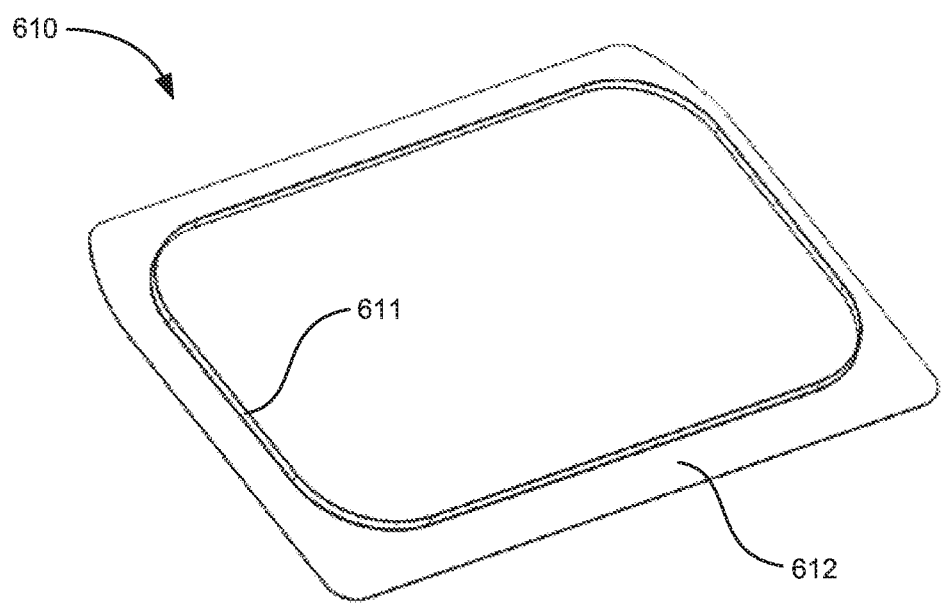
FIG. 6A is a perspective view of the sealing foil of the robot of FIGS. 2 to 4.
Figure 6B:
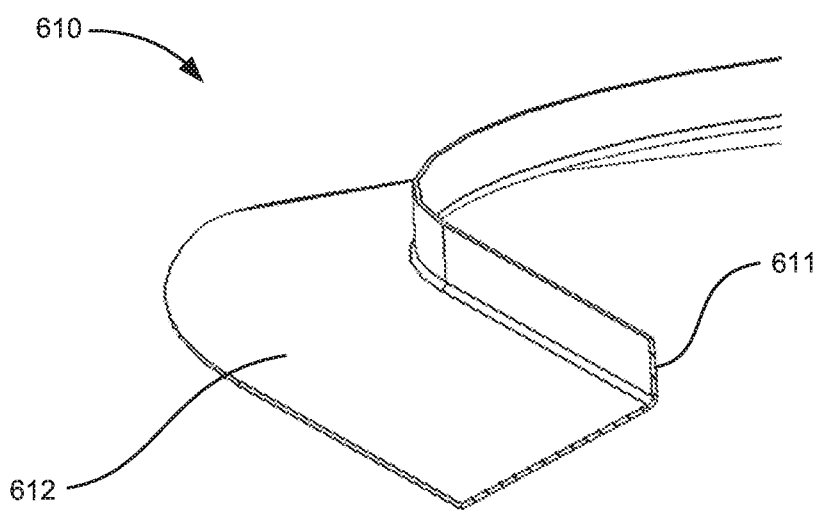
FIG. 6B is a perspective view of a cross-section through the sealing foil of FIG. 6A.

The structure of the sealing foil 610 of the robot of FIGS. 2 to 4 is shown in further detail in FIGS. 6 and 7. As may be seen from FIG. 6A, which is a perspective view of the sealing foil 610, the sealing foil 610 is generally rectangular in shape and has a top portion 611 that is joined to the robot (specifically, to the chassis 13) and a bottom portion 612 that is configured to engage with the window surface. As may be seen from FIG. 6B, which is a perspective view of a cross-section through the sealing foil 610, the bottom 612 portion is configured as a skirt, which flares outwards and downwards, whereas the top portion 611 extends generally upwards. As is also visible in FIG. 6B, the sealing foil 610 is a thin (e.g. around 0.25 mm) film of plastic. The sealing foil 610 may be formed of a material that has low friction when in contact with glass.

FIG. 7A, which is a side view of a cross-section through the robot 1, shows the location of the sealing foil 610 with respect to other components of the robot 1. The shape of the sealing foil 610 prior to engagement with the window surface 1000 is visible in FIG. 7B, which is a detail view of the robot 1 that shows the configuration of the sealing foil 610 prior to engagement with the window surface 1000. It should however be noted that in FIG. 7B the robot—with the exception of the sealing foil—is shown in engagement with the window surface 1000; accordingly, the sealing foil 610 is shown as extending through window surface 1000, whereas other features of the robot, such as wheels 421A-422A, 421B-422B, are shown engaged with the window surface 1000.

Figure 7C:
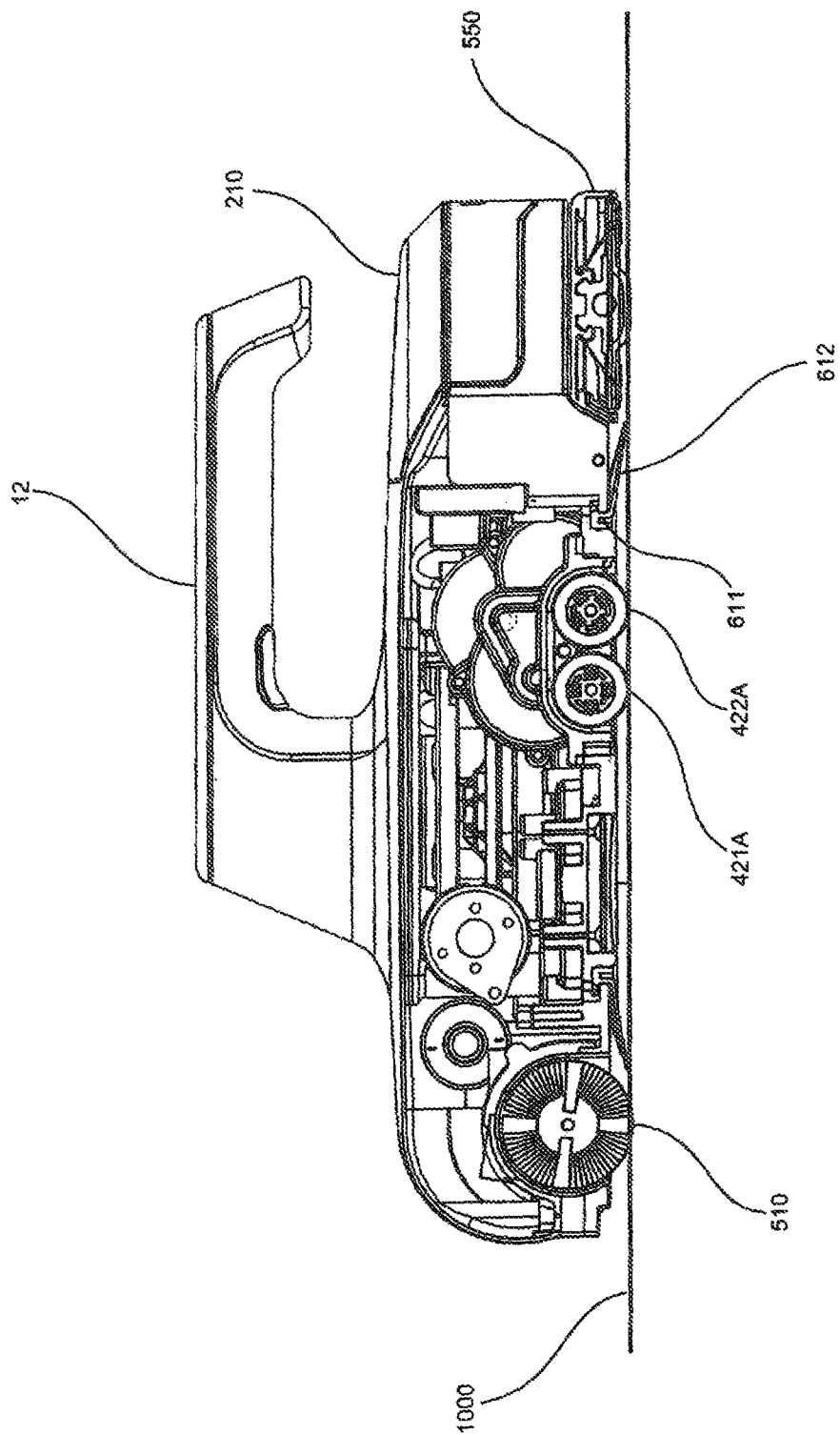
FIG. 7C is a detail view of FIG. 7A that illustrates the configuration of the sealing foil when engaged with the window surface.

FIG. 7C is a corresponding detail view of the robot 1 that shows the configuration of the sealing foil 610 when engaged with the window surface 1000. As in FIG. 7B, the wheels 421A-422A, 421B-422B of the movement system in contact with the window surface 1000. As may be seen from FIG. 7C, the sealing foil 610 generally touches the window only at its tip. This may reduce the amount of friction it creates as the robot moves over the window surface 1000. The shape of the sealing foil 610 may be such that the vacuum forces increase the contact area with the window surface 1000, thus improving the sealing. For instance, the bottom portion of the sealing foil 610 may flatten against the window surface 1000 as the pressure is reduced within the space sealed by sealing foil 610.

Returning now to FIG. 2, the middle section of the robot further includes two suction-cups 620A, 620B, which may provide a low-power "parking" mechanism, for instance for when the robot 1 is operating in a "paused" mode, where it does not move over the window surface 1000. These suction cups 620A, 620B are normally at the chassis surface level (for example so that they do not contact the window surface 1000 and thus generate additional frictional resistance to movement), but may be moved towards the window surface 1000 under the control of the control system 100, with a vacuum then being created within the space sealed by each suction-cup 620A, 620B using a vacuum pump 640.

Figure 4A:
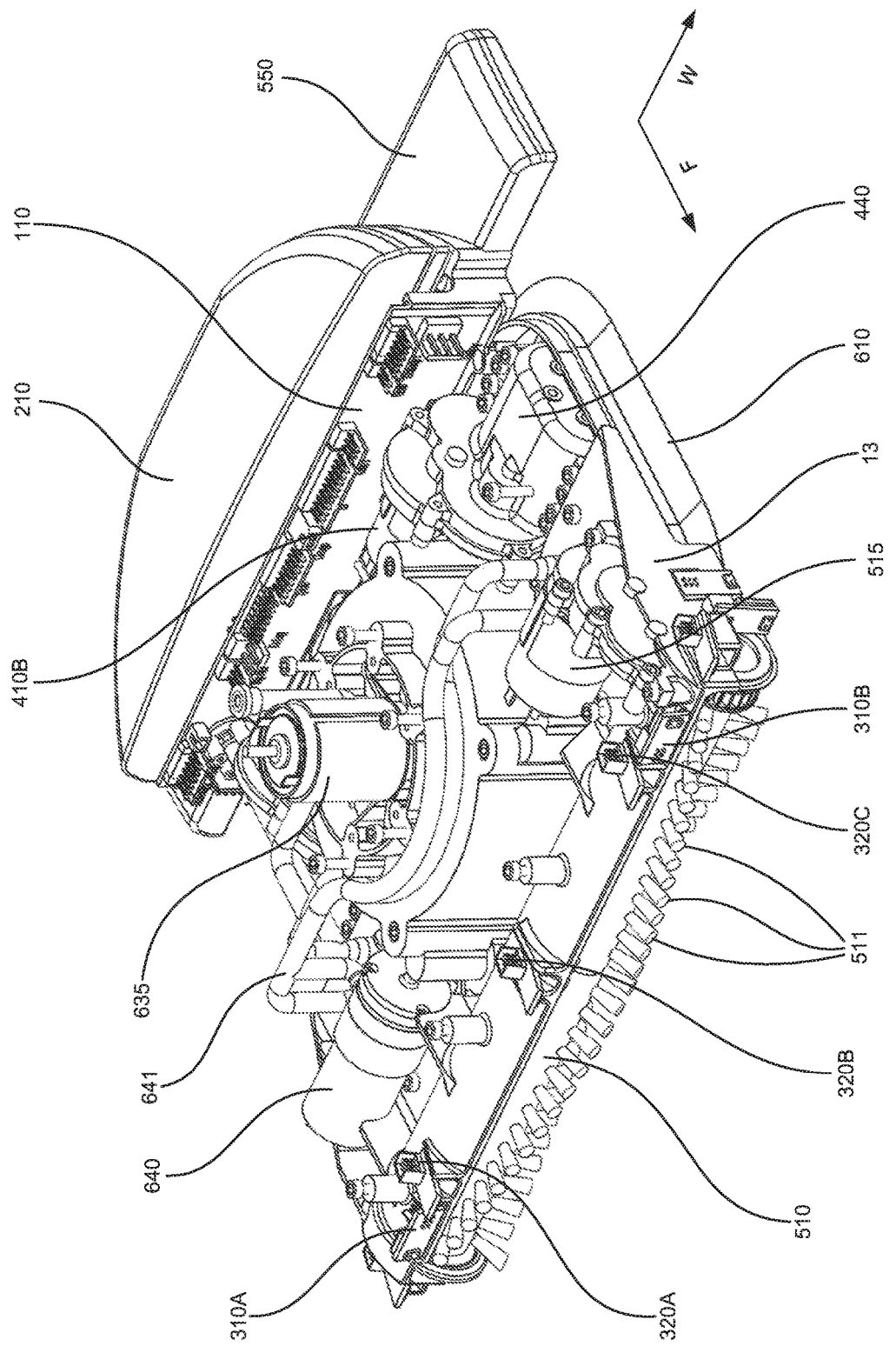
FIG. 4A is a perspective view of the robot of FIGS. 2 and 3 with its top cover removed so as to display various of the robot's internal components.

As may be seen from FIG. 4A, which is a perspective view of the robot 1 with its top cover 11 removed so that several of the internal components are visible, the vacuum pump 640 for the suction-cups 620A, 620B is separate from the double-impeller vacuum pump 630 that reduces the air pressure in the space sealed by the sealing foil. Further, the vacuum pump 640 for the suction-cups 620A, 620B may be of a different type to that for the sealing foil 610; for instance it may be a diaphragm vacuum pump. In the robot of FIGS. 2 to 4, a single vacuum pump 640 is shared between the two suction-cups 620A, 620B (the pipes 641 linking this vacuum pump 640 to the suction-cups 620A, 620B are clearly visible in FIG. 4A); however, it will be apparent that a dedicated vacuum pump could be provided for each suction-cup 620A, 620B.

As is shown in FIG. 2, each suction cup 620A, 620B has a hole 623 in its surface that communicates with a pressure sensor for sensing the pressure adjacent the suction cup 620A, 620B, in the space between the suction cup and the window surface 1000. These pressure sensors may form a further part of the attachment system 600. When the suction cup 620A, 620B is brought into contact with the window surface 1000 and seals a space between the robot and the window surface 1000, the pressure sensor enables the robot (specifically the control system 100) to determine the level of the vacuum in the thus-sealed space.

The front section of the robot, which is the uppermost section in FIG. 2, includes a powered agitator 510. In the specific example shown, the powered agitator is an agitating bristle brush that is driven by a geared motor 515, which is visible in FIG. 4A. More particularly, the agitator 510 rotates about an axis that is parallel to the window surface and to width direction W. This agitator 510 forms a part of the cleaning system 500 for the robot 1. As will be discussed in further detail below, the agitator 510 mechanically removes debris from the window surface 1000. In certain arrangements, it may be arranged so as to provide an initial heavy-duty dry cleaning of the window surface 1000 ("dry" in the sense that it may be arranged so as to be spaced apart from any sources of liquid, such as cleaning fluid or water). The agitator 510 may be driven at high speed, for example rotating at around 600 RPM. As the agitator 510 is located at the front of the robot 1, it will generally be applied to the window surface 1000 first as the robot 1 moves over the window surface 1000.

As indicated in FIG. 4A, the front section additionally includes window surface proximity sensors 320A, 320B, 320C and distance sensors 310A, 310B; in the specific example shown, these sensors are provided on the housing for the agitator 510. These proximity and distance sensors form a part of the navigation system 300 for the robot.

The proximity sensors 320A, 320B, 320C enable the control system 100 to determine whether the window surface 1000 is present adjacent a portion of the robot 1 (e.g. adjacent a portion of the side that is configured to engage with the window surface 1000). In addition, the control system 100 is able to use the proximity sensors 320A, 320B, 320C of the navigation system 300 to determine that a portion of the robot 1 has moved beyond the edge of the window surface, for example in the case of a frameless window.

As will be discussed in more detail below, the control system 100 may control the attachment system 600 based on the output from the proximity sensors 320A, 320B, 320C. For example, the control system 100 may only activate the attachment system when the proximity sensors 320A, 320B, 320C indicate that the robot 1 is adjacent the window surface 1000.

Various types of proximity sensors 320A, 320B, 320C can be used, such as those based on detecting reflected light or infra-red radiation, reflected ultrasound, and the like. For quantitative proximity measurement, time-of-flight based sensors may be used; these may similarly be based on reflected infra-red, light, ultrasound and the like. A particular example of a suitable time-of-flight sensor is the VL6180 optical time-of-flight sensor, supplied by ST Microsystems.

The distance sensors 310A, 310B may be such quantitative proximity sensors and may therefore be time-of-flight sensors (e.g. VL6180 optical time-of-flight sensors). The distance sensors 310A, 310B may be arranged so as to be forwards looking and may, therefore, be mounted at the front of the robot 1. For instance, they may be located on top of (as shown in the example of FIG. 4A) or in front of the agitator 510. The distance sensors 310A, 310B enable the control system 100 to determine the robot's current distance from the frame for the window. Such distance measurements allow the control system 100 to plan the robot's scanning trajectory, with the movement system 400 being directed by the control system 100 to carry out the scanning trajectory.

As may be seen from FIG. 2, the rear section of the robot, which is the lowermost section in FIG. 2, includes a cleaning pad member 550 that provides a cleaning pad 520 and a pair of polishing pads 530A,530B, one either side of the cleaning pad 520. As the cleaning pad 520 is at the rearwards end of the robot, it will generally be applied to the window surface 1000 after the agitator 510, as the robot moves over the window surface 1000 in the forwards direction F.

As is apparent from FIG. 2, the cleaning pad 520 addresses a width $W_C$ in the width direction W that is substantially the same as the width $W_A$ addressed by the agitator 510. Therefore, areas of the window surface 1000 addressed by the cleaning pad 520 will generally already been addressed by the agitator 510. As will be discussed in more detail below, this may provide a more effective clean of the window surface 1000 and/or may extend the lifetime of the cleaning pad 520.

As may also be seen from FIG. 2, the cleaning pad 520 is elongate in the width direction W. This may provide a more compact structure for the robot 1.

The cleaning pad member 550 may be moveably mounted on the main body 10. In the particular example shown in FIGS. 2 to 4, the cleaning pad member 550 of the robot 1 of FIGS. 2 to 4 is spring-loaded and free to move right/left in the width direction W, with respect to the chassis 13 of the robot 1 and thus with respect to the main body 10 of the robot 1.

As will be discussed in further detail below with reference to FIGS. 11 to 14, such an arrangement may allow embodiments of the robot 1 to drive next to the window frame, cleaning the window surface 1000 all the way to its edge without the robot body 10 touching the frame 1010. Such an arrangement may additionally (or instead) allow the robot to turn while it is near the frame 1010, as shown in FIG. 14. As the discussion further below notes, the cleaning pad may be moveably mounted on the main body of a robot in various ways: the construction shown in FIGS. 2 to 4 is simply one example of a way of achieving this.

As will also be discussed below with reference to FIGS. 11 to 14, the cleaning pad 520 may be mounted such that, during use, it is pressed against the window surface. This may assist in more effectively cleaning the window surface.

Furthermore, the cleaning pad 520 may, for example, be composed of a microfiber cloth. The microfiber cloth may be kept wet with a cleaning fluid that dissolves the salts, debris and oil stains on the surface. A reservoir containing cleaning fluid may be provided within the robot adjacent the cleaning pad 520 (for example, within the cleaning pad member) and may be configured to supply cleaning fluid to the cleaning pad 520. Alternatively, the user may apply cleaning fluid to the cleaning pad 520, for example by spraying the fluid onto the cleaning pad using a spray bottle. As a still further alternative, the robot might apply cleaning fluid directly to the window surface 1000, for instance at positions adjacent the cleaning pad 520, so that the cleaning pad will be wetted by the cleaning fluid shortly after application to the window surface 1000.

In the robot shown in FIGS. 2 to 4, the rear section further includes two elongate polishing pads 530A, 530B, as is perhaps best illustrated in FIG. 2.

As is apparent from FIG. 2, each of these polishing pads 530A, 530B addresses the same width We as the cleaning pad 520. so that the areas of the window surface 1000 addressed by the cleaning pad 520 are generally also addressed by the polishing pads 530A, 530B.

As is also apparent from FIG. 2, each of the polishing pads 530A, 530B is elongate in the width direction W; this may assist in providing the robot 1 with a compact structure. In the particular example shown, the polishing pads 530A, 530B are narrower than the cleaning pad and extend parallel to the length of the cleaning pad and to each other, and are disposed on either side of the cleaning pad.

The polishing pads 530A, 530B act to thin the layer of cleaning fluid left on the window surface 1000 by the cleaning pad 520, so that it dries evenly, thus providing a good finish. The polishing pads may be configured so as to be pressed against the window surface 1000 with a higher force than the cleaning pad.

As will be discussed in greater detail below, the robot 1 may move across and clean the window surface 1000 according to various strategies. For example, it may scan the vast majority of the window surface, except for a perimeter portion of the window surface adjacent the edge of the window, using an up/down or right/left repeating pattern as shown, respectively, in FIGS. 15-17 and 18. It may then cover the perimeter portion of the window surface by carrying out a circuit adjacent the window edge, as shown in FIG. 19.

As is also shown in FIGS. 3 and 4A, the rear section further includes batteries 220A-220C, which are provided within a battery housing as part of a battery module 210. The batteries 220A-220C will typically be rechargeable batteries, such as rechargeable Lithium ion batteries. The battery module 210 containing the batteries 220A-220C may be detachable, for instance to allow charging of the batteries 220A-220C contained therein and/or to allow it to be substituted for an extra battery module in the user's possession (e.g. a battery module that the user has already charged).

Figure 4B:
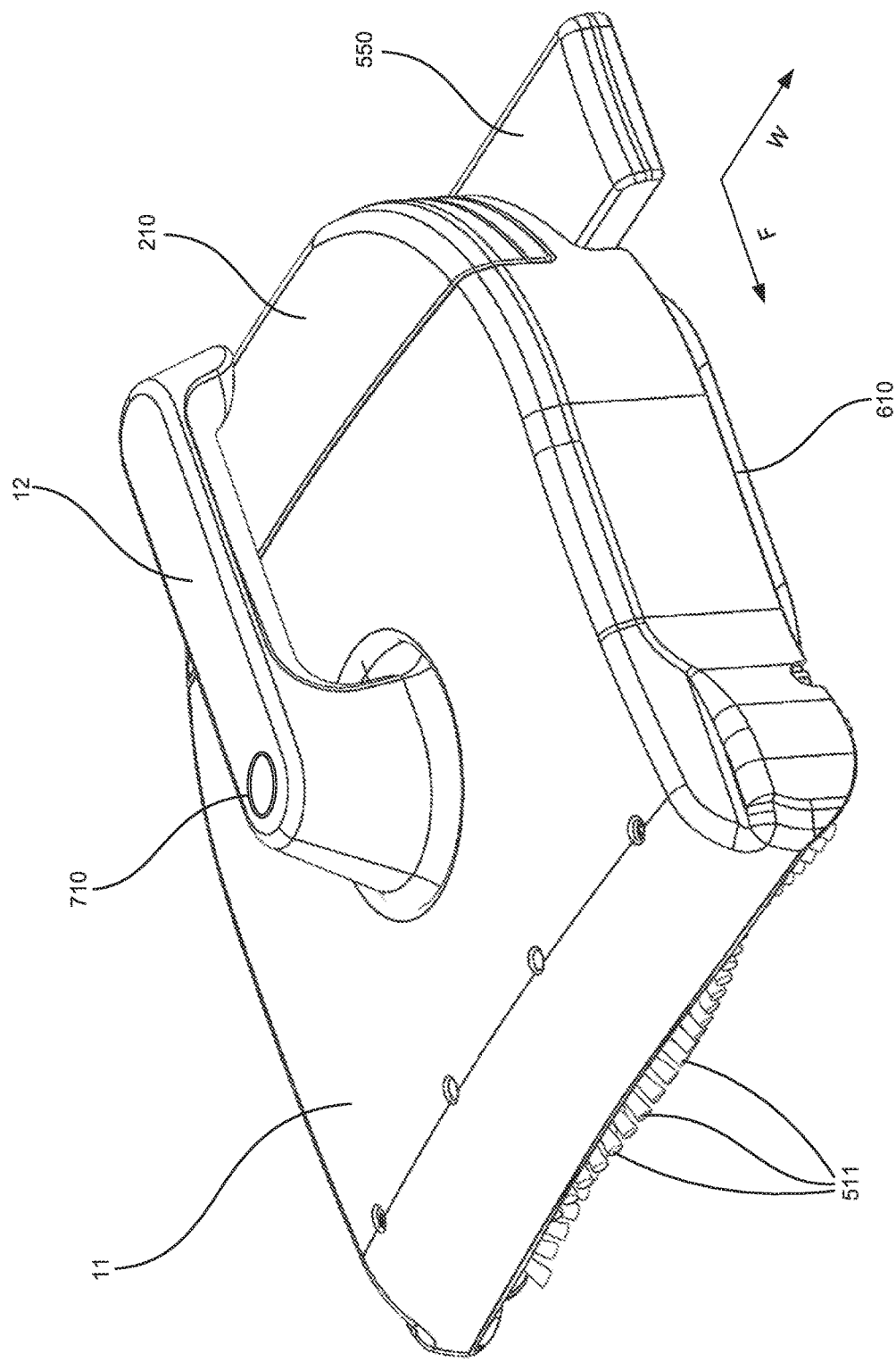
FIG. 4B is a perspective view of the robot of FIGS. 2 and 3 with the top cover in place.

Attention is now directed to FIG. 4B, which is a perspective view of the robot of FIGS. 2 and 3 with the top cover in place. As may be seen from FIG. 4B, a handle is 12 provided by the robot 1, which allows the user to more easily carry the robot 1 to the window and hold it while it attaches to the window surface 1000. In the robot 1 illustrated in FIGS. 2 to 4, this handle 12 is part of the top cover 11 for the robot 1.

Various user interface features may suitably be provided on the handle 12. For instance, a "play/pause" button 710 may be provided on the handle. This "play/pause" button switches the robot 1 between a "paused" mode, where it remains stationary on the surface of the window, and a user-selected one of a number of "active" modes, which have been programmed into the processor(s) 101 of the control system 100 and in which the moves, using the movement system 400, over the surface of the window. In addition or instead, the handle may contain a "release" button 720, which assists the user in removing the robot 1 from the window surface 1000. When depressed, the "release" button 720 causes the attachment system 600 to deactivate, such as by turning off the impellers 630 and/or disengaging the suction cups 620A, 620B from the window surface 1000.

Around the "play/pause" button 710 there may also be provided a number of indicators (e.g. LEDs) that provide the user with information about the current status of the robot, such as the current operation mode and battery status. The "play/pause" button, the "release" button 720 and these light indicators may each form a part of the user interface 700 for the robot 1 shown in FIGS. 2-4.

FIG. 4A also shows the main board 110 of the robot, which contains one or more processors (e.g. one or more microprocessors) and drivers for the various motors. These components may form part of the control system 100 for the robot. The main board 110 may additionally include navigation sensors, such as an accelerometer, a gyroscope (for measuring the robot orientation) etc. as well as air pressure sensors. It will of course be appreciated that these sensors could instead be provided remotely from the main board 110, in which case suitable electrical connections to the main board may be provided.

Cleaning System Including an Agitator and Cleaning Pad

The following section of the disclosure relates to the cleaning system of a robotic window cleaner.

Traditional window cleaning involves the wetting of the surface, for example with a cleaning solution (usually water with some soap) and then squeegeeing, in some specific pattern that prevents marks being left on the window surface (which are usually a result of uneven drying of the water layer residues). If the window is very dirty, then a pre-wash may be performed to wash all the dirt/mud off the window; in addition, suction might be used to remove the dirty water. Alternatively, some papers/cloths may be used to absorb the dirty water. All of these "traditional" methods are less appropriate for a robot cleaner since they require, in the case of washing with water, a connection to a water source or, for the robot itself to carry a water container onboard (which, being heavy, may be a significant drain on power usage and thus battery life, where the robot is battery powered), or, in the case of the use of papers/cloths, the frequent replacement of such papers/cloths, thus increasing the amount of user intervention required, which contradicts the labor-saving principle behind robotic systems.

Currently available robotic window cleaners, such as the WinBot and the Hobot, use cleaning pads that are wetted either manually by the user or by a dispenser. However, as mentioned above, when a window is really dirty, this may be ineffective or require frequent replacement of the pads.

In contrast, it is proposed to provide a robot that cleans the window surface using at least the following two steps:

1. Agitating: in this stage, a powered agitator (or several powered agitators), such as a rotating bristles brush, rotating pad or other device, excites the dust/debris on the window and forces it to leave the surface and fall down. This stage may be carried out in substantially dry conditions (for example, the agitator may be spaced away from the location(s) where the robot applies cleaning fluid to the window), thus allowing an easy removal of the dirt as well as keeping the agitator clean. Thus, the agitator(s) may be located towards the forwards end of the robot. In the example robot 1 of FIGS. 2 to 4, the agitator 510 is located forwards of the cleaning pad 520, so that it will typically be applied to the window surface 1000 prior to the cleaning pad 520.

The removal of the heavy dirt from the window in this way may reduce the need to collect it in the ways mentioned above (heavy watering, suction etc.), though these could be included if desired.

Where, as in the example robot of FIGS. 2-4, the attachment system for the robot is a suction/vacuum-based attachment system and includes a sealing member (or several sealing members), these sealing members may be arranged such that they lie substantially wholly within the width (perpendicular to the robot's forwards direction) that is addressed by the agitator(s) and such that they are located rearwards of the agitator(s). As a result, areas of the window surface that the sealing member(s) contact will generally already have been addressed by the agitator(s). This may improve the seal to the window surface provided by the sealing member(s), which in turn may increase the battery life of the robot, since the vacuum pumps may operate at lower power. This may be particularly beneficial with sealing members (referred to elsewhere herein as "active-mode sealing members) that are used to attach the robot to the window surface while it is moving, such as the sealing foil 610 of the robot 1 of FIGS. 2 to 4.

2. Wetting: in this stage a cleaning pad (or several cleaning pads), for example including a cloth (such as microfiber type), wetted with a cleaning solution, runs over the window surface in order to remove the salts or other sticky debris that could not be removed in the agitating stage.

The cleaning pad(s) are located rearwards of the agitator(s) and, moreover, the agitator(s) address a width that is substantially the same as (or greater than) that addressed by the cleaning pad(s). As a result, areas of the window surface addressed by the cleaning pad(s) will generally have already been addressed by the agitator(s). Since the areas addressed by the cleaning pad(s) will typically have already been cleaned of heavy dirt, the cleaning pad(s) can concentrate on removing salts or sticky debris. This may, for instance, provide a more effective clean of the window surface and/or may extend the lifetime of the cleaning pad(s) (since they will have to clean less of the heavy dirt from the window).

It should be noted that the requirement that the agitator(s) address a width that is substantially the same as (or greater than) that addressed by the cleaning pad(s), allows for the width addressed by the cleaning pad(s) to be slightly greater (e.g. by 5%) than the width addressed by the agitator(s). An example of this may be seen in the robot of FIGS. 2 to 4, where the width $W_C$ addressed by cleaning pad 520 is slightly greater than the width $W_A$ addressed by the agitator 510. It will be understood that, with such minor differences in the width addressed, it will nonetheless be the case that areas of the window surface 1000 addressed by the cleaning pad(s) will generally have already been addressed by the agitator(s).

In some cases, the agitator may be configured so that debris that it contacts is swept in such directions as to avoid the cleaning pad; that debris is swept clear of the cleaning pad. For instance, in the robot of FIGS. 2 to 4, the agitator rotates about an axis parallel to the width direction W in a direction so that the portions contacting the window surface 1000 are moving generally in the forwards direction (i.e. the clockwise direction as seen in FIG. 3).

A reservoir containing cleaning fluid may be provided within the robot adjacent the cleaning pad. This reservoir may be fluidically connected so as to supply cleaning fluid to the cleaning pad. Alternatively, such a reservoir may be fluidically connected so as to apply cleaning fluid directly to the window surface, for instance, at positions forwards of and adjacent to the cleaning pad, so that the cleaning pad will be wetted by the cleaning fluid shortly after the cleaning fluid is applied to the window surface. As a further alternative, the user may themselves apply cleaning fluid to the cleaning pad, for example by spraying the fluid onto the cleaning pad using a spray bottle.

The cleaning fluid may act to dissolve the salts, debris and oil stains on the surface. It may include solvents and/or soap. In addition, it may include various chemical components to accelerate the dehydration and break the liquid surface-tension. This may reduce the incidence of streak-marks on the window surface.

Where, as in the example robot of FIGS. 2-4, the attachment system for the robot is a suction/vacuum-based attachment system and includes a sealing member (or several sealing members), these sealing members may be arranged such that they are located forwards of the cleaning pad(s), as the cleaning fluid that the cleaning pad(s) spread over the window surface may weaken the seal to the window surface provided by the sealing member(s), which in turn may decrease the battery life of the robot, since the vacuum pumps may need to operate at higher power to keep the robot attached to the window surface. Such an arrangement may be particularly beneficial with sealing members (referred to elsewhere herein as "active-mode sealing members") that are used to attach the robot to the window surface while it is moving, such as the sealing foil 610 of the robot 1 of FIGS. 2 to 4.

The cleaning process may additionally include the following, optional step:

3. Polishing: in this stage a polishing pad (or several polishing pads), for example a more dense cloth (i.e. one with thicker fibers than those of the cleaning pad, for example a fabric similar to that used to clean glasses), is run over the surface. The polishing pad(s) may therefore act to, for example, further thin the cleaning solution layer (for faster and move even dehydration) and/or to polish and spread more evenly the residual cleaning fluid over the surface. As the human eye is very sensitive to differences, this may further improve the finish, making the window surface appear more "shiny" to the user. Hence (or otherwise), polishing pad(s) may be arranged rearwards of the cleaning pad(s). Further, they may address substantially the same width as the cleaning pad(s).

On the other hand, some (or possibly all) of the polishing pads may be arranged forwards of the cleaning pad(s). An example of this is provided by the robot of FIGS. 2 to 4, where one of the polishing pads 530A is located forwards of the cleaning pad 520 (with the other polishing pad 530B being located rearwards of the cleaning pad 520).

As in the robot shown in FIGS. 2 to 4, all the three above stages may be performed in one path, where the agitator is at the front of the robot and the cleaning pad and polishing pads following it. As an alternative, a symmetric arrangement could be provided, with an agitator (or a number of agitators) at the front and rear of the robot, with polishing and cleaning pads being located therebetween. Such an arrangement may, for example, enable the "agitating" stage of cleaning to occur prior to the "wetting" stage, regardless of whether the robot moves forwards or backwards over the window surface.

More generally, although the above cleaning strategy has been illustrated using the robot of FIGS. 2 to 4, it should be appreciated that such a cleaning strategy may be implemented with a wide range of robot constructions, since it does not rely on a particular movement, navigation, attachment system etc. in order to be implemented.

The robot of FIGS. 2 to 4 is therefore viewed as being a specific example of the much more general concept, whereby there is provided a window-cleaning robot comprising: a movement system configured for moving the robot over a window surface and operable with a predefined forwards direction of movement; at least one agitator configured for removing debris from a window surface; at least one cleaning pad for removing debris from the window surface, the at least one cleaning pad arranged on the robot to follow the at least one agitator when the movement system moves the robot in the predefined forwards direction of movement; and wherein said at least one agitator and said at least one cleaning pad are arranged such that, as said movement system moves the robot over the window surface in said forwards direction, the at least one agitator addresses a first width in a width direction, which is perpendicular to said forwards direction and parallel to the window surface, and at least one cleaning pad addresses a second width in said width direction, said first width being substantially equal to or greater than said second width.

The first width (that addressed by the agitator(s)) may, more particularly be a contiguous width. Hence, where there are a number of agitators, there may, for example, be no gap, in the width direction, between the width addressed by any one of the agitators and the consecutive agitator in the width direction. Similarly, the second width (that addressed by the cleaning pad(s)) may be a contiguous width. Hence, where there are a number of cleaning pads, there may, for example, be no gap, in the width direction, between the width addressed by any one of the cleaning pads and the consecutive cleaning pad in the width direction.

Cleaning System with a Cleaning and a Polishing Pad

The following section of the disclosure also relates to the cleaning system of a robotic window cleaner.

Testing carried out by the Applicant indicates that a good finish is provided when a robot has both one or more cleaning pads and one or more polishing pads. The cleaning pad(s) are wetted with a cleaning fluid and contact the window surface so as to remove debris therefrom with the aid of the cleaning solution. The polishing pad(s), polish the window surface when the robot is moved over it by thinning and/or dispersing the layer of cleaning fluid left by the cleaning pad(s). It is considered that, as the human eye is very sensitive to differences, this may improves the finish, making the window surface appear more "shiny" to the user.

The robot of FIGS. 2 to 4 is therefore viewed as being a specific example of the much more general concept, whereby there is provided a window-cleaning robot comprising: a movement system, configured to move the robot over a window surface; one or more cleaning pads, configured to be wetted with a cleaning fluid and to contact the window surface so as to remove debris therefrom with the aid of the cleaning solution; and one or more polishing pads configured to contact the window surface and, thereby, to polish it when the robot is moved over the window surface using said movement system, each polishing pad polishing the window surface such that any layer of cleaning fluid present on the window surface is left as a thinner layer and/or is dispersed over a greater area after the polishing pad passes over it.

As discussed in the previous section, a reservoir containing cleaning fluid may be provided within the robot adjacent the cleaning pad. This reservoir may be fluidically connected so as to supply cleaning fluid to the cleaning pad (rather than to the polishing pads; indeed, in some embodiments, the polishing pads will not be fluidically connected to any source of fluid or reservoir). Alternatively, such a reservoir may be fluidically connected so as to apply cleaning fluid directly to the window surface, for instance, at positions forwards of and adjacent to the cleaning pad, so that the cleaning pad will be wetted by the cleaning fluid shortly after the cleaning fluid is applied to the window surface. As a further alternative, the user may themselves apply cleaning fluid to the cleaning pad, for example by spraying the fluid onto the cleaning pad using a spray bottle.

Low-Power Attachment System

The following section of the disclosure relates to suction-based attachment systems for window-cleaning robots.

With robots having such suction-based attachment systems, because the user will not necessarily be near the robot when its battery runs low, it may be helpful to the user for the robot to be able to keep hanging on the window using its attachment system, perhaps for several hours, until the user is able to remove it.

It is therefore envisaged to provide a window-cleaning robot having an attachment system that includes both an active-mode sealing member (such as the sealing foil 610 of the robot of FIGS. 2 to 4) and one or more paused-mode sealing members (such as the suction cups 620A, 620B of the robot of FIGS. 2 to 4). Each of these sealing members seals a respective space between the robot and the window surface 1000.

In a similar manner to that described above, such a robot may be programmed (e.g. by suitable programming of its processor(s)) to operate in a "paused" mode, where the robot remains stationary on the surface of the window, and a number of "active" modes, where the robot moves over the surface of window, using its movement system.

According to concept(s) disclosed in this section of the disclosure, in the "paused" mode, the robot is programmed (e.g. by suitable programming of its processor(s)) so that the vacuum pumps of its attachment system reduce the air pressure within the spaces sealed by the paused-mode sealing members to a sufficient extent to attach the robot to the window surface.

Conversely, according to concept(s) disclosed in this section of the disclosure, in each of the "active" modes, the robot is programmed (e.g. by suitable programming of its processor(s)) so that the vacuum pumps of its attachment system are caused to reduce the air pressure within the spaces sealed by the active-mode sealing member to a sufficient extent to attach the robot to the window surface, while permitting movement of the robot over the window surface.

By providing separate active-mode and paused-mode sealing members, each type of sealing member may be better configured for these functions (active-mode sealing members provide a seal that is sufficient to attach the robot to the window surface, while permitting movement of the robot over the window surface, whereas paused-mode sealing members need only provide a seal that is sufficient to attach the robot to the window surface). Accordingly, the paused-mode sealing members may be configured to provide a tighter seal than the active-mode sealing members.

In addition, or instead, the paused-mode sealing members may be formed of material(s) that have a coefficient of friction with glass that is greater than the coefficient of friction with glass of the material(s) from which the active-mode sealing members are formed. This may, for example, assist the robot in "hanging" on the window surface during the paused mode and in moving over the window surface during the active modes.

The vacuum pumps of the attachment system may consume significantly less power in the "paused" mode than in the "active" modes. This might, for instance, result from the paused-mode sealing members being configured (e.g. in terms of their shape and/or material) to provide a tighter sealing than the active-mode sealing members and/or from more air leaking from the active-mode sealing members as a result of the movement during the active modes, thus leading to an inherently less tight seal than with the paused-mode sealing members.

The robot may include one or more pressure sensors (such as the pressure sensors provided within the holes 623A, 623B in the suction-cups 620A, 620B of the robot 1 illustrated in FIGS. 2 to 4). Each of these pressure sensors may be arranged to sense the pressure within the space sealed by a corresponding one of the paused-mode sealing members. The robot may be programmed (e.g. by suitable programming of its processor(s)) so as to operate the vacuum pumps in dependence upon the pressure within the paused-mode sealing members, as measured by these pressure sensors.

In a specific example, the robot may be programmed (e.g. by suitable programming of its processor(s)) such that, during the paused mode, it causes the vacuum pumps to reduce the pressure within the paused-mode sealing members (as measured by these pressure sensors) to below a first threshold value. This threshold value may, for example, be sufficient to ensure that the robot will typically remain attached to the window for a significant period of time, such as in the region of tens of minutes, or perhaps several hours. Once this pressure has been achieved, the vacuum pumps are deactivated until the pressure within the paused-mode sealing members (again, as measured by the pressure sensors), rises above a second threshold value (which will generally be greater than the first threshold value). This threshold level may be sufficient to ensure that the robot remains attached to the window surface for a significant period of time, albeit one that is typically shorter than the period of time corresponding to the first threshold value, such as several minutes.

In this way, the pressure reaching the first threshold value may be viewed as a warning that the robot may relatively soon detach from the window surface. Accordingly, once the pressure has reached (or indeed risen above) this second threshold value, the robot may reactivate the vacuum pumps until the pressure is again reduced to (or below) the first threshold value. Generally, the time taken to return the pressure to the first threshold value from the second threshold value, using the vacuum pumps, will be far shorter than the time taken for the pressure to increase from the first threshold value to the second threshold value, owing to leakage. Thus, the vacuum pumps will typically be active for only a very small proportion of the time that the robot is in "paused" mode.

It will be understood that the vacuum pumps could operate at a low level, rather than being deactivated, though it will be understood that deactivation may result in less power being consumed.

Each of the paused mode sealing members may be moveable between a first position, where it is spaced apart from the window surface, and a second position, where it contacts the window surface so as to seal a space between the robot and the window surface. The robot may be programmed (e.g. by suitable programming of its processor(s)) such that, during the active modes, the paused mode sealing members are moved to their respective first positions. As they do not contact the window surface in these first positions, they will not be a source of friction as the robot moves over the window surface. In contrast, the active-mode sealing members may remain in contact with the window surface whether the robot is operating in an active mode or in the paused mode and/or whether the paused-mode sealing members are in their first or second positions.

The movement between these first and second positions may include deformation of the paused-mode sealing members; for instance, the first position may correspond to each paused-mode sealing member being in an undeformed state and they may be moved into the second position by deformation, instead of, or in addition to, translation.

It will be appreciated that, the greater the amount of frictional resistance to movement that is experienced by the robot, the more force that is required to be produced by the movement system, thus generally increasing power consumption. In addition, the attachment system may need to provide a higher attachment force in order to enable the movement system to apply a greater force to the surface (e.g. using its wheels, tracks etc.) to move over the surface without slipping. Again, this generally increases power consumption.

Referring now to FIGS. 2 to 4, in this example of a window-cleaning robot 1, the paused mode sealing members comprise respective suction cups 620A, 620B, while the active-mode sealing member comprises a sealing foil 610.

As noted further above, the suction cups 620A, 620B of this robot 1 may provide a low-power "parking" mechanism when the robot is operating in a "paused" mode. Thus, the suction cups 620A, 620B, together with their associated mounting and connections, of the robot 1 of FIGS. 2 to 4 may be viewed as examples of paused-mode sealing members. As also noted further above, the suction cups 620A, 620B are normally at the chassis surface level, but may be moved towards the window surface 1000 under the control of the processor(s) 101 of the control system 100, with a vacuum then being created within the space sealed by each suction-cup 620A, 620B using a vacuum pump 640. Thus, they are each moveable between a first position, where they are spaced apart from the window surface 1000, and a second position, where they contact the window surface 1000 so as to seal a space between the robot 1 and the window surface.

Figure 8A:
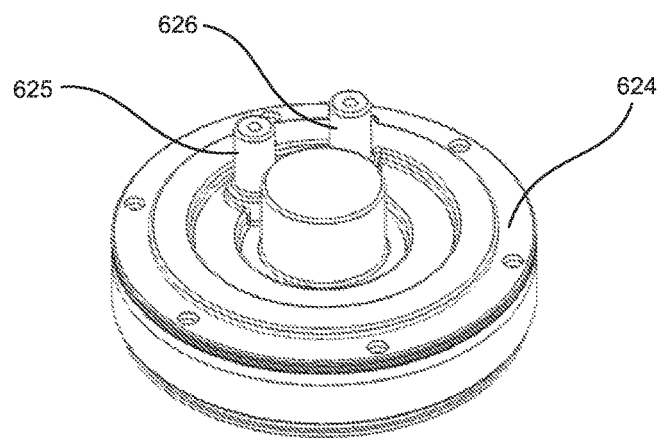
FIG. 8A is a perspective view of one of the suction cups of the robot of FIGS. 2 to 4, taken from the side opposite that which engages with the window surface.
Figure 8B:
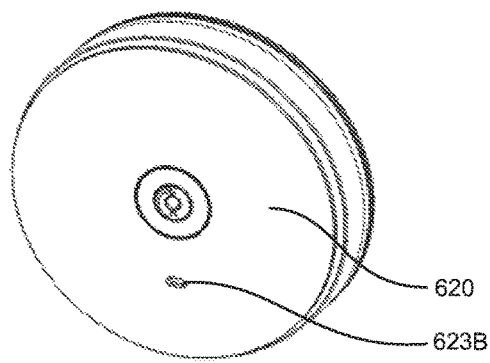
FIG. 8B is a perspective view of the suction cup of FIG. 8A, taken from the side that engages with the window surface.
Figure 9:
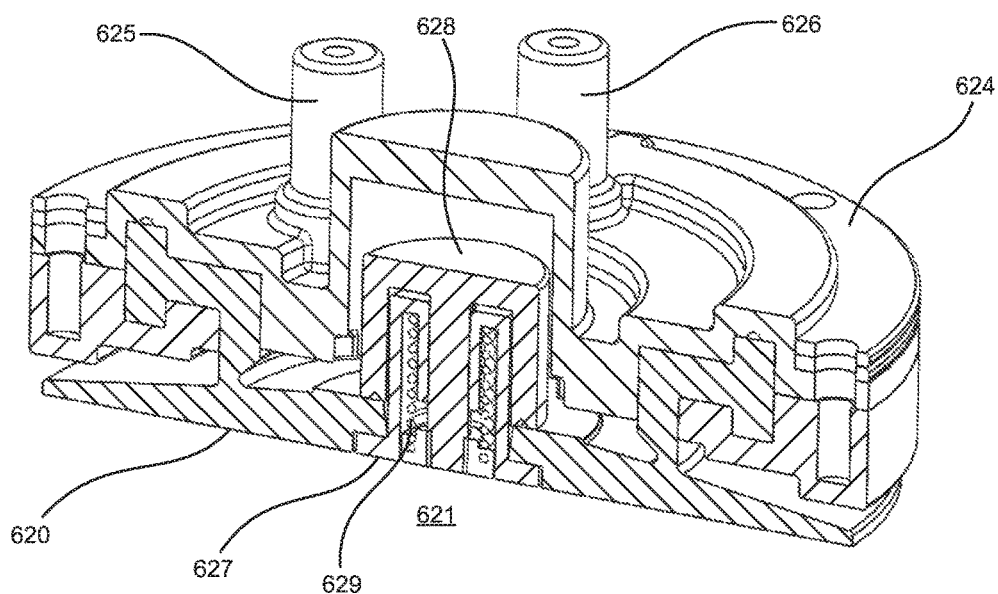
FIG. 9 is a perspective view of a cross-section through the suction cup of FIGS. 8A and 8B.

Reference is now directed to FIGS. 8 to 10, which show in further detail the suction cups 620A, 620B of the robot of FIGS. 2 to 4. FIG. 8A is a perspective view of one of the suction cups 620 of the robot of FIGS. 2 to 4, together with its associated mounting 624, with the view being taken from the side opposite that which engages with the window surface. FIG. 8B, by contrast, is a perspective view of the suction cup 620 and associated mounting of FIG. 8A, taken from the side that engages with the window surface.

As may be seen from FIG. 8A, the suction cup mounting 624 includes two pipes 625, 626, one of which (pipe 625) connects with an internal space 622 between the suction cup mounting 624 and the suction cup 620 itself. As will be discussed in further detail below, in order to move the suction cup 620 into the second, window surface 1000 engaging position, a vacuum pump (typically a diaphragm-based vacuum pump) removes air through this pipe (pipe 625) so as to reduce the pressure within the internal space 622. The other pipe (pipe 626) connects with the hole 623 within the suction cup 620, so as to allow the pressure to be sensed within the space sealed by the suction cup 621 between the robot 1 and the window surface 1000.

In more detail, once the suction cup 620 of FIGS. 8A and 8B is attached to the window, a vacuum pump (typically a diaphragm-based vacuum pump) keeps removing the air between the suction cup 620 and the surface until a desired level of vacuum is obtained (e.g. the air pressure reaches the first threshold value discussed above). The pump then shuts-down until the air pressure, measured by a pressure sensor (connected through pipe 626 to the vacuum pickup hole 623 within the space sealed 621 between the robot 1 and the window), rises to above a threshold (e.g. the air pressure reaches the second threshold value discussed above). This control cycle may reduce the amount of energy consumed by the vacuum pump (which may typically already be 10-20 times lower than the impeller system, since the vacuum pump generates a substantially lower air-flow). The specific amount by which energy consumption is reduced may, for example, depend on the sealing level between the suction cup 620 and the window surface, but the reduction could, for instance, be by a factor of 10. Thus, in total, the vacuum pump for the suction cups 620 may consume less than 1% of energy consumed by the impeller system. Accordingly, the robot of FIGS. 2 to 10 may be able to hang for long periods of time in the paused mode, even when the battery level is low.

The robot of FIGS. 2 to 4 includes a mechanism to move the suction cups to the window surface 1000, when attachment is desired (e.g. for the paused mode), and away from the window surface 1000, when attachment is not required (e.g. in the active modes). Moving the suction cups away from the window when they are not required for attachment may reduce the frictional forces experienced by the robot 1 when moving.

This mechanism is illustrated in FIG. 9 and FIGS. 10A-10C, in which FIG. 9 shows a perspective view of a cross-section of one of the suction cups 620 and its associated mounting, the cross-section being taken in a plane perpendicular to the surface of the window.

As is shown in FIG. 9, the suction cup 620 is provided with a valve 627,628, 629, which in the specific example shown is a spring-suspended valve, which includes a valve body 627, secured to the suction cup 620, and a valve head 628 that is spring-loaded with spring 629.

Figure 10A:
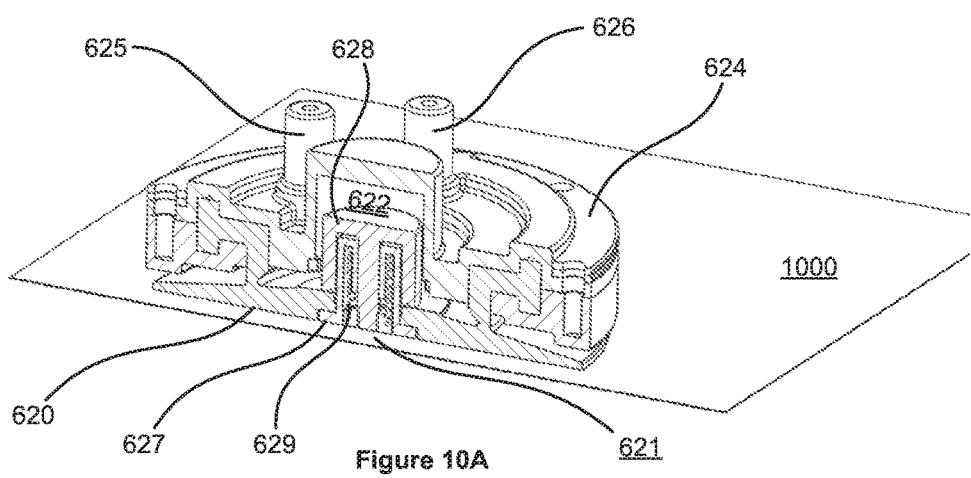
FIG. 10A-10C are perspective views of the suction cup of FIGS. 8 and 9 in cross-section, taken at various stages of the suction cup's engagement with a window surface.
Figure 10B:
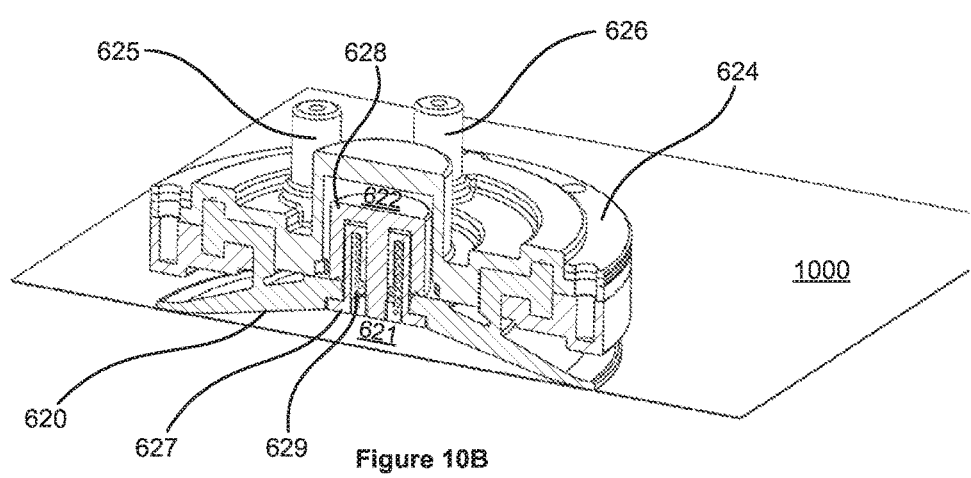

Once the pump is activated, the air is initially vacuumed from the internal space 622; this initial position is illustrated in FIG. 10A. Since the suction cup 620 is made of a soft material (typically silicon 30 Shore), when the pressure in the internal space 622 drops, the cup 620 is distorted in a way that turns it into a cone and moves it into contact with the window surface 1000, as shown in FIG. 10B. Thus, each suction cup 620 is moved to a window-engaging position by deformation. As a result, the suction cup 620 seals a space 621, shown clearly in FIG. 10B, between the robot and the window surface 1000.

Figure 10C:
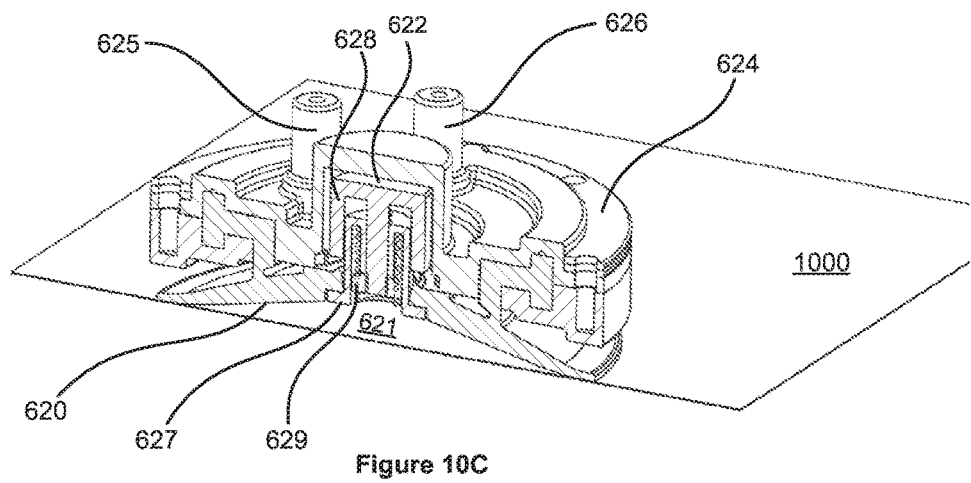

As illustrated by FIG. 10C, the vacuum in the internal space 622 keeps increasing until the point at which the valve head 628 is attracted with a force greater than the force provided by spring 629. This corresponds to the difference between the pressure within the internal space 622 and the pressure within the space sealed by the suction cup 620 being greater than a third threshold value.

The spring-suspended valve then opens, with the valve head 628 moving away from the valve body 627, and the internal space 622 is as a result connected to the space 621 sealed between the robot 1 and the window, permitting the passage of air therebetween.

The vacuum in both spaces 621, 622 is now the same, and is lower than the vacuum which was previously applied to the space sealed with the window 621 but higher than the vacuum which was previously applied to the internal space 622. Accordingly, the valve 627,628, 629 will close and the space sealed with the window 621 will be isolated. This process continues and in due course stabilizes at a certain vacuum level within the space sealed with the window 621 that depends on the amount of leakage from and the size of the space sealed with the window 621, as well as the specific properties of the vacuum pump.

In the robot of FIGS. 2 to 4, two suction cups 620A, 620B are used in parallel in order to provide the required attachment force. This may provide more balanced torques, so that the robot is less likely to rotate on the window surface 1000. However, in other examples only one suction cup might be included, or more than two suction cups could be included.

In order to disengage the suction cups from the window surface 1000, the processor(s) of the control system 100 of robot 1 cause the attachment system 600 to release the vacuum from the space sealed with the window 621. This may be achieved, for example, by deactivating the vacuum pump and waiting for the leakage to reduce the vacuum in the space sealed with the window 621 (which may take some time) or by opening a manual or electrical valve suitably connected to pipe 626 (in parallel to the pressure sensor).

In the robot of FIGS. 2 to 4, since the suction cups 620A, 620B are within the area sealed by the sealing foil 610, the pressure sensors actually measure the vacuum in this area acted on by the impeller(s) 630 when the suction cups 620A, 620B are disengaged from the window. In this way, a single pressure sensor can be used in the control of both the impeller attachment and the suction cup attachment. Thus, when the robot 1 of FIGS. 2 to 4 operates in an active mode, the pressure sensor may monitor the vacuum level within space sealed by the sealing foil 610 (which might, in one example be around 20 mBar) and, when the robot 1 is switched to a paused mode (for example in response to user actuation of an operation mode control, or in response to the power system 200 indicating to the processor(s) 101 of the control system 100 a low battery level), the vacuum pump 640 for the suction cups 620A, 620B may be activated, with the suction cups 620A, 620B moving towards the window surface 1000.

Once the suction cups 620A, 620B contact the window surface 1000, and seal respective spaces 621 between the robot and the window surface 1000, the vacuum in these spaces 621 will increase (in one example, to around 400 mBar) to a desired level. Upon reaching this desired level, the impellers 630A, 630B can be stopped and the robot 1 should remain hanging on the suction cups 620A, 620B. However, if the vacuum level, as measured by the pressure sensors adjacent the suction cups, does not reach this desired level, which may indicate that the suction cups are not making a sufficiently effective seal with the surface, the impellers 630A, 630B will not turn off (though it might reduce speed and consequently provide a lower vacuum level that conserves energy, but nonetheless maintains the attachment to the window surface 1000) and warn the user that the hang time is short.

While in the robot of FIGS. 2 to 4 and the discussion above, the paused mode sealing members comprise suction cups 620A, 620B, it should be appreciated that any suitable configuration might be used. For example, the paused mode sealing members might each include an element generally similar in shape and construction to the sealing foil 610. In particular, it will be appreciated that it is clearly not necessary for the pause-mode sealing members to be moved into contact with the window surface 1000 by deformation: they might instead (or in addition) translated relative to the robot body, for example using a motor or other electrically powered arrangement.

Similarly, while the active-mode sealing member is described as comprising a sealing foil 610, any suitable configuration might be used. Further, while only one active-mode sealing member is used in the robot of FIGS. 2 to 4, it will be appreciated that any suitable number of active-mode sealing members might be used.

Automatic Attachment to the Window Surface

The following section of the disclosure relates to the activation by the user of the attachment system for a window-cleaning robot, such as that shown in FIG. 1 or that shown in FIGS. 2 to 4.

In some products in the market, the user is required to turn the vacuuming on and then attach the robot to the window.

Use of Proximity Sensors

In contrast to such an approach, it is proposed that a window cleaning robot may be provided with one or more proximity sensors, with the robot being configured (e.g. by suitable programming of the processor(s)) to determine whether it is in close proximity to the window surface using these proximity sensors and with the robot being programmed (e.g. by suitable programming of its processor(s)) such that the attachment force is varied based on the proximity of the robot to the surface of the window, as determined by these proximity sensors. The use of such a robot is considered to be significantly more intuitive for the user. Additionally, or alternatively, such a robot may use less power, since the attachment system may operate in a low-power mode or be deactivated completely when the robot determines, using the proximity sensors, that it is not in close proximity to the window surface.

It should be appreciated that such a robot may be implemented using a wide variety of attachment systems, not to mention a wide variety of cleaning, power, movement and other systems.

Such proximity sensors may be configured to allow the robot (e.g. by suitable programming of its processor(s)) to quantitatively determine its distance from the window surface or may simply be configured (e.g. by suitable programming of its processor(s)) to allow the robot to make an essentially binary determination as to whether the window surface is closer to the robot than a specific distance.

Referring to the robot of FIGS. 2 to 4, purely by way of example, such a strategy may be implemented by activating the impeller only when the processor(s) of the robot determine, using the proximity sensors, that the window surface is in close proximity to the robot. Otherwise, the processor(s) of the control system may control the attachment system such that the impeller rotates at a low speed, or is not moved at all; in either case, power is conserved, thus improving battery-life for the robot. The robot also makes less noise (the slower the impeller speed the more quiet it typically is), which may be particularly beneficial in the home or office environment.

Use of Orientation Sensors

It is further envisaged that, in addition or instead, a window cleaning robot may be provided with one or more orientation sensors, with the robot being configured (e.g. by suitable programming of the processor(s)) to determine the direction in which it is oriented using these orientation sensor(s) and with the robot being programmed (e.g. by suitable programming of its processor(s)) such that the attachment force is varied based on the robot direction, as determined using these orientation sensors. The use of such a robot is also considered to be significantly more intuitive for the user than products currently in the market. Additionally, or alternatively, such a robot may use less power, since the attachment system may operate in a low-power mode or be deactivated completely, for example when the robot direction is determined to be at, or close to the horizontal.

For example, the robot may be provided with one or more orientation sensors, such as accelerometers or gyroscopes, with the robot being configured to determine the direction in which it is oriented using these orientation sensor(s). The thus-detected robot orientation may be used to determine the level of the attachment force provided by the attachment system.

In more detail, in some examples, the attachment force may be determined by the processor(s) of the robot based on the robot's orientation (as determined using the orientation sensor(s)) with respect to the horizontal. In such examples, the robot's orientation may, for instance, be defined within the programming of the robot (e.g. within the programming of its processor(s)) as the angle between the plane of the window-engaging surface of the robot (e.g. the surface of the robot 1 that is visible in FIG. 2) and the horizontal plane. More particularly, this angle may, for example, be defined as zero in the situation where the window-engaging surface is horizontal and faces vertically downwards, In still further detail, when the robot is disposed horizontally (such as during charging, storage, or carrying) the processor(s) of the control system may control the attachment system such that the attachment force is substantially lower than that typically required to attached the robot to the window surface or indeed such that it is substantially equal to zero. For instance, where an impeller is used, this may correspond to the impeller rotating at a low speed, or not moving at all.

By contrast, when the orientation sensor(s) indicate that the robot is disposed at a 45 degree angle to the horizontal, the attachment system may be caused by the processor(s) to provide an attachment force at a first level. For instance, where an impeller is used, this may correspond to the impeller being rotated at high speed so as to provide sufficient attachment force to attach the robot to the window surface when brought into contact with it. Further, when the robot is disposed vertically, or within, for example, 10 degrees of vertical (i.e. is disposed at approximately 90 degrees to the horizontal), the attachment system may be caused by the processor(s) to provide an attachment force at a second level, which is significantly greater than the first level. For instance, where an impeller is used, this may correspond to the impeller being rotated at a still higher speed so as to provide sufficient attachment force to attach the robot to the (substantially vertical) window surface when brought into contact with it.

Furthermore, if the window is horizontal, but the robot is oriented so as attach to its underside (corresponding to the robot's window-engaging surface being oriented at 180 degrees with respect to the horizontal), it may need a particularly high attachment force.

In robots with both proximity and orientation sensors, the attachment force may be varied based on both the robot orientation, as determined using the orientation sensors, and whether the robot is in close proximity to the surface of the window, as determined using the proximity sensors.

The robot may thus be programmed (e.g. by suitable programming of its processor(s)) such that when it determines that it is close proximity to the surface of the window using the proximity sensors and its orientation is within a predetermined angular range with respect to the horizontal (for example its window-engaging surface is oriented at an angle greater than 20 degrees to the horizontal), the attachment force is increased to at least a threshold value. This may be a level that is sufficient to ensure the robot has generally sufficient traction to move around on a window at a relatively small angle with respect to the horizontal. For instance, this may be the attachment force necessary for the robot to move on a window disposed at an angle that is slightly greater than the lower end of the predetermined angular range (e.g. 25 degrees in the example given above), for example so as to allow for minor errors in determination of the robot's orientation). Equally, this threshold value could simply be zero, though such an arrangement may be less robust.

Suitably, the processor(s) of the robot may determine an attachment force that exceeds this threshold value level by an amount based on the robot orientation, as determined using the orientation sensors. Thus, where the window is vertical, or where the robot is attached to the bottom surface of a window, a suitably high attachment force may be provided by the attachment system. This may further reduce power usage by the robot, since an appropriate level of force may be applied, given the orientation of the window.

The amount by which the threshold value is exceeded may be determined using a formula programmed into the processor(s) of the robot, or using a lookup table with a series of values for the attachment force corresponding to respective angular bands within the predetermined angular range (e.g. an attachment force value for 20-40 degrees, a value for 41-60 degrees, a value for 61-80 degrees, and so on).

Conversely, the robot may be programmed (e.g. by suitable programming of its processor(s)) such that, when it determines that its orientation is within a predetermined angular range of the horizontal (e.g. within 20 degrees of the horizontal), the attachment force is set to a level that is equal to or less than a second, lower threshold value, typically zero or a small stand-by value. Similarly, the robot may be programmed (e.g. by suitable programming of its processor(s)) such that, when it determines that it is not in close proximity to the surface of the window (with the aid of the proximity sensor(s)), the attachment force is set to a level that is equal to or less than the same second threshold value.

Use of Pressure Sensors

In robots, such as that shown in FIGS. 2 to 4, where a suction-based attachment system is utilised, the robot may be provided with a pressure sensor configured to measure a pressure in the attachment system (for example in the space sealed between the robot and the window surface in which a vacuum is generated, e.g. the space sealed by sealing foil 610) and such a robot may be programmed (e.g. by suitable programming of its processor(s)) to vary the attachment force based on the pressure measured by this pressure sensor. In a specific example, when the pressure measured by these pressure sensor drops below a predetermined pressure, for example a predetermined amount below the pressure within the room (local atmospheric pressure), thus suggesting that the robot has been brought into contact with the window surface and has thus formed a partial seal, the robot is programmed (e.g. by suitable programming of its processor(s)) to increase the attachment force. For instance, the attachment force may be increased to above a threshold value (such as the threshold values discussed above corresponding to a horizontal window, or a window at a shallow angle). Further, where the robot is provided with orientation sensor(s) the attachment force might be increased to a level that is greater than a particular threshold value by an amount determined in accordance with the robot orientation with respect to the horizontal, as described in the preceding subsection.

Suitably, the same pressure sensor that is used to determine when the robot is in contact with the window, by detecting the corresponding drop in air pressure, may additionally be utilised to sense local atmospheric pressure, for example as part of a start-up mode. Alternatively, an additional pressure sensor might be provided to sense local atmospheric pressure; for example, such a sensor could be provided in or on the side of the robot opposite to that which contacts the window surface).

Where proximity sensors are provided, the robot may be programmed (e.g. by suitable programming of its processor(s)) such that, when the proximity sensors indicate that the robot is in close proximity to the window surface, but the pressure sensor indicates that the pressure has not dropped substantially below the local atmospheric pressure, the attachment force is set at a second, lower threshold value. While lower, this second threshold value for the force may nonetheless be sufficient in order that, when the robot does contact the window surface, it causes the pressure within the attachment system to drop significantly enough to enable reliable sensing of this drop in pressure by the pressure sensor. Then, in response to this sensed drop in pressure, the robot may cause the attachment system to increase the attachment force to above the first threshold value, thus attaching the robot to the window.

In a simpler arrangement, the robot may be programmed (e.g. by suitable programming of its processor(s)) such that, the attachment force is maintained at a low level until the proximity sensors indicate that the robot is in close proximity to the window surface and the pressure sensor indicates that the pressure has dropped substantially below the local atmospheric pressure, at which point the attachment force is increased to above a threshold value, for example the first threshold value described above.

It is envisaged that a robots which vary their attachment force based on the pressure measured by pressure sensors in the manner described above need not include orientation or proximity sensors, as described above. Such robots might simply rely on such pressure sensors to determine when they are in contact with the window and, in response, increase the attachment force from a low level, which conserves power, to a high level, which is sufficient to attach the robot to windows at most, or substantially all orientations.

However, where orientation sensors are provided, the robot may additionally, or alternatively, determine an attachment force that exceeds the first threshold value level by an amount based on the robot direction, as determined using the orientation sensors. As noted above, this may further reduce power usage, since an appropriate level of force is applied, given the orientation of the window.

Use of Navigation Sensors

The attachment force can also (or instead) be controlled based on the detected movement of the robot, determined using navigation sensors provided by the robot. The robot may be programmed (e.g. by suitable programming of its processor(s)) to detect unwanted motion using these navigation sensors.

Such navigation sensors might include sensors operable to sense the relative motion of the robot, such as accelerometers, odometers, gyroscopes or magnetometers. In a specific example, one or more of the navigation sensors might detect rotation of an undriven wheel, such as the castor wheels of the robot of FIGS. 2 to 4. Such navigation sensors might also, or instead include proximity sensors (e.g. front/rear-looking proximity sensors) that enable the robot to determine its distance from the window frame.

Such navigation sensors may be used, for instance, to enable the robot to detect departure from a planned path, in the case where the robot is moving over the window surface, or movement, in the case where the robot is intended to be stationary. In a specific example, the robot may detect when the robot slips on the window surface and, in response, may increase the attachment force until such slippage stops.

Control of Attachment Force

It should be understood that where, in the description above, reference is made to the robot (and, more particularly its processor(s)) being programmed to cause the attachment system to generate an attachment force having a particular level that this is the force that will be provided in nominal conditions, for example the force that will be provided when the robot is engaged with the window (in the case of a vacuum/suction-based attachment system this is the attachment force that will be provided when the robot and any sealing members are actually engaged with the window surface). Therefore, in many cases, each value for the nominal attachment force may correspond to a respective power level at which the attachment system operates.

Moveably-Mounted Cleaning Pad

The following section of the disclosure relates to the mounting of the cleaning pad on the robot body.

As briefly mentioned above, in the robot of FIGS. 2 to 4, the cleaning pad (and the polishing pads) are provided as part of a cleaning pad member that is separate from and moveably mounted with respect to the main body of the robot. The nature of this mounting and principles embodied therein will now be described in further detail with reference to FIGS. 11 to 14.

Figure 11:
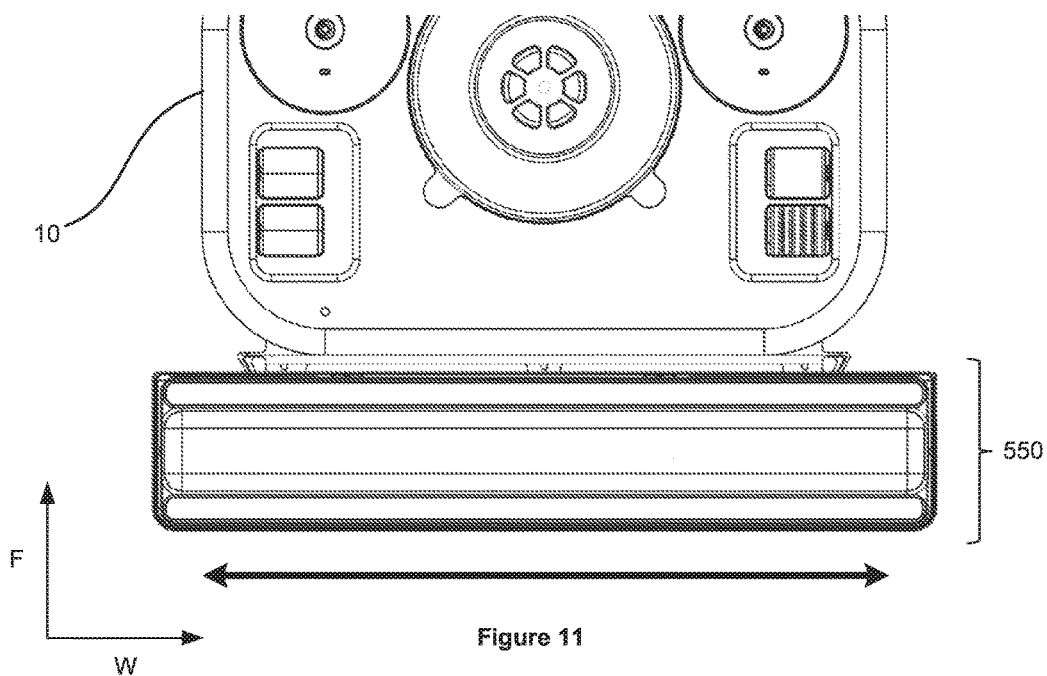
FIG. 11 is a plan view of the cleaning pad member of the robot of FIGS. 2 to 4, taken from the side which engages with the window surface.
Figure 12:
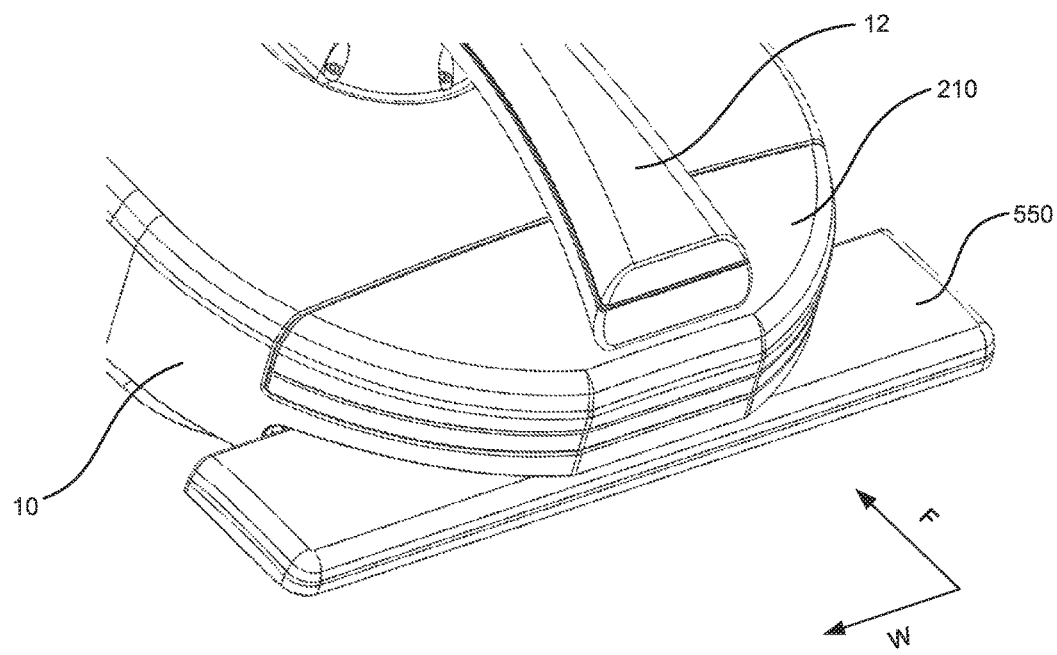
FIG. 12 is a perspective view of the rear section of the robot of FIGS. 2 to 4 that illustrates an arrangement used to mount cleaning pad member to the main body of the robot.

Turning first to FIGS. 11 and 12, which are, respectively: a is a view from below of the cleaning pad member and the robot of FIGS. 2 to 4; and a perspective view of the rear section of the robot of FIGS. 2 to 4; and illustrates the specific arrangement used to mount this cleaning pad member to the main body of the robot; as is indicated by a double-ended arrow, the cleaning pad member 550 is moveably mounted on the main body 10 of the robot 1 such that movement is restricted to the width direction W of the robot (which is perpendicular to the forwards direction F of the robot). Further, the cleaning pad member 550 (and the cleaning pad itself) is elongate in the width direction W.

The movement of the cleaning pad member 550 (and thus of the cleaning pad 520) with respect to the main body 10 is thus restricted to the length direction of the cleaning pad 520 and of the cleaning pad member 550.

It should be noted however that in other examples, the movement of the cleaning pad member may not be restricted in this manner. For instance, the cleaning pad member might be mounted such that it is free to move with respect to the main body along an arc-shaped path.

Figure 13A:
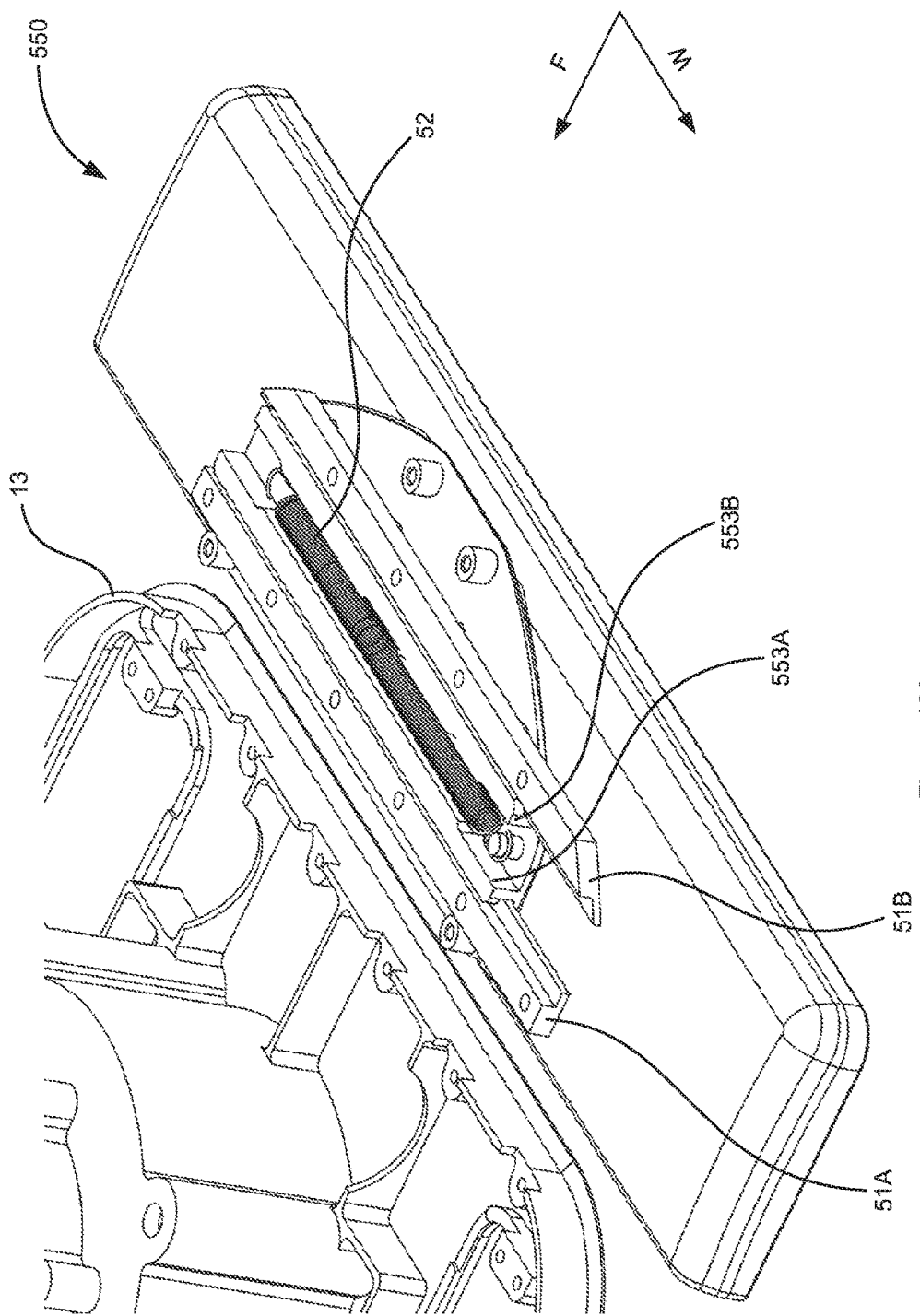
FIG. 13A is a perspective view of the cleaning pad member and robot chassis with various components removed to illustrate the mounting arrangement for the cleaning pad member.
Figure 13B:
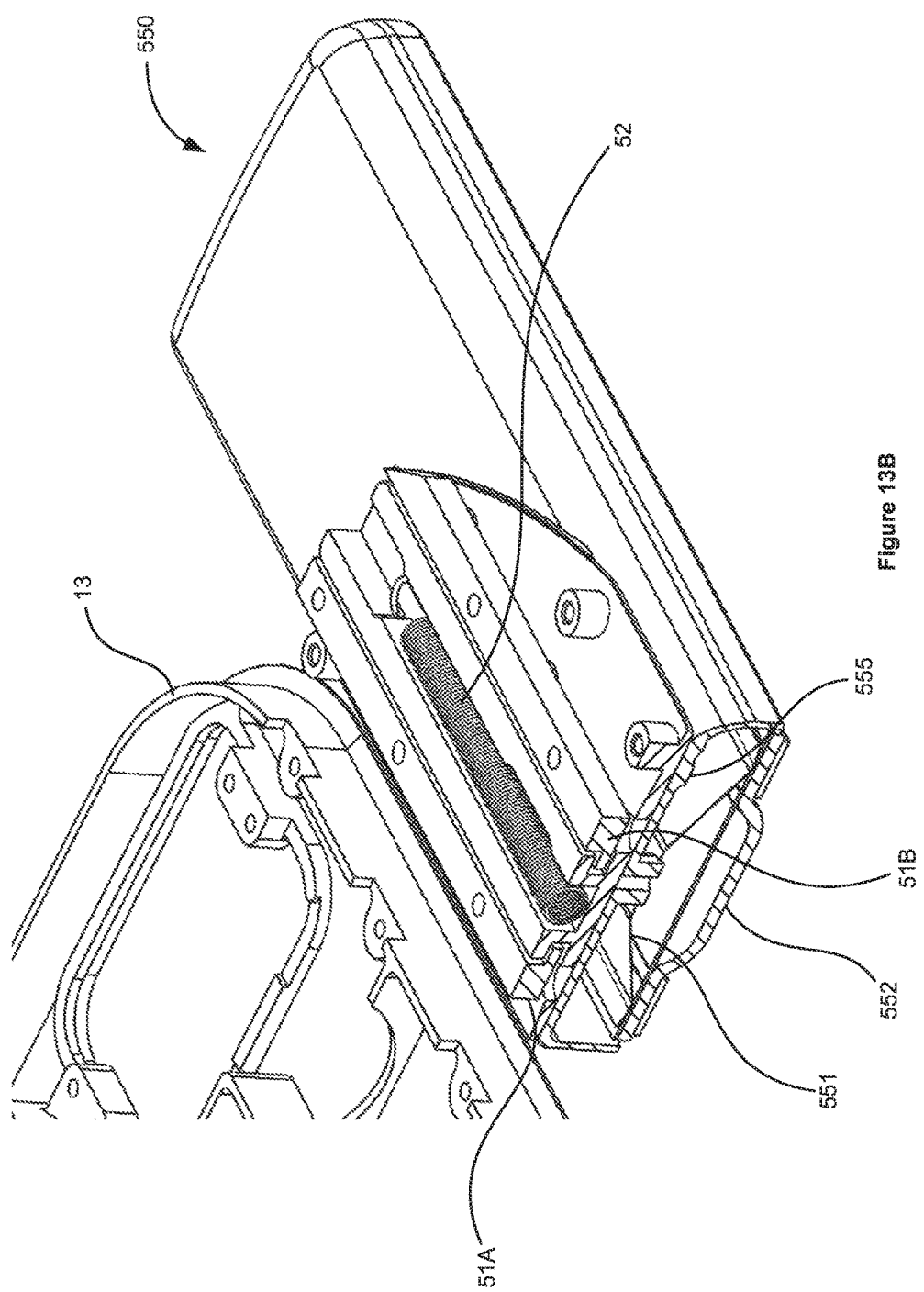
FIG. 13B is a perspective view of a cross-section through the cleaning pad member.

Attention is now directed to FIGS. 13A-13C, which show further details of the arrangement by which the cleaning pad member 550 is mounted on the main body 10 of the robot 1 shown in FIGS. 2 to 4.

Turning first to FIG. 13A, which is a perspective view of the cleaning pad member 550 and robot chassis 13 with various components removed to illustrate the mounting arrangement for the cleaning pad member, shown are rails 553A, 553B provided on the upper side (that opposite to the side providing the cleaning pad 520) of the cleaning pad member 550 and corresponding rails 51A, 51B provided on the cleaning pad mount 50 of the main body 10. This cleaning pad mount 50 is shown in FIG. 13C, which is a perspective view of a cross-section through the cleaning pad member and this cleaning pad mount 50. As is apparent from FIGS. 13A-13C, the rails 553A, 553B provided on the cleaning pad member 550 engage with the rails provided on the main body 10, thus restricting movement of the cleaning pad member 50 to the width direction W of the robot 1.

Further shown in FIG. 13A is a spring 52, which is attached at one end to the cleaning pad member 550 and at the other end to the cleaning pad mount 50 of the main body 10. This spring 52 mechanically biases the cleaning pad member 550 (and therefore the cleaning pad 520 also) towards a central position with respect to the main body 10, in which the cleaning pad member is aligned with the main body 10 along the forwards direction F. Accordingly, the cleaning pad member 550 will resist moving away from this central position, for example where a force is applied to it by the window frame. It will of course be understood that other mechanical arrangements may provide such biasing to a central position and this is merely an illustrative example.

Turning next to FIG. 13B, which is a perspective view of a cross-section through the cleaning pad member, it is apparent that the cleaning pad member 550 also includes a support 552, to which the cleaning pad 520 is removably attached, for example using Velcro, a magnetic or a mechanical connection; the cleaning pad may be removed and replaced, for example when the cleaning pad 520 becomes worn from repeated use. This support 552 is in turn mounted on the cleaning pad member housing 555. More specifically, it may be mounted on the cleaning pad member housing 555 using a leaf spring 551, as is shown in FIG. 13B. In this way, the cleaning pad 520 may be pressed against the window surface 1000, for example with a substantially constant force, so as to more effectively clean it. It will of course be understood that other mechanical arrangements may provide such pressing of the cleaning pad against the window surface 1000 and that this is merely an illustrative example. For instance, the cleaning pad member 550 could be mounted on the rear portion of the main body 10 using a spring.

It should be noted that the cleaning pad member 550 may be configured such that the polishing pads 530A, 530B are also pressed against the window surface 1000 and, moreover, are pressed against the window surface 1000 with greater force. In the example shown in FIG. 13B, the leaf spring 551 is configured to apply greater pressure to the sides of the support, where the polishing pads 530A, 530B are located, than to the center of the support, where the cleaning pad 520 is located. However, it should be understood that this is merely an example of an arrangement by which polishing pad(s) are pressed against the window surface 1000 with greater force than cleaning pad(s) and other arrangements may be utilized, particularly where the polishing pad(s) and cleaning pad(s) are positioned differently.

Attention is now directed to FIG. 14A, which is a plan view of the robot 1 of FIGS. 2 to 4 carrying out a turn starting at an initial position adjacent the frame of the window. As is apparent from FIG. 14A, in the robot's initial position, the cleaning pad member 550 has been forced away from its central position (towards which it is biased) by the window frame.

As may be seen from FIGS. 14B(i)-14B(iv), which are plan views of the robot 1 at respective points in the turn, as the robot 1 carries out this turn, the side of the cleaning pad member 550 remains in contact with the window frame for much of the turn. The window frame 1010 thus pushes the cleaning pad member 550 still further away from its central position, with the cleaning pad member 550 moving on the rails as discussed above. As a result, the robot 1 is able to turn in a position where it would not be able to if the cleaning pad member 520 were fixed on the main body 10 of the robot 1. More generally, the robot 1 is able to approach closer to the window frame than, for instance, if the cleaning pad member 550 were fixedly mounted on the main body 10 of the robot 1. This may assist the robot 1 in cleaning the window surface 1000 all the way to its edge. Indeed, the robot 1 may, for example, be able to clean the window surface 1000 to its edge without the robot main body 10 touching the frame.

It may also (or instead) assist the robot in turning near corners of the window. For example, the robot may be programmed (e.g. by suitable programming of its processor(s)) so as to cause the robot to move in a forwards direction over the window surface 1000 alongside a window edge (for example as part of a "perimeter movement pattern" as discussed below) and, when it determines that it has reached a corner, to move past the corner and so that it is alongside the consecutive window edge and then to reverse into the corner, so that the cleaning pad 520 (which may be provided at the rearwards end of the robot) addresses the area of the window immediately adjacent the corner. Such a maneuver may be more easily carried out with the cleaning pad movably mounted with respect to the main body of the robot.

Additionally, or alternatively, such a mounting arrangement may result in reducing the amount of time the main body 10 comes into contact with the window frame (in some cases only the cleaning pad member 550 may contact the window frame), which may comparatively reduce the frictional forces on the robot, which might otherwise affect control of the robot.

As is also apparent from FIGS. 14A and 14B, the robot is further assisted in approaching closer to the window frame as a result of the main body 10 having a profile (when viewed from the side that contacts the window surface 1000) that is narrower at the end on which the cleaning pad member 550 is mounted. The curved profile of this end (which is the rearwards end of the robot of FIGS. 2 to 4) still further assists in allowing the robot 1 to approach close to the window frame.

A further example of the cleaning pad member 550 moving with respect to the main body 10 and thereby allowing the robot 1 to approach closer to the window frame is where the robot 1 is moving in a forwards direction, parallel to the window frame. For example, where the robot of FIGS. 2 to 4 moves along such a path, the side of the cleaning pad member 550 may contact the window frame, with the window frame pushing the cleaning pad member 550 away from its central position, along the rails 51A, 51B on which it is mounted. Particularly where the extent of the cleaning pad member 550 in the width direction W (which is perpendicular to the forwards direction of the robot), is greater than the corresponding extent of the main body 10 of the robot in the width direction W, it may be possible to avoid the main body 10 contacting the window frame (thus reducing frictional forces on the robot) while still allowing the window surface 1000 to be cleaned right up to its edge. The cleaning pad member 550 might therefore be the widest point of the robot in the width direction W of the robot.

While a specific illustrative example of a mounting arrangement for the cleaning pad member 550 has been discussed above with reference to FIGS. 11-14, it is envisaged that a wide range of mounting arrangements might similarly enable the cleaning pad member 550 to move with respect to the main body of a robot, thereby allowing the robot to approach closer to a window frame. For instance, the cleaning pad might be secured on a cleaning pad member having one or more arms, each of which is pivotally mounted on the main body of the robot. It will be appreciated that, in such a case, the movement of the cleaning pad member may not be restricted to (translation in) a single direction; for instance, the movement of the cleaning pad member may be restricted to an arc-shaped path.

It should further be appreciated that the cleaning pad member need not include a housing, as is the case in the example above (although this may assist in protecting the cleaning pad, for example from accidental damage by the user). For instance, a support, to which the cleaning pad is removably attached (such as that described above), might be moveably mounted directly on the main body, rather than via the housing, as described above.

While in the specific examples discussed above with reference to FIGS. 2-4 and 11-14 the cleaning pad member comprises only one cleaning pad, it should be understood that the cleaning pad member may include a number of cleaning pads.

Further, whether there is provided one cleaning pad or a number of cleaning pads, the cleaning pad(s) may be arranged such that they address a contiguous width in the width direction as the robot moves over the window surface in the forwards direction, with this contiguous width being substantially equal to or greater than the width of the main body in the width direction. As discussed in previous sections, the cleaning pad member may further comprise one or more polishing pads. These may address a contiguous width in the width direction that is substantially equal to the width addressed by the one or more cleaning pads.

The robot of FIGS. 2 to 4 (with the mounting arrangement of FIGS. 11 to 14) is therefore viewed as being a specific example of the much more general concept, whereby there is provided a window-cleaning robot comprising: a main body; a movement system, mounted on said main body and configured to move the robot over the surface of a window; a cleaning pad member, which comprises one or more cleaning pads, each cleaning pad being configured to be wetted with a cleaning fluid and to contact the window surface so as to remove debris therefrom with the aid of the cleaning solution; wherein the cleaning pad member is moveably mounted on the main body such that when the cleaning pad member contacts a frame for the window, the frame pushes the cleaning pad member, causing the cleaning pad member to move with respect to the body thereby allowing at least a portion of the main body to approach closer to said window frame than if the cleaning pad member were fixedly mounted on the main body.

Navigation by a Window-Cleaning Robot

The following section of the disclosure relates to navigation by a window-cleaning robot (such as that detailed above with reference to FIGS. 2 to 4) when moving over a window surface using its movement system.

As briefly discussed above, a window cleaning robot may include a navigation system 300 having a variety of navigation sensors that assist the robot in navigating around the surface of the window, when moving using the movement system 400.

It is considered that a window cleaning robot with at least one orientation sensor, with the robot being configured to determine its orientation using such orientation sensors, and at least one distance sensor configured to detect the distance between the robot and the frame of the window, may be particularly effective at navigating around a window surface.

Such distance sensors may, for example, be time-of-flight based sensors and may thus make use of reflected infra-red, light, ultrasound and the like. A particular example of a suitable time-of-flight sensor is the VL6180 optical time-of-flight sensor, supplied by ST Microsystems. The distance sensors may be directed generally in the forwards direction of the robot's movement system, as is the case with the robot shown in FIGS. 2 to 4.

The orientation sensors may, for example, be accelerometers or gyroscopes. The orientation sensors may enable the robot to determine its current orientation, for instance with respect to gravity or a predetermined orientation.

The effectiveness of such a robot in navigating around a window surface 1000 will be explained with the aid of FIGS. 15 to 19. Each of these figures illustrates the robot using the measurements provided by its orientation sensor(s) and distance sensor(s) to move along a path over the window surface 1000. The path may be determined by the robot in accordance with certain rules or policies that it has been programmed with (e.g. that have been programmed into its processor(s)).

Figure 15:
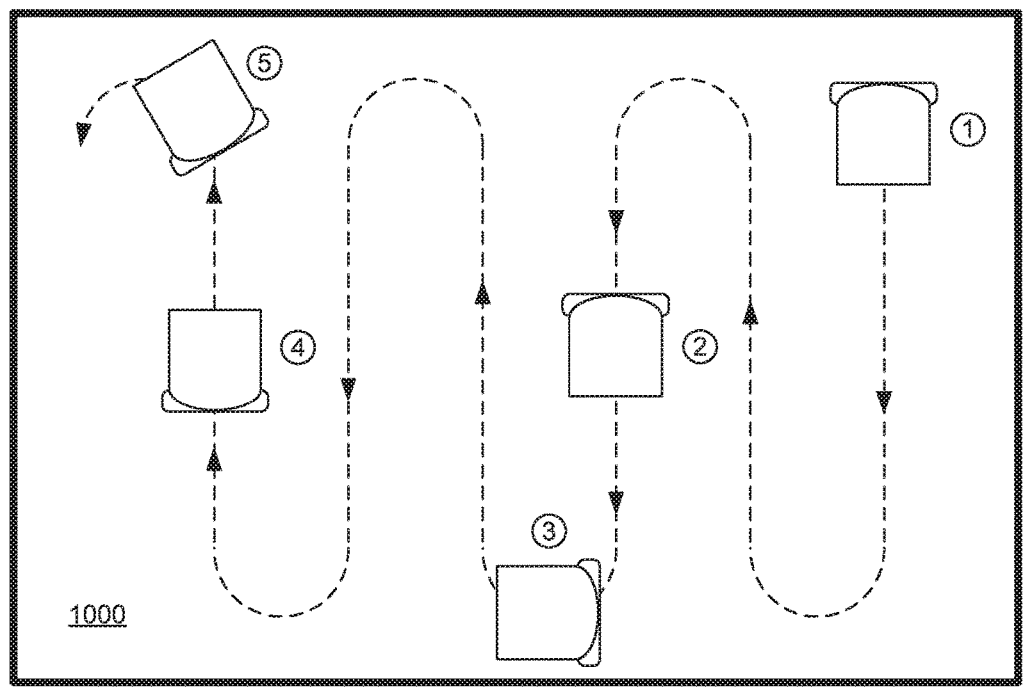
FIG. 15 is a plan view of the robot of FIGS. 2 to 4 navigating over the surface of a window along a path including a number of parallel vertical segments, which are connected by smooth turns.

FIG. 15 illustrates a robot, which comprises the navigation sensors discussed above, moving over the surface of a window having a frame surrounding its entire edge. The robot's location at a series of points in time is shown in FIG. 15, with the numbers (1)-(5) indicating the order in which the robot arrives at such locations.

The robot of FIG. 15 is programmed (e.g. by suitable programming of its processor(s)) such that it travels over a path including a plurality of parallel segments, each of which extends from a position adjacent one edge of the window to a position adjacent the opposite edge of the window surface 1000. Indeed, each of the parallel segments may extend across substantially the whole of the window surface 1000. As is apparent, at locations (2) and (4) in FIG. 15 the robot is moving along such parallel segments.

The robot is able to use its orientation sensor to ensure that each of these segments is parallel. In the example of FIG. 15, each of the parallel segments is vertical. Thus, the robot travels up and down, keeping an accurate direction by closing a control loop over the orientation sensors.

In addition, the robot is programmed (e.g. by suitable programming of its processor(s)) such that, when the distance sensors indicate that the robot is a predetermined distance from the window frame, they cause the robot to begin moving along a turning segment of the path. Thus it may perform a generally smooth turn or curved movement that brings it to the consecutive parallel segment within the path. As is apparent, at locations (3) and (5), the robot is moving along such smooth turns.

The path may be defined in the robot's programming (for example by selection of appropriate values for the radius of the turning segment) such that consecutive parallel segments are spaced apart by an amount that is sufficiently small to ensure that the respective areas (or swathes) addressed by the robot's cleaning system on consecutive parallel path segments may touch, or even overlap. Such an overlap might, for example, be sufficient to take account of the accuracy of the robot's navigation system. For instance, the spacing might be defined as $w-2e$, where w is the active width of the cleaning system and e is the accuracy of the navigation system.

Hence, or otherwise, as the robot moves along the path shown in FIG. 15, which is made up of parallel segments linked together by smooth turns, it will progressively apply its cleaning system to substantially the entire window surface 1000, with the exception of a perimeter portion 1001 of the window surface adjacent the edge of the window. In this way, this central portion 1002 of the window surface can be cleaned in a single, continuous forward movement by the robot. Hence, cleaning may be fast and efficient. In addition, smooth turns may reduce the incidence of marks being left on the window surface 1000 by the robot and/or may reduce wear on the robot's movement system.

Moreover, in such a pattern the wheels will typically avoid travelling over an area the cleaning system has recently been applied to. By avoiding such areas, which might be wet with cleaning fluid, incidences of slippage may be reduced.

Figure 16:
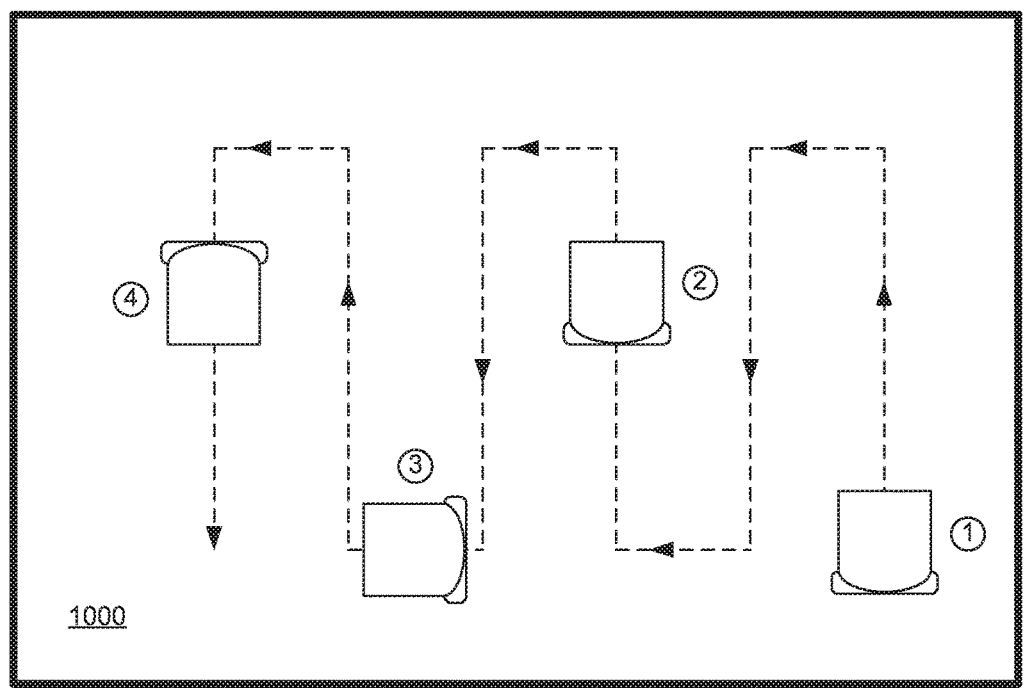
FIG. 16 is a plan view of the robot of FIGS. 2 to 4 navigating over the surface of a window along a path including a number of parallel vertical segments, which are connected by short horizontal paths.

FIG. 16 illustrates a further example of a path including a plurality of parallel segments. As with FIG. 15, the robot's location at a series of points in time is shown in FIG. 16, with the numbers (1)-(4) indicating the order in which the robot arrives at such locations.

As is apparent, in contrast to the path followed in FIG. 15, the path illustrated in FIG. 16 is defined in the robot's programming (e.g. the programming of its processor(s)) such that consecutive parallel segments are linked together by a short segment that is perpendicular to them. Thus, when the distance sensors indicate that the robot is a predetermined distance from the window frame, the processor(s) cause the robot to carry out a sharp turn (for example turning in place) and then to move in a perpendicular direction for a predetermined distance before again carrying out a sharp turn and then continuing along the consecutive parallel path segment.

Hence, as the robot moves along the path shown in FIG. 16, it will progressively apply its cleaning system to the central portion 1002 of the window surface (substantially the entire window surface, with the exception of a perimeter portion 1001 of the window surface adjacent the edge of the window). Thus, again, the central portion 1002 of the window surface can be cleaned in a single, continuous forward movement by the robot, enabling fast and efficient cleaning of the window. Further, as with the pattern of FIG. 15, in the pattern of 16 the wheels will typically avoid travelling over an area the cleaning system has recently been applied to, thus reducing incidences of slippage.

Figure 17:
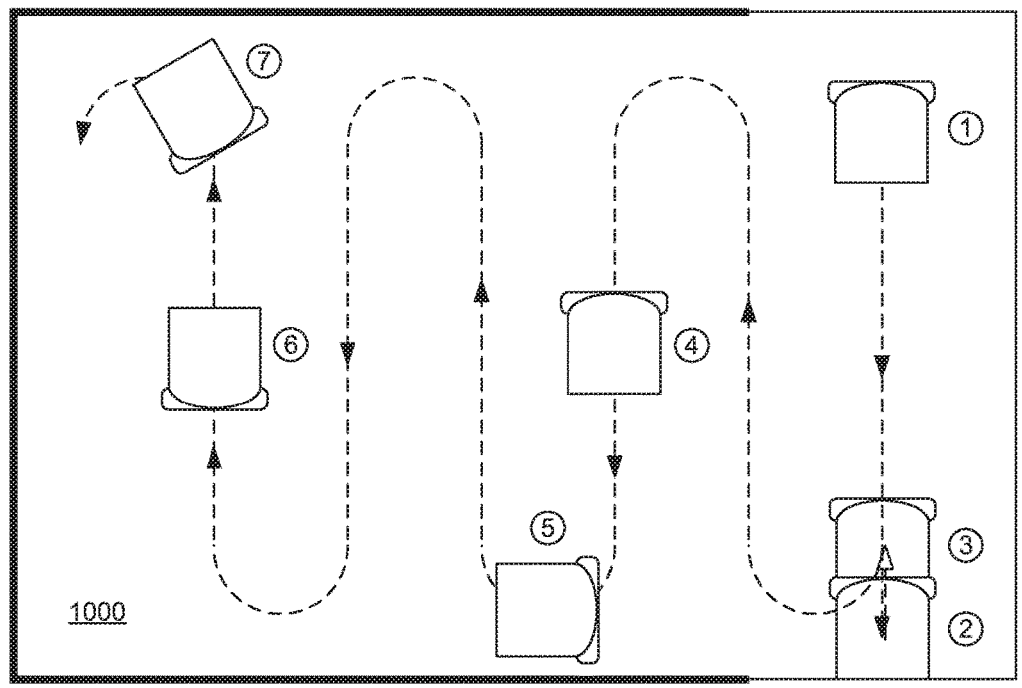
FIG. 17 illustrates the behavior of a robot moving over a window that has a frame that extends around only a portion of the window's edge.

FIG. 17 illustrates the behavior of a robot moving over a window that has a frame that extends around only a portion of the window's edge. As before, the robot's location at a series of points in time is shown, with the numbers (1)-(7) indicating the order in which the robot arrives at such locations. The navigation system of the robot in this example is additionally provided with at least one window presence sensor, which is configured to detect the presence of the window adjacent a portion of the robot. Such a window presence sensor may be a proximity sensor and may, for example, be provided on the side of the robot that engages with the window surface 1000, or may otherwise be directed towards the window surface 1000. More particularly, the window presence sensors may be provided towards the forwards end of the robot (as defined by the movement system), as is the case with the proximity sensors 320A, 320B, 320C of the robot 1 of FIGS. 2 to 4.

The robot illustrated in FIG. 17 is programmed (e.g. by suitable programming of its processor(s)) to follow a path that is defined in its programming in a similar manner to the path followed by the robot of FIG. 15. However, the robot illustrated in FIG. 17 is additionally programmed so as to react to gaps in the window frame. Specifically, because the frame does not extend around the whole of the window, the measurement from the distance sensor(s) may be erroneous, for example when the robot is driving directly towards a gap in the window frame. As a result, the robot may continue to the edge of the window (as has happened with the robot at location (2) in FIG. 17), since its distance sensors may not indicate that it has approached to within a predetermined distance of the window frame, which would normally trigger it to begin a turning movement. However, the robot is programmed (e.g. by suitable programming of its processor(s)) such that, as it approaches the edge of the window, it responds to the window presence sensor(s) indicating that the window is not adjacent the robot by causing the robot to carry out a rearwards movement away from the window edge, for example for a predetermined distance. In FIG. 17, the arrow shown in outline indicates such a rearwards movement from location (2), where the robot is at the edge of the window, to location (3).

Having carried out this rearwards moment, the robot may then perform a smooth turn, as described above with reference to FIG. 15, and thereafter continue with the next parallel path segment.

Such a strategy may enable the robot to cover the central portion of the window surface 1002 in a substantially continuous movement, even where the surface is frameless at one or more of its sections.

As a still further refinement, the robot may keep track of the length of each of the parallel path segments. For example, it could store each length and determine the average, maximum and/or minimum lengths for these segments; thus it measures a distance L corresponding to one or more of the parallel path segments. This may be used as a safety measure in addition to, or instead of the window presence sensor.

Specifically, the robot may begin turning when it has traveled a distance I since its previous turn, where I may be greater than the characteristic length L for previous path segments by a small amount (or might be equal to L). Thus, the robot will generally turn before it reaches the edge of the window, thus enabling it to cover the central portion of the window in a substantially continuous movement. The number of rearwards movements it needs to carry out may be reduced.

To assist the robot with determining the lengths of the parallel path segments, one or more relative motion sensors (e.g. an odometer, an accelerometer, a gyroscope etc.) may be provided, for example as part of the navigation system. Of course, a distance sensor might equally be used to determine the lengths of the parallel path segments.

Figure 18:
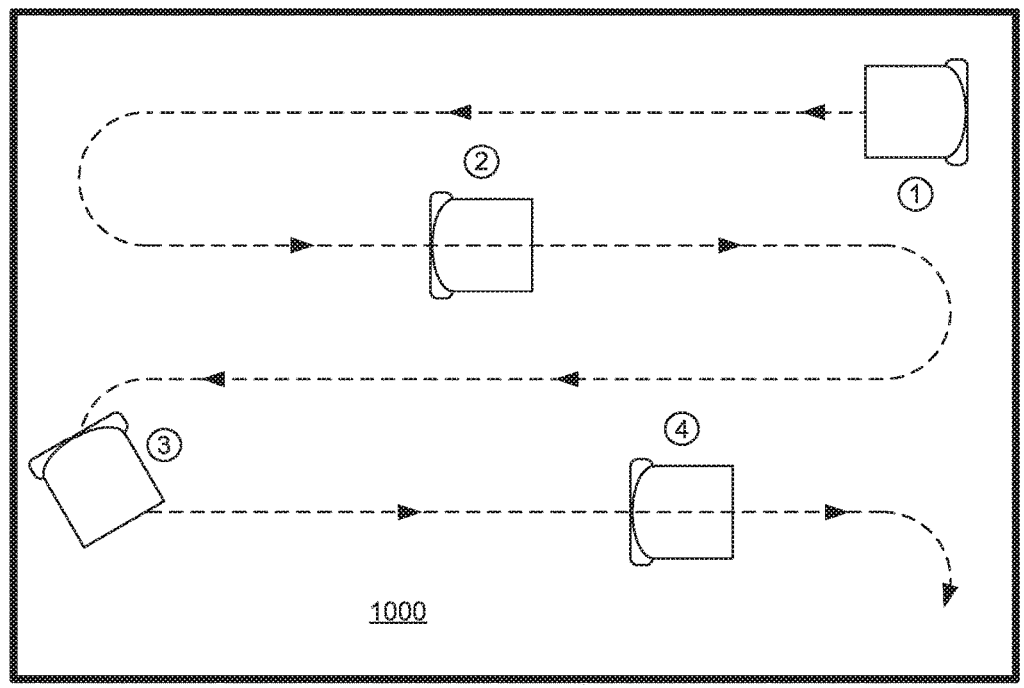
FIG. 18 illustrates the robot of FIGS. 2 to 4 following a similar path to that shown in FIG. 15, but with parallel horizontal segments.
Figure 19:
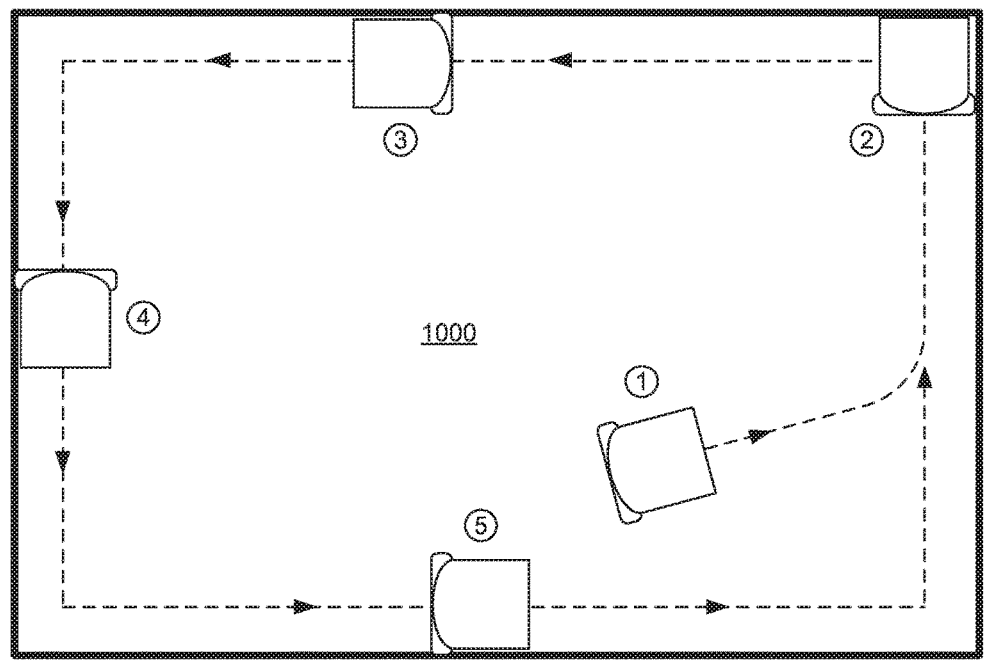
FIG. 19 illustrates the robot of FIGS. 2 to 4 carrying out a perimeter movement pattern.

It will of course be appreciated that while in the examples of FIGS. 15 to 17, the robot scans the window in a vertical direction (the parallel path segments are oriented vertically), scanning may be horizontal instead, as illustrated in FIG. 18. Testing carried out by the Applicant indicates that scanning paths where the parallel segments are oriented horizontally may provide a particularly good finish to the window surface. This is thought to be because residual cleaning fluid from previous parallel segments, will tend, owing to gravity, to flow vertically downwards, and thus will be addressed in a generally continuous manner by subsequent parallel segments. In contrast, with vertically oriented parallel segments, such residual cleaning fluid may be addressed in a more discontinuous manner.

For similar reasons, it is considered that a scanning path that starts adjacent the top of the window and finishes adjacent the bottom of the window may provide a particularly good finish to the window surface.

More generally, the parallel paths could be oriented in any direction; however, as the edges of windows generally extend either horizontally or vertically, it may be simpler to program the robot so as to use either a horizontal or a vertical scanning direction.

As will be appreciated, FIGS. 15 to 18 illustrate the robot moving along a path that is defined such that the robot covers a central portion 1002 of the window surface 1000. Thus, the paths shown in FIGS. 15 to 18 may be considered as respective examples of "interior movement patterns".

In order to ensure complete coverage of the window, the processor(s) of the robot may be additionally programmed to cause the robot to carry out a "perimeter movement pattern", where the robot performs a circuit of the window, where it moves adjacent to the edge of the window, so as to cover a perimeter portion 1001 of the window surface 1000. An example of such a perimeter movement pattern is shown in FIG. 19. Suitably, the central portion cleaned when the robot carries out the interior movement pattern may be sufficiently large that the perimeter portion that must be cleaned extends a distance less than the width of the robot from the edge of the window. Thus, the perimeter portion may be covered in a single circuit of the window. This is, of course, not essential: as part of the perimeter movement pattern, the robot might carry out a number of circuits so as to cover the window surface 1000, with each circuit being offset from the previous circuit.

For such a perimeter movement pattern, it may be helpful for the robot to be able to get the agitator and/or the cleaning pad as close as possible to the edge of the window. For the agitator, this can be done by some angled bristles that can reach outside the agitator housing, or alternatively by an additional side-mounted agitator, such as a side brush.

As discussed further above with reference to FIG. 1 and the robot detailed above with reference to FIGS. 2 to 4, it is envisaged that window cleaning robots as described herein may operate in a number of operation modes. One such operation mode may be a "full cleaning" mode, where the robot is configured to clean substantially the entire surface of the window (such a "full cleaning" mode may characterised as an "active" mode as described herein, since the robot moves over the surface of window, so as to clean it). In such a "full cleaning" mode, the robot may first move over the window surface 1000 according to an interior movement pattern, such as one of the scanning strategies described above with reference to FIGS. 15-18, to clean the central portion of the window surface and then to move over the window surface 1000 according to a perimeter movement pattern, carrying out a circuit of the window adjacent the window edge (for example according to the edge cleaning strategy discussed above with reference to FIG. 19), so as to clean the perimeter portion of the window. Of course, it will be appreciated that the perimeter portion could be cleaned prior to, rather than after, the central portion.

It should be appreciated that it is not essential that a robot with at least one orientation sensor, with the robot being configured to determine its orientation using such orientation sensors, and at least one distance sensor configured to detect the distance between the robot and the frame of the window, moves along a path including a number of parallel segments. The robot could move along a path that is partially random; for example a path including a number of generally straight path segments, each of which has an orientation that is determined at least partially randomly.

In a specific example, the robot might move along a generally straight path segment until its distance sensor indicates that it is a predetermined distance from the boundary. In response, it may carry out a generally smooth turn, as described above with reference to FIGS. 15, 17, and 18, and then move along a further, generally straight path segment. However, in contrast to the approaches discussed above with reference to FIGS. 15-18, this further, generally straight path may be disposed at an angle to the previous generally straight path segment that is determined at least partially randomly. For example, the robot may determine an angle according to a suitable random function and continue moving along the generally smooth turn until determines, using its orientation sensors, that it is at that randomly-determined angle, whereupon it will travel upon a generally straight path segment, until it encounters the window edge again.

Thus, according to such a strategy, the robot might be described as "bouncing" off the edges of the window. Over time, the robot may be expected to cover the entire window surface using such a strategy. Hence, the robot might be programmed (e.g. by suitable programming of its processor(s)) to operate for longer than a specific period of time that is sufficient to provide a high level of certainty that the robot has covered the entire window surface. This period of time could, for example be determined based on the measured lengths of the generally straight path segments; thus, where longer lengths are measured, indicating a larger window, the robot would operate for a correspondingly longer period of time.

It should accordingly be appreciated that the strategies described above with reference to FIGS. 15-19 are merely specific examples of a window cleaning robot a movement system, configured to move the robot over the surface of a window and, thereby, to enable the robot to clean the window surface; at least one orientation sensor, the robot being configured to determine its orientation using the at least one orientation sensor; at least one distance sensor configured to detect the distance between the robot and the frame of the window; wherein the robot is programmed (e.g. by suitable programming of its processor(s)) to move, using the movement system, over the window surface, navigating based on measurements provided by the orientation sensor(s) and the distance sensor(s).

Separate Perimeter and Interior Coverage

The following section relates to strategies by which the robot moves over the window surface to clean the window and, in particular, strategies by which the robot cleans substantially all of the window surface.

Testing carried out by the Applicant has led to the realization that ensuring good coverage of the area at the edge of the window surface is particularly difficult, since the movement of the robot in this area—and therefore the application of its cleaning system to the window surface—may be impeded by the window frame. Further, errors in coverage adjacent the window frame will often result in generally linear areas being left unaddressed by the cleaning system. As the human eye is particularly adept at identifying linear features, such errors in coverage are especially noticeable to the user.

Furthermore, it is considered that a perimeter movement pattern such as that illustrated in FIG. 19) where the robot carries out at least one circuit of the perimeter of the window surface 1000, thus cleaning a strip 1001 of the window surface 1000 that extends around the perimeter of the window surface and is bounded by the edge of the window surface, may allow the area at the edge of the window surface 1000 to be carefully and simply addressed by the cleaning system. The remainder of the window surface 1002, where the frame is unlikely to impede movement of the robot, may then be addressed separately, by carrying out a suitable interior movement pattern, for example where the robot follows a scanning path, such as one of those shown in FIGS. 15-18.

It is accordingly considered that efficient and reliable coverage of the entire window surface may be provided by programming the robot (e.g. by programming its processor(s)) to separately carry out an interior movement pattern (such as one of those illustrated in FIGS. 15-18) and a perimeter movement pattern (such as that illustrated in FIG. 19), where the perimeter movement pattern is defined in the robot's programming such that the robot carries out at least one circuit of the perimeter of the window surface, thus cleaning a strip 1001 of the window surface 1000 that extends around the perimeter of the window surface 1000 and is bounded by the edge of the window surface, and where the interior movement pattern is defined in the robot's programming such that the robot cleans the area 1002 located within the strip 1001 of the window surface 1000 cleaned during the perimeter movement pattern.

Figure 20:
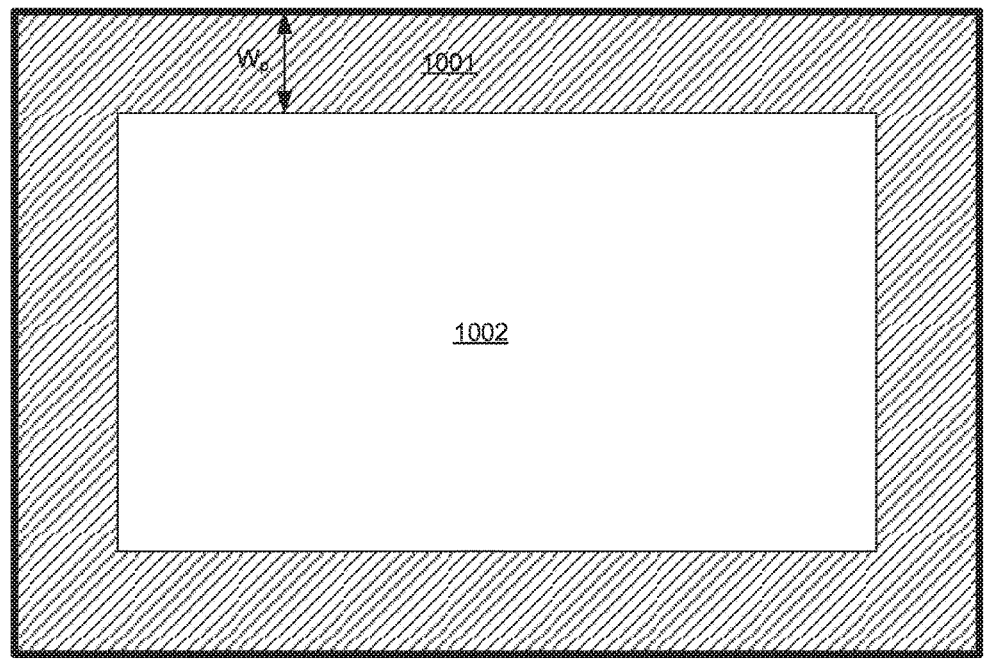
FIG. 20 illustrates the strip of the window surface cleaned by the robot when carrying out the perimeter movement pattern illustrated in FIG. 19.

Such a strategy may be more fully understood with the aid of FIG. 20, which illustrates the strip 1001 of the window surface 1000 cleaned by the robot when carrying out the perimeter movement pattern illustrated in FIG. 19. As is apparent, this perimeter strip has a width $W_p$, which may be substantially equal to the width of the robot. As is also shown, an area 1002, around which strip 1001 extends, is not addressed as part of the perimeter movement pattern. As noted above, this interior area 1002 may be addressed by the robot carrying out an interior movement pattern, such as one of those illustrated in FIGS. 15-18. To further ensure complete coverage of the window surface 1000, the interior movement pattern may be defined in the robot's programming (e.g. the programming of its processor(s)) such that the area that the robot cleans overlaps with the strip 1001 of area that is cleaned as a result of the perimeter movement pattern.

Such an overlap might, for example, be sufficient to take account of the accuracy of the robot's navigation system. For instance, the spacing might be defined as w−2e, where w is the active width of the cleaning system and e is the accuracy of the navigation system.

In some examples, such as those shown in FIGS. 15-18, the interior movement pattern may systematically cover the area located within the perimeter strip of the window surface; thus, the interior movement pattern may be determined substantially non-randomly.

More generally, it should be understood that features of the scanning paths discussed above with reference to FIGS. 15-18 may be implemented in suitable interior movement patterns. For instance, the interior movement pattern may be defined in the robot's programming (e.g. the programming of its processor(s)) such that the robot follows a scanning path. Such a scanning path may, for instance, be such that it does not cross itself and/or be such that the robot cleans the area located within the perimeter strip of the window surface in a single continuous forwards movement.

More particularly, the scanning path may comprise a plurality of parallel first segments, each of which preferably extends from a position adjacent one edge of the window to a position adjacent the opposite edge of the window surface and may, for instance, extend across substantially the whole of the window surface.

As noted above, testing carried out by the Applicant indicates that scanning paths where the parallel segments are oriented horizontally may provide a particularly good finish to the window surface. This is thought to be because residual cleaning fluid from previous parallel segments, will tend, owing to gravity, to flow vertically downwards, and thus will be addressed in a generally continuous manner by subsequent parallel segments. In contrast, with vertically oriented parallel segments, such residual cleaning fluid may be addressed in a more discontinuous manner.

For similar reasons, it is considered that a scanning path that starts adjacent the top of the window and finishes adjacent the bottom of the window may provide a particularly good finish to the window surface.

Orientation-Based User Interface

The following section of the disclosure relates to the user interface for a window-cleaning robot.

As discussed further above, it is envisaged that the window-cleaning robots described herein, such as the robot detailed above with reference to FIG. 1 or the robot detailed above with reference to FIGS. 2 to 4, may operate in a number of operation modes. In each of these operation modes, the various systems (for example the attachment, movement and cleaning systems) may be operated according to rules or policies that the robot has been programmed with (e.g. by suitable programming of its processor(s)) and that are specific to that mode.

It is considered that, where a window cleaning robot that is programmed (e.g. by suitable programming of its processor(s)) to operate in a number of operation modes has at least one orientation sensor (with the robot being configured to determine its orientation using such orientation sensor(s)) it may be particularly intuitive if the robot is programmed (e.g. by suitable programming of its processor(s)) so as to allow the user to select one of the operation modes, with the user-selected operation mode being determined at least in part by the direction in which the robot is oriented.

In some examples, the robot's direction relative to the vertical direction may be used to determine the user-selected operation mode. In addition, or instead, the robot's orientation may be defined within its programming (e.g. in the programming of its processor(s)) such that it is parallel to its forwards direction (e.g. the forwards direction of its movement system).

The robot may further include an operation mode control, actuation of which determines, in part, the user-selected operation mode. The user interface may be kept simple by this control having an unactuated and an actuated state, with the control being biased towards the unactuated state; for example, the operation mode control could be a push button, such as the play/pause button 710 of the robot shown in FIGS. 2 to 4.

As also discussed above, one of the operation modes for the robot may be a paused mode, where it remains stationary on the surface of the window (for example with the attachment system running in a low-power mode, in the manner described above).

The robot may additionally be programmed (e.g. by suitable programming of its processor(s)) with a number of "active" modes, in which the robot moves, using the movement system, over the surface of the window. A wide variety of such "active" modes are contemplated. In one example, the robot may be programmed with a number of "cleaning" modes, in which the cleaning system is active as the robot moves over the surface of the window, so that the robot cleans the window surface; such "cleaning" modes may, for instance, differ in terms of the movement pattern that the robot follows when cleaning the window surface, and/or in terms of the portion of the window surface that is cleaned. In another example, the robot may be programmed with a "return to docking station" mode where the robot window cleaner is configured to move to a docking station provided on the window surface.

The robot may be programmed (e.g. by suitable programming of its processor(s)) such that each actuation of the operation mode control switches the robot between the paused mode and a user-selected one of the active modes, with the user-selected active mode being determined based on the robot direction. It will of course be appreciated that further controls may be provided on the robot, such as, for example the "release" button described further above. As also discussed above with reference to FIG. 1, such controls may form a part of a user interface 700 for a window cleaning robot 10.

In one specific example, in order to make the user interface particularly simple, a single "play/pause" button may be provided, as is the case with the robot of FIGS. 2 to 4. With the robot initially in the "paused" mode, it may hang on the surface of the window with the attachment system begin operate in a low-power mode, as described above. Then, when the "play/pause" button is pressed by the user, it will begin operating in one of the active modes that is determined based on its direction. For instance, in the case that the robot direction is generally vertical a "full cleaning" mode may be selected, where the robot window cleaner is configured to clean substantially the entire surface of the window, whereas in the case that the robot direction is generally horizontal a "spot cleaning" mode may be selected, where the robot window cleaner is configured to clean a predetermined area local to the robot.

In another arrangement, in the case that the robot direction is horizontal and towards the left-hand side of the window surface, a "scan down" mode may be selected, where the robot is configured to clean the surface of the window below the robot's current height, whereas in the case where the robot direction is horizontal and towards the right-hand side of the window surface robot, a "scan up" mode may be selected, where the robot is configured to clean the surface of the window above the robot's current height.

In a still further arrangement, the active modes defined in the robot's programming (e.g. by suitable programming of its processor(s)) may include two or more "scanning" modes, where in each "scanning" mode, the robot is programmed to clean a central portion of the window surface, which is substantially the entire window surface, with the exception of a perimeter portion of the window surface adjacent the edge of the window. In such "scanning" modes, the robot may operate in a broadly similar manner to that described above with reference to FIGS. 15-19. Thus, it may, in each of these "scanning" modes, move along a path defined in the its programming such that the path comprises a plurality of parallel segments. Each of these parallel path segments may extend parallel to a scanning direction corresponding to that "scanning" mode. Accordingly, the robot may be programmed (e.g. by suitable programming of its processor(s)) to determine which of the scanning directions is closest to its direction and to select the "scanning" mode corresponding to that closest scanning direction. For ease of use, only a vertical and a horizontal scanning mode may be provided, which may avoid the user having to orientate the robot with accuracy.

To further simplify the user interface, the attachment of the robot to the surface may be carried out automatically, as soon as the robot approaches the surface, in the manner described above.

This orientation based interface is very intuitive and simple to use and may reduce the need for multiple buttons or displays/indications.

Movement System with Mechanically Linked Wheels

The following section of the disclosure relates to a movement system for a window-cleaning robot.

As may be seen from FIG. 2, the movement system of the robot 1 of FIGS. 2 to 4 includes two sets of drive wheels 421A-422A, 421B-422B and two support members 450A, 450B, such as a sliding surface/point or castor wheels, which enable the robot to move smoothly over the window surface 1000. As may also be seen from FIG. 2, the first and second sets of drive wheels 421A-422A, 421B-422B are spaced apart, one from the other, in width direction W, which is perpendicular to the forwards direction F of the movement system. It may further be noted that the width direction W is parallel to the axes of the wheels. In addition, the wheels in each set 421A-422A, 421B-422B are aligned perpendicular to this width direction W, i.e. in forwards direction F. Furthermore, the support members 450A, 450B are spaced apart from the drive wheels in the forwards direction F.

The two sets of wheels 421A-422A, 421B-422B of the robot 1 may, for example, be driven at different rates so as to move the robot along a curved path over the window surface, or to turn the robot on the spot. By contrast, driving the two sets of wheels 421A-422A, 421B-422B at the same rate may move the robot 1 along a straight-line path over the window surface.

Figure 21A:
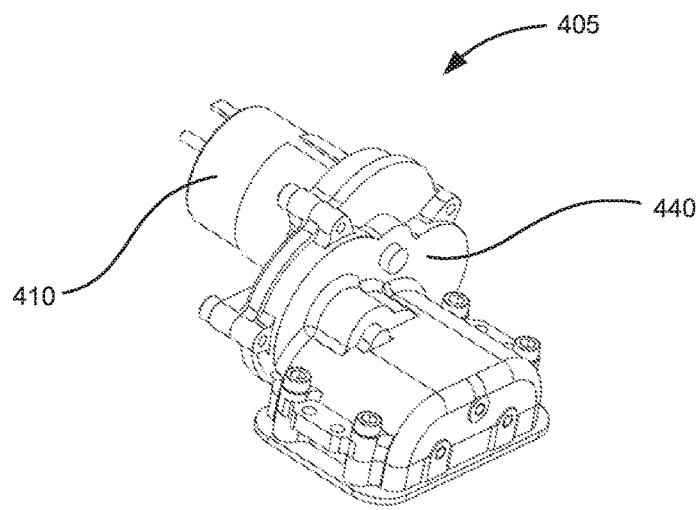
FIG. 21A is a perspective view of one of the two sets of wheels of the robot of FIGS. 2 to 4, together with the associated drive components.
Figure 21B:
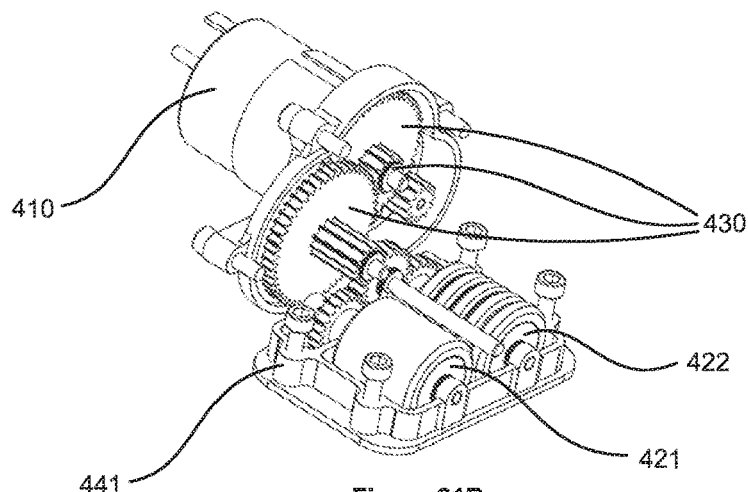
FIG. 21B is a perspective view of the wheels and drive components of FIG. 21A, with the housing not shown so as to more clearly illustrate the drive components.
Figure 21C:
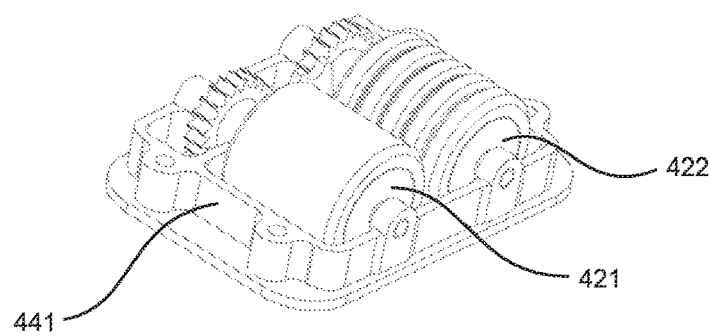
FIG. 21C is a perspective view of the wheels and wheel mount of FIG. 21A.

FIGS. 21A-21C are perspective views of one set of these pairs of wheels 421, 422, together with the associated drive components, including the motor 410 for that pair of wheels 421, 422 and common drive gears 430. FIG. 21A shows a complete drive assembly 405 for one set of wheels; the housing 440 for the wheels 421, 422 and the associated drive components are clearly visible in the drawing. By contrast, in FIG. 20B the housing 440 is not shown, so as to more clearly illustrate the interior drive components.

As is best shown in FIG. 21B, the pair of drive wheels 421, 422 is mechanically linked. Specifically, they are mechanically linked by means of a number of common drive gears 430 that transfer rotation from the motor 410 for the pair of drive wheels 421, 422. Such a mechanically linked set of wheels 421, 422 may provide substantially greater traction to the robot than a single wheel of the same size, while providing a lower profile in a direction perpendicular to the window surface than a larger wheel that provides a similar traction force.

To increase the traction provided by the wheels, the wheels may be configured such that the attachment force provided by the attachment system 600 causes each wheel 421, 422 to deform, thus increasing the contact area between the window surface and the wheel 421, 422 in question. Hence, or otherwise, the radially exterior surfaces of the wheels 421, 422 may be made from a relatively softer material.

In the example shown in FIGS. 21A-21C, the wheels 421, 422 include tires, which may be made of a soft material, such as polyurethane, for example 50 Shore polyurethane. When the robot is engaged with the window surface, with the attachment system active, the tires are somewhat flattened so that a still larger surface is created between the tire and the window surface. This surface, doubled by the fact that two (or more) wheels 421, 422 are used, provides the required friction to assist the robot 1 in holding its own weight and driving against gravity.

In some cases, it may be beneficial for the wheels to have good traction on a wet surface. The wheels 421, 422, or the tires thereof may therefore contain grooves, which allow the water pressed between the tire and the window surface to drain and thus to reduce the wet layer between the tire and the window surface, hence providing good traction on the window surface.

Such grooves on the exterior of wheel 422 are shown clearly in FIG. 21C, which is a perspective view of the wheels 421, 422 and the associated wheel mount 441, which holds the wheels 421, 422 in position within the robot 1.

While in the specific example shown in FIG. 2, and 21A-21C, each set of drive wheels 421A-422A, 421B-422B includes two wheels, it will be appreciated that any suitable number of drive wheels may be included in each set. Similarly, any suitable number of support members may be provided.

It will further be appreciated that the drive wheels might be mechanically linked in a variety of ways. Thus, rather than being mechanically linked by common drive gears, the wheels could, for example, be mechanically linked by a timing belt.

The robot of FIGS. 2 to 4, and 21A-21C is therefore viewed as being a specific example of the much more general concept, whereby there is provided a window-cleaning including a movement system, configured to move the robot over a window surface and, thereby, to enable the robot to clean the window surface, the movement system comprising: a first and a second set of wheels configured to contact the window surface, each of the wheels being rotatable about a corresponding axis, the axes being parallel to a first direction, the first set of wheels being spaced apart from the second set of wheels in the first direction; and at least one motor for driving the wheels, the wheels thereby propelling the robot over the window surface; wherein the wheels within each of the first and the second sets are mechanically linked such that rotation of any one wheel within a set causes movement of the other wheels within that set.

Certain products within the market make use of continuous or caterpillar tracks to move over the window surface. It will be understood that such products do not include wheels that are configured such that during use they contact the window surface. Further, in comparison to such products, a robot as defined immediately above (which comprises wheels that contact the window surface) may be lower cost (since it is generally simpler and may make greater use of standard components), may avoid issues with variations in tension in such tracks (such variation may be caused by changes in temperature, moisture etc.) and/or may leave fewer marks when turning. Nonetheless, a robot as defined above may provide similar traction forces to such products using caterpillar tracks.

Combinations

It is envisaged that the concepts discussed above may be combined in a variety of ways within a window-cleaning robot.

For example, concepts disclosed in the "Navigation by a window-cleaning robot" section may be implemented in a window-cleaning robot in combination with concepts disclosed in the "Orientation-based user interface" section. Further, concepts disclosed in the "Orientation-based user interface" section may be implemented in a window-cleaning robot in combination with concepts disclosed in the "Low-power attachment system" section. Furthermore, concepts disclosed in the "Orientation-based user interface" section may be implemented in a window-cleaning robot in combination with concepts disclosed in the "Automatic attachment to the window surface" section. Still further, concepts disclosed in the Cleaning system with a cleaning and a polishing pad" section may be implemented in a window-cleaning robot in combination with concepts disclosed in the "moveably-mounted cleaning pad" section. Of course, it will be appreciated that these are only examples: still further combinations are envisaged.

Still further, as is noted a number of times in the disclosure above, although various concepts are described with reference to the robot of FIG. 1 and the robot of FIGS. 2 to 4, such concepts do not rely on the particular structure and configuration of these robots and may be implemented more generally in window-cleaning robots.

More generally, it should be noted that the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments.

The terminology used herein was chosen to best explain the principles of the embodiments, the practical application or technical improvement over technologies found in the marketplace, or to enable others of ordinary skill in the art to understand the embodiments disclosed herein.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A window-cleaning robot comprising:
a movement system configured for moving the robot over a window surface and operable with a predefined forwards direction of movement;
at least one agitator configured for removing debris from a window surface;
at least one cleaning pad for removing debris from the window surface, the at least one cleaning pad arranged on the robot to follow the at least one agitator when the movement system moves the robot in the predefined forwards direction of movement, said at least one agitator and said at least one cleaning pad being arranged such that, as said movement system moves the robot over the window surface in said forwards direction, the at least one agitator addresses a first width in a width direction, which is perpendicular to said forwards direction and parallel to the window surface, and the at least one cleaning pad addresses a second width in said width direction; and
an attachment system, for attaching the robot to the surface of a window, the attachment system comprising one or more first sealing members, attached to the robot and configured to contact the surface of a window so as to seal a respective space between the robot and the window surface, and one or more vacuum pumps, operable to reduce the air pressure within the spaces sealed by said one or more first sealing members.

2. The window-cleaning robot of claim 1, wherein each of said at least one agitator is elongate in said width direction.

3. The window-cleaning robot of claim 1, wherein each of the at least one cleaning pad is elongate in said width direction.

4. The window-cleaning robot of claim 1, further comprising one or more reservoirs fillable with cleaning fluid, the one or more reservoirs being fluidically connected so as to supply a cleaning fluid to said at least one cleaning pad.

5. The window-cleaning robot of claim 4, wherein each of said at least one cleaning pad comprises a cloth that is wettable by said cleaning fluid.

6. The window-cleaning robot of claim 1, further comprising one or more polishing pads configured to contact the window surface and, thereby, to polish it when the robot is moved over the window surface using said movement system.

7. The window cleaning robot of claim 6, wherein each polishing pad polishes the window surface such that any layer of cleaning fluid present on the window surface is left as a thinner layer and/or is dispersed over a greater area after the polishing pad passes over it.

8. The window-cleaning robot of claim 6, wherein each polishing pad polishes the window surface such that variation in the depth of any layer of cleaning fluid present on the window surface is reduced after the polishing pad passes over it.

9. The window-cleaning robot of claim 6, wherein said one or more polishing pads are arranged such that, as the robot moves over the window surface in said forwards direction, they together address a third width in said width direction, said third width being substantially equal to said second width.

10. The window-cleaning robot of claim 6, wherein each polishing pad is elongate in said width direction.

11. The window-cleaning robot of claim 6, wherein said one or more polishing pads comprise a rearwards one or more polishing pads, said the at least one cleaning pad being located beyond said first one or more polishing pads in said forwards direction.

12. The window-cleaning robot of claim 6, wherein each polishing pad comprises a cloth that is wettable by said cleaning fluid.

13. The window-cleaning robot of claim 6, wherein each of said at least one cleaning pad comprises a cloth that is wettable by said cleaning fluid and wherein each cleaning pad cloth and each polishing pad cloth is formed of fibers, with the fibers of said cleaning pad cloths being substantially finer than those of the polishing pad cloths.

14. The window-cleaning robot of claim 1,
wherein, with respect to said width direction, said one or more first sealing members lie substantially wholly within said first width.

15. The window-cleaning robot of claim 1, wherein said at least one agitator is located beyond said one or more first sealing members in said forwards direction.

16. The window-cleaning robot of claim 1, wherein said one or more first sealing members are located beyond said at least one cleaning pad in said forwards direction.

17. The window-cleaning robot of claim 1, additionally comprising one or more processors; wherein said one or more first sealing members are active-mode sealing members, the one or more processors being programmed to operate in one or more active modes, where they cause the robot to move over the surface of window, using said movement system, and the vacuum pump(s) are caused to reduce the air pressure within the spaces sealed by the active-mode sealing members to a sufficient extent to attach the robot to the window surface, while permitting movement of the robot over the window surface.

18. The window-cleaning robot of claim 1, wherein said at least one agitator is configured such that debris is substantially swept clear of said one or more cleaning pads.

19. The window-cleaning robot of claim 1, wherein each of the at least one agitator is rotatable.

20. The window-cleaning robot of claim 1, wherein each of the at least one agitator is rotatable and the axis of rotation of each of the at least one agitator is parallel to the width direction and to the window surface.

21. The window-cleaning robot of claim 1, wherein said first width is substantially equal to or greater than said second width.

22. The window-cleaning robot of claim 1, wherein said agitator comprises a brush.

* * * * *